(12) United States Patent
Ochi et al.

(10) Patent No.: US 6,255,789 B1
(45) Date of Patent: Jul. 3, 2001

(54) MOTOR

(75) Inventors: Masaaki Ochi, Hirakata; Makoto Gotou, Nishinomiya; Hideaki Mori, Moriguchi, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/489,107

(22) Filed: Jan. 21, 2000

(30) Foreign Application Priority Data

Feb. 4, 1999 (JP) ................................. 11-027572

(51) Int. Cl.$^7$ ................................................ H02P 7/06
(52) U.S. Cl. ............................ 318/254; 318/138; 363/34
(58) Field of Search .................................. 318/138, 439, 318/254; 363/34, 37, 74, 95

(56) References Cited

U.S. PATENT DOCUMENTS

| | | | |
|---|---|---|---|
| 4,494,053 | * 1/1985 | Gotou | 318/254 |
| 5,309,078 | 5/1994 | Cameron | 318/811 |
| 5,331,258 | * 7/1994 | Lankin et al. | 318/139 |
| 5,661,382 | * 8/1997 | Enami et al. | 318/439 |
| 5,869,946 | * 2/1999 | Carobolante | 318/811 |
| 5,959,418 | * 9/1999 | Gotou | 318/254 |
| 5,982,118 | * 11/1999 | Gotou et al. | 318/254 |
| B1 6,172,474 | * 1/2001 | Gotou | 318/254 |

FOREIGN PATENT DOCUMENTS

466673-A1 * 1/1992 (EP).

* cited by examiner

*Primary Examiner*—Robert E. Nappi
*Assistant Examiner*—Rina I. Duda
(74) *Attorney, Agent, or Firm*—Pearne & Gordon LLP

(57) ABSTRACT

In the present invention, a Q-phase motor, which electronically switches current paths to plural-phase windings, comprises waveform shaping signal producing device for producing Q-phase waveform shaping signals having a conduction width larger than an electric angle of 360/Q degrees and superimposed signal producing device for superimposing signals to the waveform shaping signals. The superimposed signal producing device comprises superimposed timing producing device for producing superimposed timing signals which are output in a period shorter than a conduction period of the waveform shaping signals in a conduction period of the waveform shaping signals, synchronous rectifying control device for controlling the timing for synchronous rectification, and superimposed signal composing device for composing the signals output from the synchronous rectifying control device with the superimposed timing signals.

16 Claims, 23 Drawing Sheets

MOTOR

BACKGROUND OF THE INVENTION

The present invention relates to a motor in which current supplied to plural-phase winding loads is electronically altered by means of plural transistors.

In recent years, as driving motors for OA appliances or AV apparatuses, motors in which a current path is electronically altered by means of plural transistors have been widely used.

FIG. 23 shows a motor of the prior art, and the operation of the motor will be briefly described. A rotor 501 has a field part configured by permanent magnets. In response to the rotation of the rotor 501, a position detection part 505 produces two sets of three-phase voltage signals L1, L2, and L3, and L4, L5, and L6. A first distributing unit 506 produces three-phase negative-side conduction control signals UL1, UL2, and UL3 responding with the voltage signals L1, L2, and L3, respectively, and controls the conduction of negative-side NPN-type power transistors 508, 509, and 510. A second distributing unit 507 produces three-phase positive-side conduction control signals UH1, UH2, and UH3 responding with the voltage signals L4, L5, and L6, respectively, and controls the conduction of positive side PNP-type power transistors 511, 512, and 513. According to this configuration, the current paths to three-phase windings 502, 503, and 504 is controlled.

However, the above-mentioned prior art configuration has the following problems.

In the prior art configuration, in order to reduce vibration of the motor, the NPN-type power transistors 508, 509, and 510 and the PNP-type power transistors 511, 512, and 513 supplied smooth drive currents to the windings 502, 503, and 504 by analoguely controlling the voltages between the emitter and the collector. However, the residual voltage of each power transistor was so large that a great power loss and heat generation were formed as a product of the residual voltage and the drive currents to the windings. As a means to solve this problem, a step-down chopper circuit is provided on the positive terminal side of a DC power source 530 so as to vary output voltages in accordance with the magnitudes of the drive currents to the windings 502, 503, and 504. However, as long as the power transistors were controlled analoguely, the residual voltages of the power transistors were large, which set limits to a reduction in the power loss. As another method of reducing the power loss, a switching control method can be performed to make the power transistors switching operations. However, there is no prior art that can easily smooth the drive currents to the windings 502, 503, and 504; the realization of the smooth drive currents required providing a large-scale circuit, which had a problem of boosting the cost.

SUMMARY OF THE INVENTION

The object of the present invention is to dissolve the above-mentioned problems and to provide a motor which can reduce a power loss while making power transistors supply windings with smooth drive currents.

A motor in accordance with the present invention comprises: a movable body, plural-phase windings, DC power source means as power supply source, Q pieces (Q is an integer of 3 or greater) of first power amplifying means each including a first power transistor forming a current path between one terminal side of said DC power source means and one terminal of said plural-phase windings, and Q pieces of second power amplifying means each including a second power transistor forming a current path between the other terminal side of said DC power source means and one terminal of said plural-phase windings, conduction control means for controlling conduction of said first power amplifying means and said second power amplifying means, and switching control means for controlling high-frequency switching operations for one or both of the first power transistors of said first power amplifying means and the second power transistors of said second power amplifying means, wherein said conduction control means comprises waveform shaping signal producing means for producing Q-phase waveform shaping signals each having a conduction width larger than an electric angle of 360/Q degrees, synchronous rectifying control means for controlling the timing of synchronous rectification, and drive command means for controlling conduction of at least one of said second power amplifying means in response to said waveform shaping signals and the output signal of said synchronous rectifying control means.

According to this configuration, since the power transistors of the power amplifiers perform switching operations, the power transistors have very small power loss. Hence, the motor has excellent power efficiency. A smooth change in waveform shaping signals leads to a smooth change in the drive currents to the windings. The synchronous rectifying control means achieves synchronous rectifying operations. As a result, the pulsation of the drive currents caused by the switching of the current paths is greatly reduced, and a high-performing motor having minor vibration and a small power loss can be achieved.

A motor in accordance with another aspect of the present invention comprises: a movable body, plural-phase windings, DC power source means as power supply source, Q pieces (Q is an integer of 3 or greater) of first power amplifying means each including a first power transistor forming a current path between one terminal side of said DC power source means and one terminal of said plural-phase windings, and Q pieces of second power amplifying means each including a second power transistor forming a current path between the other terminal side of said DC power source means and one terminal of said plural-phase windings, conduction control means for controlling conduction of said first power amplifying means and said second power amplifying means, and switching control means for controlling high-frequency switching operations for one or both of the first power transistors of said first power amplifying means and the second power transistors of said second power amplifying means, wherein said conduction control means comprises: waveform shaping signal producing means for producing Q-phase waveform shaping signals each having a conduction width larger than an electric angle of 360/Q degrees; synchronous rectifying control means for controlling the timing of synchronous rectification, switch signal producing means for producing switch signals which are output in a period shorter than a conduction period of said waveform shaping signals in a conduction period larger than the 360/Q degrees of said waveform shaping signals; and drive command means for controlling conduction of at least one of said second power amplifying means in response to said waveform shaping signals, the output signals of said synchronous rectifying control means, and said switch signals.

In this configuration, because of the switching operations of the power transistors of the power amplifying means, the motor has excellent power efficiency. A smooth change in waveform shaping signals realizes a smooth change in the drive currents to the windings. In addition, the switch signals realize a decrease in the on-resistance of the power transistors and synchronous rectifying operations. As a result, the pulsation of the drive currents caused by the switching of the current paths is greatly reduced, and a high-performing motor having minor vibration and a small power loss can be achieved.

These and other configurations and operations will be detailed in the preferred embodiments.

While the novel features of the invention set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DETAILED DESCRIPTION OF THE INVENTION

The embodiments of the present invention will be described as follows with reference to the drawings.

<<Embodiment 1>>

Figure 1:
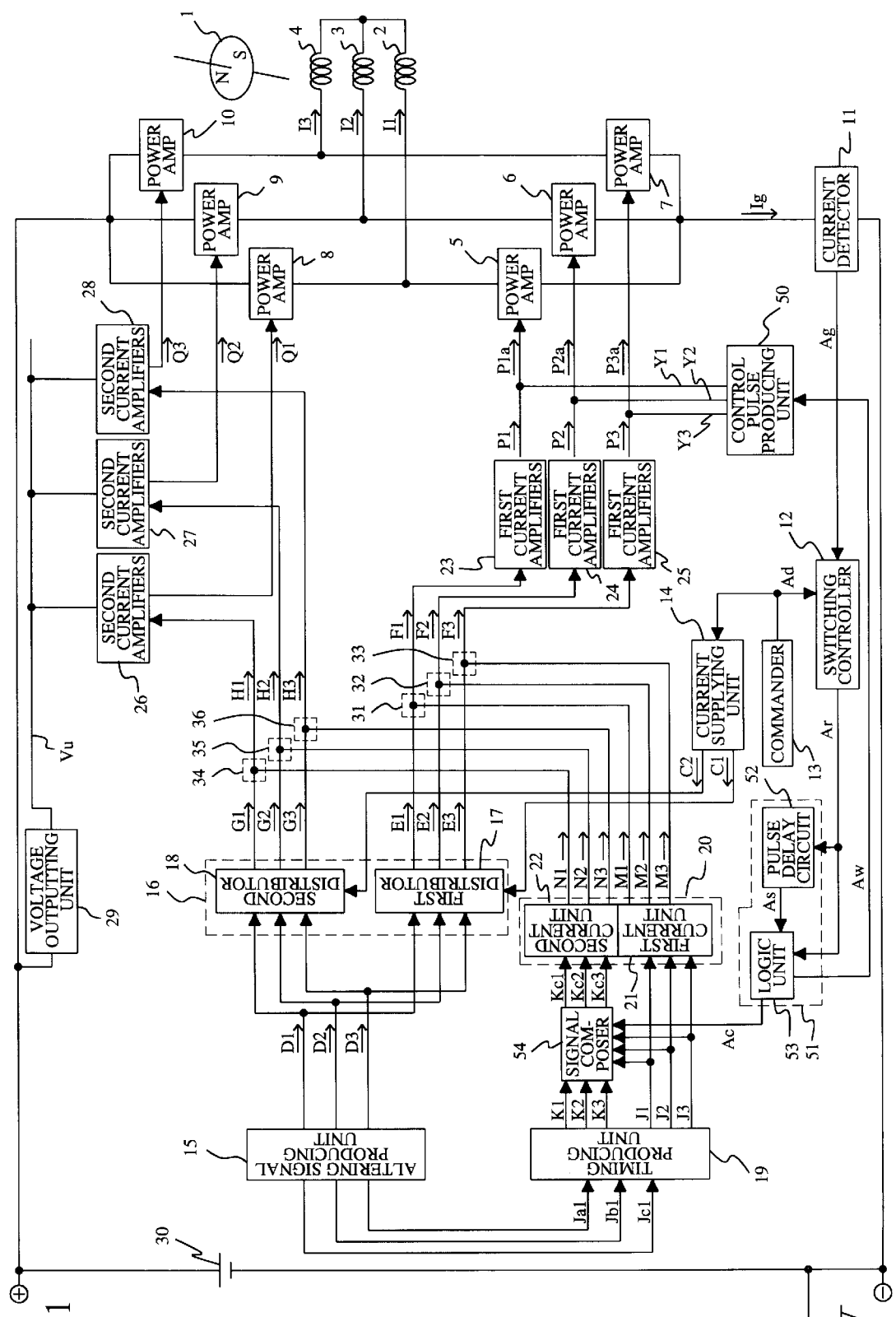
FIG. 1 is a diagram showing the entire configuration in Embodiment 1 of the present invention.

FIGS. 1 through 13 show the motor of Embodiment 1 of the present invention. FIG. 1 shows the entire configuration. A movable body 1 is a rotor provided with a field part which generates field fluxes of plural polarities by means of fluxes generated by, for example, a permanent magnet. Three-phase windings 2, 3, and 4 are mounted on a stator, which is a stationary body, and arranged so as to be electrically shifted from each other by an angle of 120 degrees with regard to the movable body 1. The three-phase windings 2, 3, and 4 generate three-phase fluxes by three-phase drive currents I1, I2, and I3, respectively, and generate a driving force th rough interaction with the movable body 1 so as to provide the driving force to the movable body 1.

A DC power source 30, which is a power supply source, has a ground potential at the negative terminal side (−) and supplies a DC voltage Vcc to the positive terminal side (+). At the negative terminal side of the DC power source 30, the drive current output terminal sides of three first power amplifiers 5, 6, and 7 are common-connected through a current detector 11, whereas the drive current input terminal sides of the first power amplifiers are connected to the power supply terminal sides of the windings 2, 3, and 4, respectively. At the positive terminal side of the DC power source 30, the drive current input terminal sides of three second power amplifiers 8, 9, and 10 are common-connected, whereas the drive current output terminal sides of the second power amplifiers are connected to the power supply terminal sides of the windings 2, 3, and 4, respectively.

Figure 2:
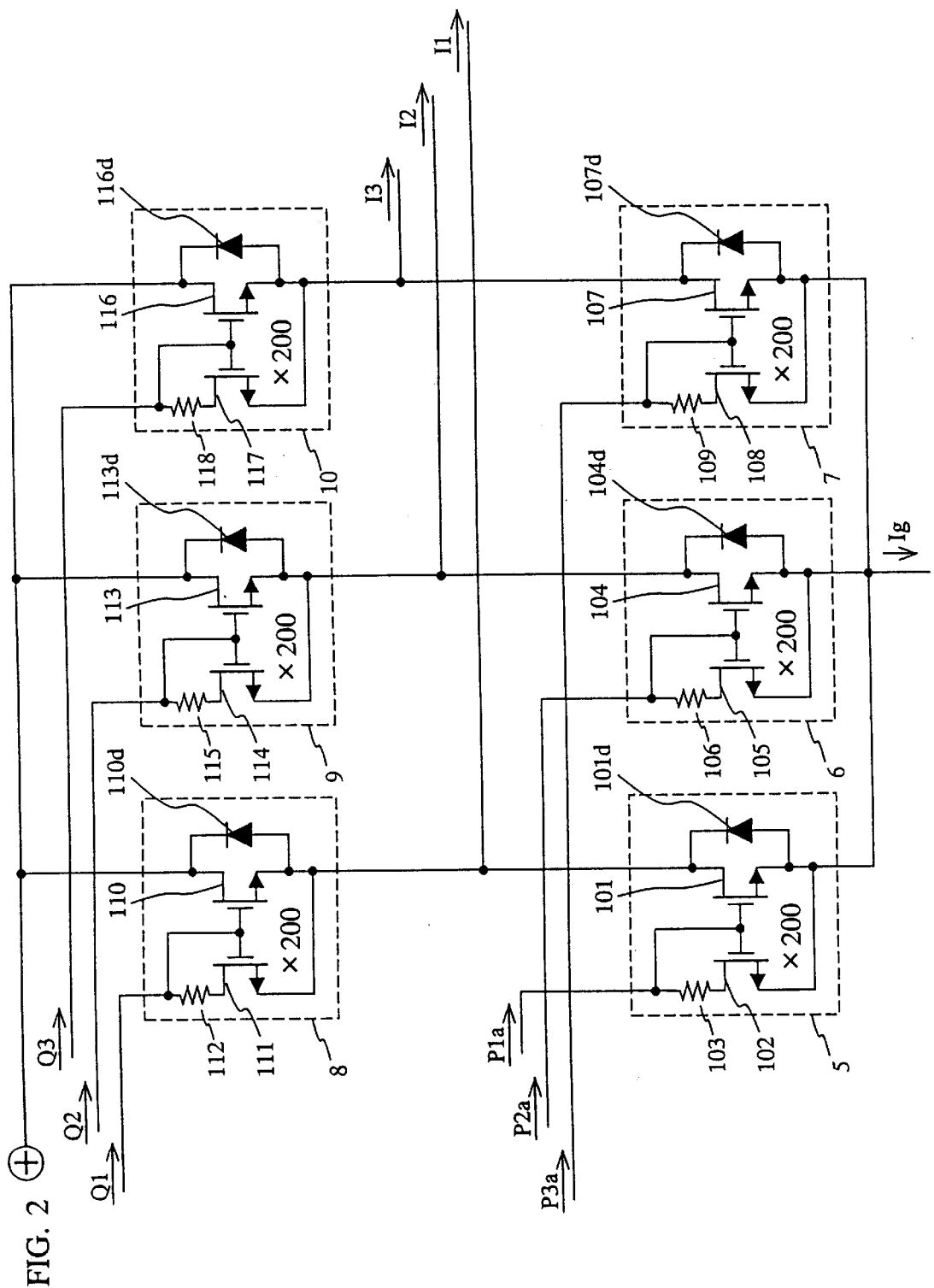
FIG. 2 is a circuit diagram showing first power amplifiers 5, 6, and 7 and second power amplifiers 8, 9, and 10 in Embodiment 1.

FIG. 2 shows the each specific configuration of the first power amplifiers 5, 6, and 7 and the second power amplifiers 8, 9, and 10. The first power amplifier 5 comprises a first NMOS power transistor 101, a first power diode 101d reversely connected to the first NMOS power transistor 101, a NMOS transistor 102, and a resistor 103. Here, the NMOS transistor refers to a field effect transistor with an N-channel MOS structure (this holds true hereinafter). The current output terminal of the first NMOS power transistor 101, the current input terminal of the first power diode 101d, and the current output terminal of the NMOS transistor 102 are common-connected so as to form the drive current output terminal of the first power amplifier 5.

The current input terminal of the first NMOS power transistor 101 and the current output terminal of the first power diode 101d are connected to each other to form the drive current input terminal of the first power amplifier 5. The conduction control terminal of the first NMOS power transistor 101, the conduction control terminal of the NMOS transistor 102, and one side of the resistor 103 are common-connected so as to form the drive command signal input terminal of the first power amplifier 5. The other side of the resistor 103 is connected to the current input terminal of the NMOS transistor 102. Thus the first NMOS power transistor 101, the NMOS transistor 102, and the resistor 103 constitute a first NMOS power current-mirror circuit. The ratio of chip areas of the first NMOS power transistor 101 to the NMOS transistor 102 is set to 200 times. The first NMOS power transistor 101 is composed of a double-diffused NMOS-FET transistor, and uses as a first power diode 101d a parasitic diode element equivalently reverse-connected to the first NMOS power transistor 101.

Similarly, the first power amplifier 6 comprises a first NMOS power transistor 104, a first power diode 104d reversely connected to the first NMOS power transistor 104, a NMOS transistor 105, and a resistor 106. Similarly, the first power amplifier 7 comprises a first NMOS power transistor 107, a first power diode 107d reversely connected to the first NMOS power transistor 107, a NMOS transistor 108, and a resistor 109.

The first power current-mirror circuit of each of the first power amplifiers 5, 6, and 7 shown in FIGS. 1 and 2 amplify input currents P1a, P2a, and P3a entered to the drive command signal input terminals of the first power amplifiers 5, 6, and 7, respectively, and output the amplified currents. The control pulse signals Y1, Y2, and Y3 of the switching controller 12 shown in FIG. 1 control the on/off operations of the first NMOS power transistors 101, 104, and 107 of the first power amplifiers 5, 6, and 7 to achieve high-frequency switching operations. The first power amplifiers 5, 6, and 7 supply the drive voltages to the power supply terminals of the windings 2, 3, and 4 by performing high-frequency switching, so as to supply the negative-side currents of the drive currents I1, I2, and I3 to the windings 2, 3, and 4. These operations will be described below.

At the positive terminal side of the DC power source 30, the drive current input terminal sides of the three second power amplifiers 8, 9, and 10 are common-connected. The second power amplifier 8 shown in FIG. 2 comprises a second NMOS power transistor 110, a second power diode 110d reversely connected to the second NMOS power transistor 110, a NMOS transistor 111, and a resistor 112. The current output terminal of the second NMOS power transistor 110, the current input terminal of the second power diode 110d, and the current output terminal of the NMOS transistor 111 are common-connected to form the drive current output terminal of the second power amplifier 8. The current input terminal of the second NMOS power transistor 110 and the current output terminal of the second power diode 110d are connected to each other to form the drive current input terminal of the second power amplifier 8.

The conduction control terminal of the second NMOS power transistor 110, the conduction control terminal of the NMOS transistor 111, and one side of the resistor 112 are common-connected to form the drive command signal input terminal of the first power amplifier 5. The other side of the resistor 112 is connected to the current input terminal of the NMOS transistor 102. Thus the second NMOS power transistor 110, the NMOS transistor 111, and the resistor 112 constitute a second NMOS power current-mirror circuit. The ratio of chip areas of the second NMOS power transistor 110 to the NMOS transistor 111 is set to 200 times. The second NMOS power transistor 110 is composed of a double-diffused NMOS-FET transistor, and uses as a first power diode 110d a parasitic diode element equivalently reverse-connected to the first NMOS power transistor 110.

Similarly, the second power amplifier 9 comprises a second NMOS power transistor 113, a second power diode 113d reversely connected to the second NMOS power transistor 113, a NMOS transistor 114, and a resistor 115. Similarly, the second power amplifier 10 comprises a second NMOS power transistor 116, a second power diode 116d reversely connected to the second NMOS power transistor 116, a NMOS transistor 117, and a resistor 118.

The second power current-mirror circuit of each of the second power amplifiers 8, 9, and 10 amplify the input currents Q1, Q2, and Q3 to the drive command signal input terminal sides of the second power amplifiers 8, 9, and 10, respectively, and output the amplified currents so as to supply the positive-side currents of the drive currents I1, I2, and I3 to the windings 2, 3, and 4. These operations will be described below.

Figure 3:
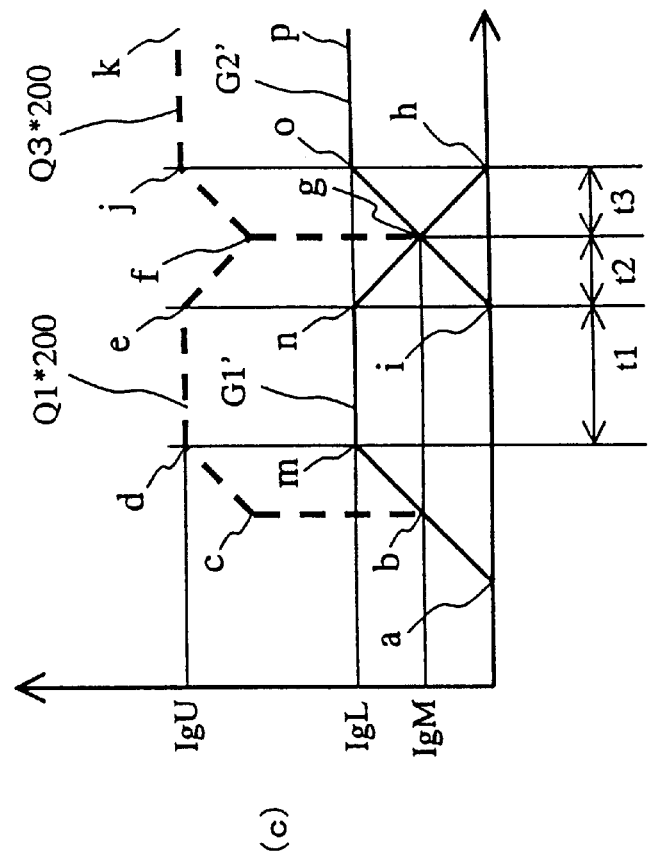
In FIG. 3, a part (a) is a characteristics curve showing the current amplifying characteristics of the first power current-mirror and the second power current-mirror shown in FIG. 1. A part (b) is a circuit diagram for explaining the above-mentioned current amplifying characteristics. A part (C) is a waveform diagram for explaining the drive current waveforms of the drive currents I1, I2, and I3 in Embodiment 1.
Figure 3:
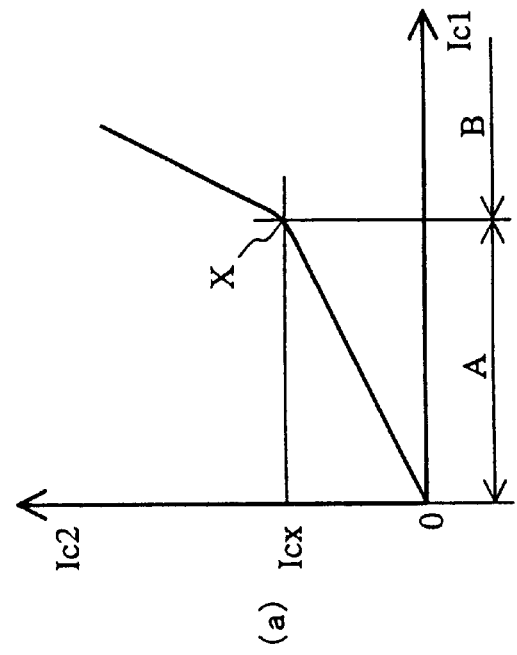
Figure 3:
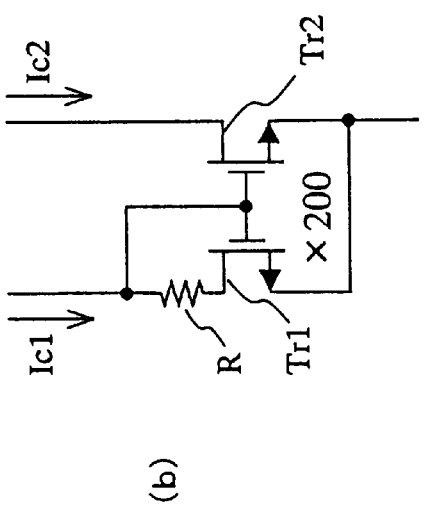

Apart (a) of FIG. 3 is a characteristics curve showing the current amplifying characteristics of the first power current-mirror circuit and the second power current-mirror circuit. The characteristics curve indicates the relation between the input current Ic1 and output current Ic2 shown in the part (b) of FIG. 3. In a range (range A in the part (a) of FIG. 3) where both the transistors Tr1 and Tr2 are in action in an active region, the current amplifying ratio exhibits linear operation of 200 times. As the input current Ic1 increases, the potential difference at both ends of the resistor R grows. And in a range (range B in the part (a) of FIG. 3) where the transistor Tr2 operates in saturation region, the current amplifying ratio exceeds 200 times, making the current amplifying characteristics nonlinear. The output current Icx at the boundary X of range A and range B is ½ or larger than the rated maximum currents of the drive currents I1, I2, and I3 of the windings 2, 3, and 4. The reason for this will be described below.

Thus the first power amplifiers 5, 6, and 7 are connected in parallel to the negative terminal side of the DC power source 30 and the respective power supply terminal sides of the windings 2, 3, and 4, so as to electronically alter the current paths from the negative terminal side of the DC power source 30 to the windings 2, 3, and 4. Similarly, the second power amplifiers 8, 9, and 10 are connected in parallel to the positive terminal side of the DC power source 30 and the respective power supply terminal sides of the windings 2, 3, and 4, so as to electronically alter the current paths from the positive terminal side of the DC power source 30 to the windings 2, 3, and 4.

The command signal Ad output from the commander 13 is entered to a current supplying unit 14 and a switching controller 12. The commander 13 can be composed of a speed control circuit which detects the rotation transfer rate of the movable body 1 and adjusts the detected rate to a fixed value.

Figure 4:
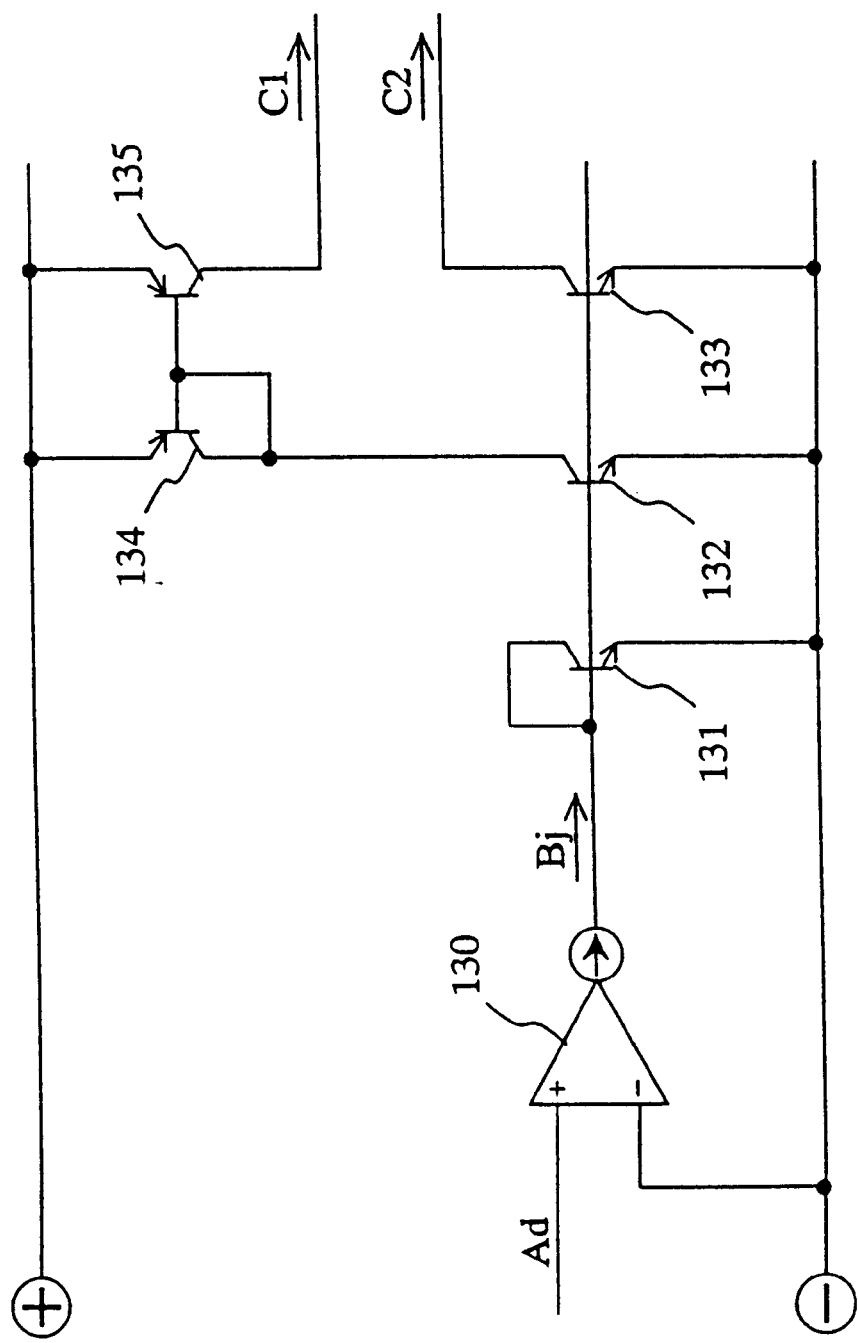
FIG. 4 is a circuit diagram showing a current supplying unit 14 in Embodiment 1.

The current supplying unit 14 outputs a first supply current signal C1 and a second supply current signal C2 which respond to the command signal Ad. FIG. 4 shows the specific configuration of the current supplying unit 14. A voltage-to-current converting circuit 130 outputs a converted current signal Bj in proportion to the command signal Ad. The converted current signal Bj is supplied to the current-mirror circuit composed of the transistors 131, 132, and 133 to produce a current signal in proportion to the converted current signal Bj at the collector sides of the transistors 132 and 133. The collector current of the transistor 133 is output as the second supply current signal C2 (current signal with negative polarity). The collector current of the transistor 132 is supplied to the current-mirror circuit composed of transistors 134 and 135, and the collector current of the transistor 135 is output as the first supply current signal C1 (current signal with positive polarity). Hence, the first supply current signal C1 and the second supply current signal C2 become current signals in proportion to the command signal Ad.

Figure 5:
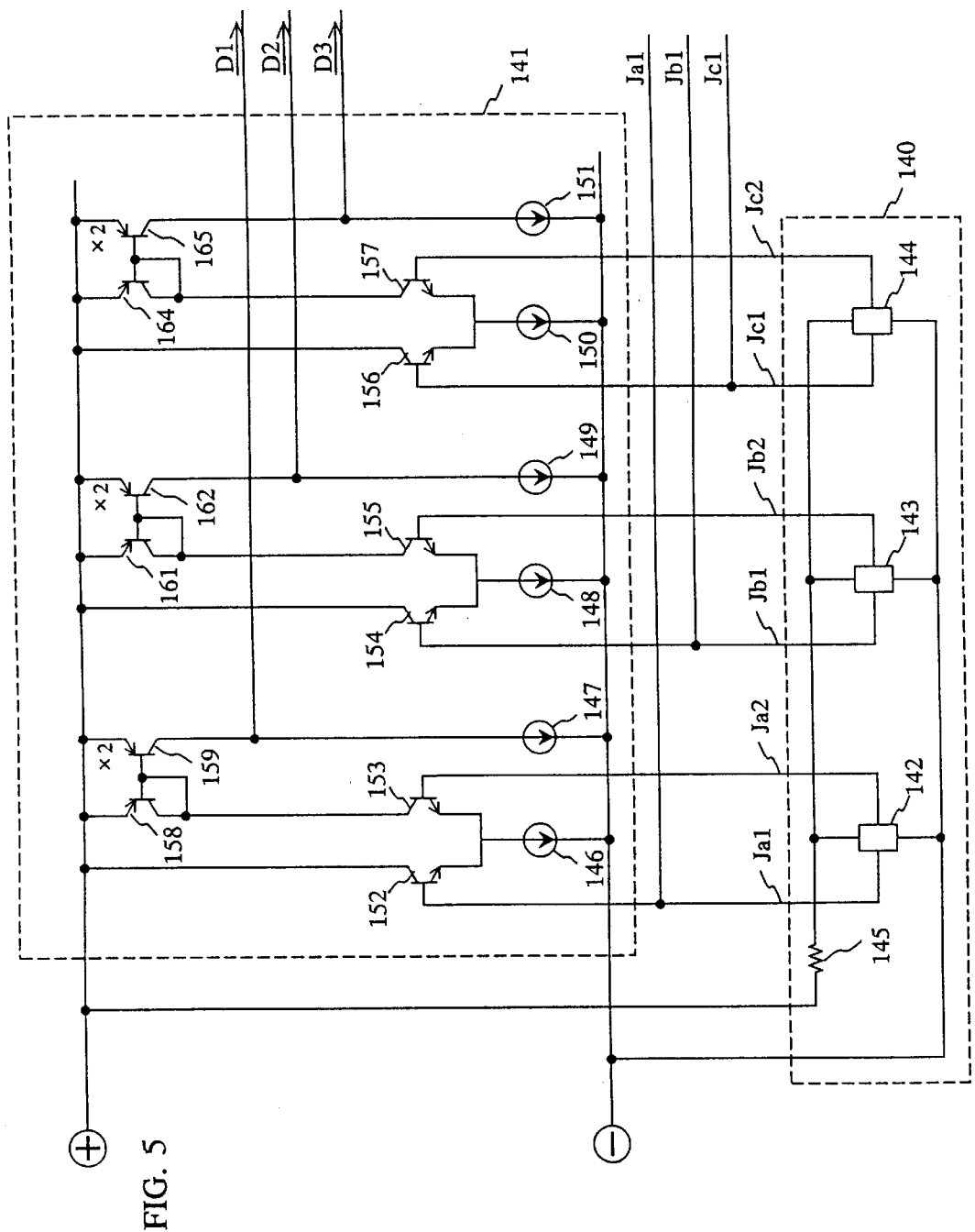
FIG. 5 is a circuit diagram showing a altering signal producing unit 15 in Embodiment 1.

An altering signal producing unit 15 outputs smoothly varying three-phase altering signals D1, D2, and D3 to supply three-phase drive currents to the three-phase windings 2, 3, and 4. FIG. 5 shows the specific configuration of the altering signal producing unit 15. In this case, the altering signal producing unit 15 is composed of a position detection part 140 and an altering signal producing part 141. The position detection part 140 comprises position detecting elements 142, 143, and 144 made of magnet-to-electric converting elements (like Hall elements) which detect magnetic fluxes generated by the movable body 1. The position detection parts 142, 143, and 144 have an electrical phase difference each other by an angle of 120 degrees. The position detecting elements 142, 143, and 144 output two-phase position detecting signals Ja1 and Ja2, Jb1 and Jb2, and Jc1 and Jc2, respectively, which change smoothly in a sine wave in accordance with the rotation of the movable body 1. Here, Ja1 and Ja2 are in reversed phase relationships (electrically separated from each other by 180 degrees). Similarly, Jb1 and Jb2, and Jc1 and Jc2 are in reversed phase relationships. The signals in reversed phase relationships are not counted in the number of phases. Thus the position detection part 140 produces the three-phase position detecting signals Ja1, Jb1, and Jc1, and Ja2, Jb2, and Jc2, which change smoothly to be sinusoidal while being electrically separated from each other by an angle of 120 degrees. The three-phase position detecting signals Ja1, Jb1, and Jc1 are output to the superimposed timing producing unit 19.

The altering signal producing part 141 produces three-phase sinusoidal altering signals D1, D2, and D3 which smoothly change in response to the three-phase position detecting signals. Constant current sources 146, 147, 148, 149, 150, and 151 each supply a constant current. Transistors 152 and 153 divide the current of the constant current source 146 to the respective collector sides, responding to the differential voltage between the first-phase position detecting signals Ja1 and Ja2. The collector current of the transistor 153 is supplied to the current-mirror circuit composed of the transistors 158 and 159. The transistor 159 outputs, through its collector, a collector current twice as much as the collector current of the transistor 153 to be compared with the current of the constant current source 147, and the difference between these currents is output as the first-phase altering signal D1. Consequently, the altering signal D1 smoothly varies responding to the position detecting signal Ja1, and the current flows out during the period of an electrical angle of 180 degrees (the current with positive polarity) and flows in the subsequent 180-degree period (the current with negative polarity). Similarly, the second-phase altering signal D2 smoothly varies responding to the position detecting signal Jb1, and the current flows out during the period of an electrical angle of 180 degrees (the current with positive polarity) and flows in during the subsequent 180-degree period (the current with negative polarity). Similarly, the third-phase altering signal D3 smoothly varies responding to the position detecting signal Jc1, and the current flows out during the period of an electrical angle of 180 degrees (the current with positive polarity) and flows in during the subsequent 180-degree period (the current with negative polarity).

Figure 6:
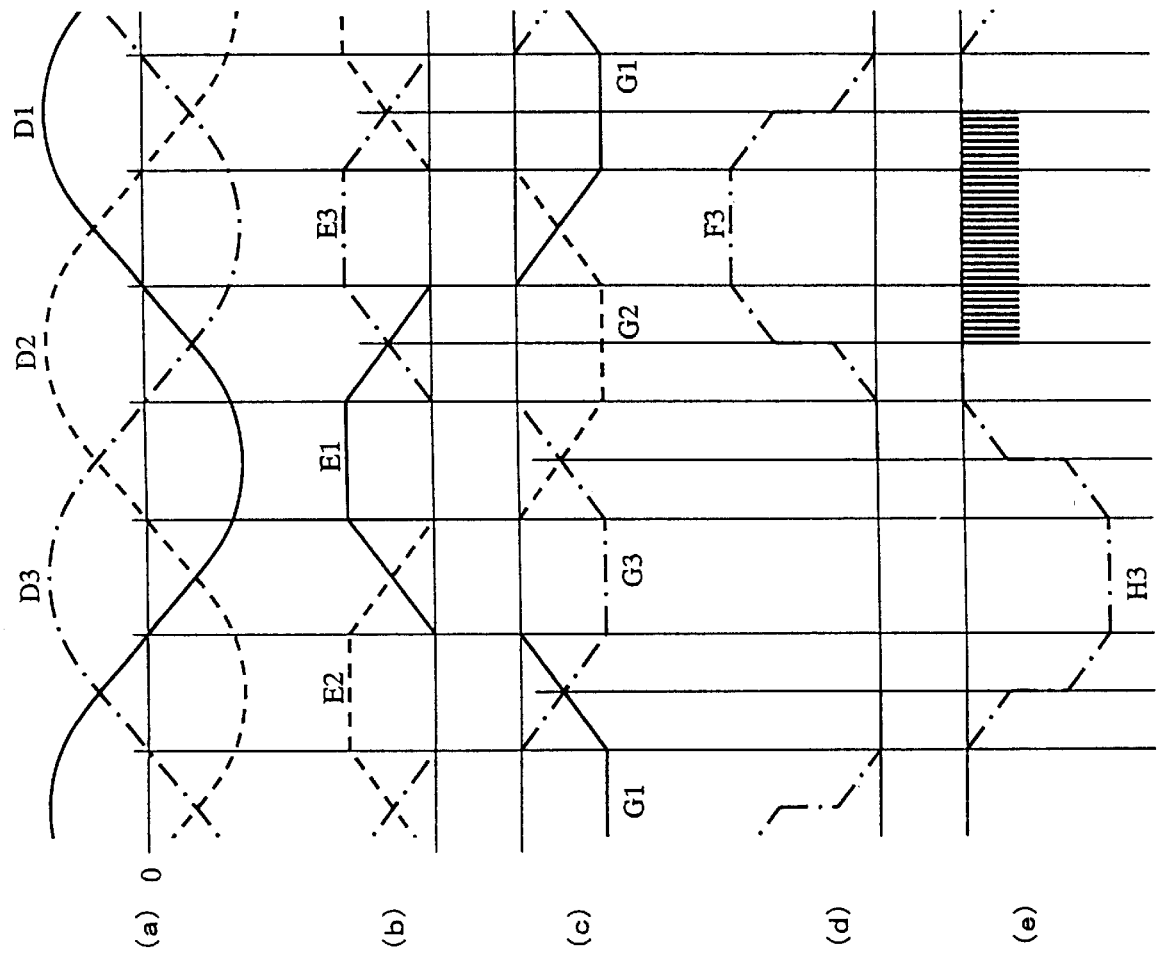
In FIG. 6, a part (a) is a waveform diagram showing altering signals D1, D2, and D3 in Embodiment 1. A part (b) is a waveform diagram showing first distributed current signals E1, E2, and E3 in Embodiment 1. A part (c) is a waveform diagram showing second distributed current signals G1, G2, and G3 in Embodiment 1. A part (d) is a waveform diagram showing a first composed current signal F3 in Embodiment 1. A part (e) is a waveform diagram showing a second composed current signal H3 in Embodiment 1.
Figure 9:
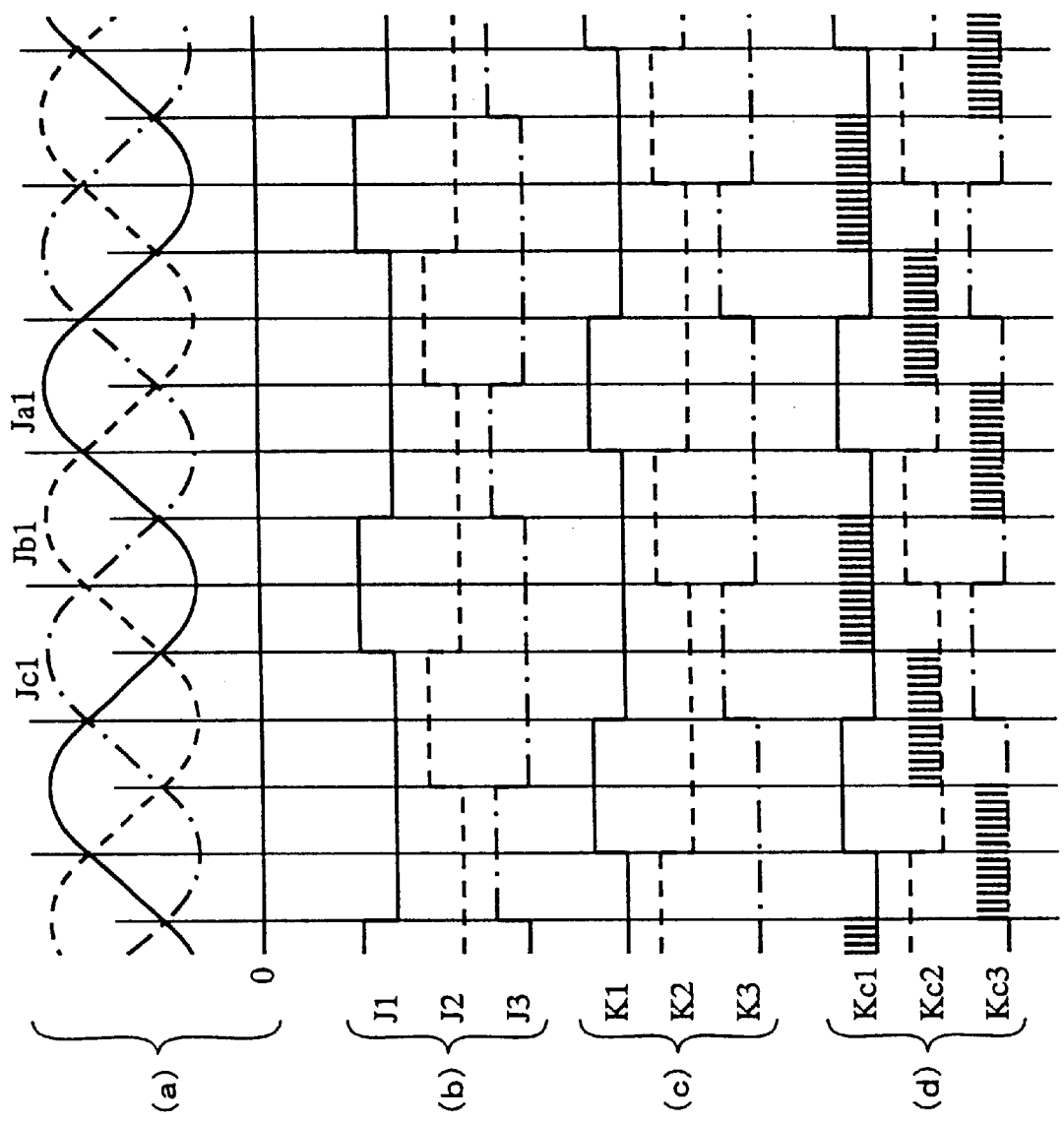
In FIG. 9, a part (a) is a waveform diagram showing position detecting signals Ja1, Jb1, and Jc1 in Embodiment 1. A part (b) is a waveform diagram showing first superimposed timing signals J1, J2, and J3 in Embodiment 1. A part (c) is a waveform diagram showing second superimposed timing signals K1, K2, and K3 in Embodiment 1. A part (d) is a waveform diagram showing composed superimposed signals Kc1, Kc2, and Kc3 in Embodiment 1.

Thus the three-phase altering signals D1, D2, and D3 constitute sinusoidal three-phase current signals having predetermined phase differences. A part (a) of FIG. 6 shows the waveforms of the three-phase altering signals D1, D2, and D3. A part (a) of FIG. 9 shows the waveforms of the altering signals Ja1, Ja2, and Ja3. The horizontal coordinates of FIG. 6 and FIG. 9 indicate the rotation position of the movable body 1.

A distribution producing unit 16 comprises a first distributor 17 and a second distributor 18. The first distributor 17 distributes the first supply current signal C1 of the current supplying unit 14 responding to the three-phase altering signals D1, D2, and D3 of the altering signal producing unit 15 to produce three-phase first distributed current signals E1, E2, and E3, which vary smoothly. The second distributor 18 distributes the second supply current signal C2 of the current supplying unit 14 responding to the altering signals D1, D2, and D3 of the altering signal producing unit 15 to produce three-phase second distributed current signals G1, G2, and G3, which vary smoothly. The first distributed current signals E1, E2, and E3 and the second distributed current signals G1, G2, and G3 have a conduction width of an electric angle of 180 degrees and constitute a waveform shaping signal which determines the drive current waveforms of the drive currents I1, I2, and I3 of the windings 2, 3, and 4. The drive current waveforms will be described below.

Figure 7:
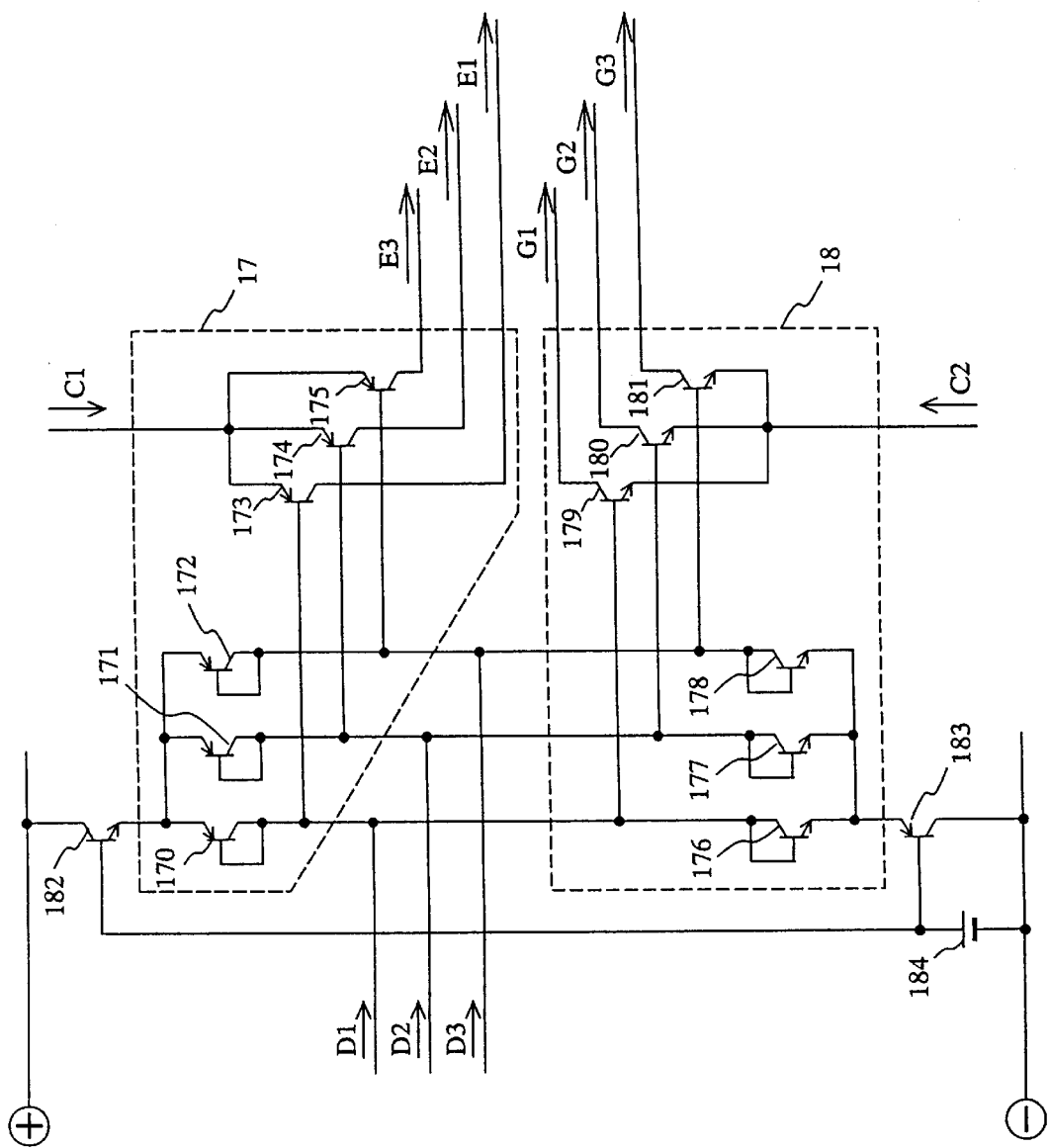
FIG. 7 is a circuit diagram showing a distribution producing unit 16 in Embodiment 1.

FIG. 7 is a circuit diagram showing the specific configuration of the distribution producing unit 16. The first distributor 17 comprises three first input transistors 170, 171, and 172 having common-connected current input terminals, and three first distributing transistors 173, 174, and 175, which output the three-phase first distributed current signals E1, E2, and E3 (current signals with positive polarity) from their current output terminal sides. The conduction control terminals and current output terminals of the first input transistors 170, 171, and 172 are connected to the respective altering signal input-output terminal sides to which the three-phase altering signals D1, D2, and D3 of the altering signal producing unit 15 are supplied. The respective conduction control terminals of the first distributing transistors 173, 174, and 175 are connected to the respective altering signal input-output terminal sides, and the first supply current signal C1 (current signal with positive polarity) of the current supplying unit 14 is entered to the commonly-connected current input terminal sides. The first input transistors 170, 171, and 172 and the first distributing transistors 173, 174, and 175 are made of the same type of PNP-type bipolar transistor.

Similar to the first distributor 17, the second distributor 18 comprises three second input transistors 176, 177, and 178 having common-connected current output terminals and three second distributing transistors 179, 180, and 181, which output three-phase second distributed current signal G1, G2, and G3 (current signals with negative polarity) from their current input terminal sides. The conduction control terminals and current input terminals of the second input transistors 176, 177, and 178 are connected to the respective altering signal input-output terminal sides to which the three-phase altering signals D1, D2, and D3 of the altering signal producing unit 15 are supplied. The respective conduction control terminals of the second distributing transistors 179, 180, and 181 are connected to the respective altering signal input-output terminal sides, and the second supply current signal C2 (current signal with negative polarity) of the current supplying unit 14 is entered to the commonly-connected current output terminal sides. The second input transistors 176, 177, and 178 and the second distributing transistors 179, 180, and 181 are made of the same type of NPN-type bipolar transistor.

A reference voltage source 184 and transistors 182 and 183 constitute a predetermined voltage supplying part so as to supply DC voltages to the common-connected terminals of the first input transistors 170, 171, and 172 and to the common-connected terminals of the second input transistors 176, 177, and 178. As a result, when the altering signal D1 is a positive current, it is supplied to the second input transistor 176 so as not to supply current to the first input transistor 170. When the altering signal D1 is a negative current, it is supplied to the first input transistor 170 so as not to supply current to the second input transistor 176. In other words, the first input transistor 170 and the second input transistor 176 are complementarily supplied with a current in accordance with the polarity of the altering signal D1. This prevents a current from being supplied to the first input transistor 170 and the second input transistor 176 concurrently. Similarly, when the altering signal D2 is a positive current, it is supplied to the second input transistor 177, whereas when the signal is a negative current, it is supplied to the first input transistor 171. When the altering signal D3 is a positive current, it is supplied to the second input transistor 178, whereas when the signal is a negative current, it is supplied to the first input transistor 172.

The first distributing transistors 173, 174, and 175 of the first distributor 17 distribute the first supply current signal C1 (current signal with positive polarity) to the respective current output terminal sides, responding to the three-phase currents coming from the first input transistors 170, 171, and 172, thereby producing the three-phase first distributed current signals E1, E2, and E3 (current signals with positive polarity). Consequently the three-phase first distributed current signals E1, E2, and E3 smoothly vary responding to the negative currents of the three-phase altering signals D1, D2, and D3. The total current value of the three-phase first distributed current signals E1, E2, and E3 is equal to that of the first supply current signal C1. A part (b) of FIG. 6 shows the waveforms of the three-phase second distributed current signals E1, E2, and E3. The first distributor 17 distributes the first supply current signal C1 to one phase or two phases alternately as the movable body 1 moves and outputs the three-phase first distributed current signals E1, E2, and E3 having an electrical phase difference each other by an angle of 120 degrees.

Similarly, the second distributing transistors 179, 180, and 181 of the second distributor 18 distribute the second supply current signal C2 (current signal with negative polarity) to the respective current signal input terminal sides, responding to the three-phase currents coming from the second input transistors 176, 177, and 178, there by producing the three-phase second distributed current signals G1, G2, and G3 (current signals with negative polarity). Consequently, the three-phase second distributed current signals G1, G2, and G3 smoothly vary responding to the positive currents of the three-phase altering signals D1, D2, and D3. The total current of the three-phase second distributed current signals G1, G2, and G3 is equal to the current value of the second supply current signal C2. A part (c) of FIG. 6 shows the waveforms of the three-phase second distributed current signals G1, G2, and G3. The second distributor 18 distributes the second supply current signal C2 to one phase or two phases alternately as the movable body 1 moves, and outputs the three-phase second distributed current signals G1, G2, and G3 having an electrical phase difference each other by an angle of 120 degrees.

Figure 8:
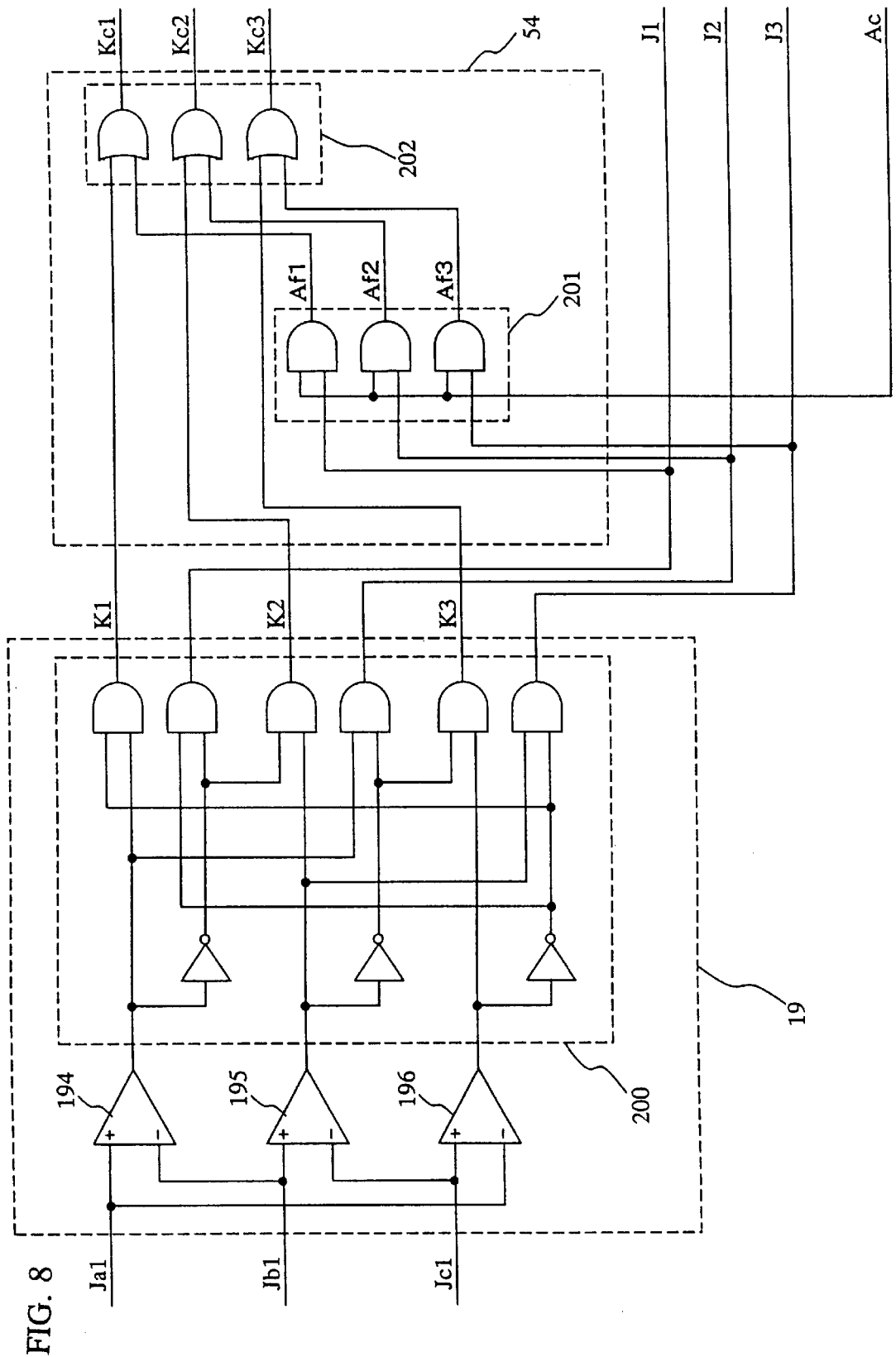
FIG. 8 is a circuit diagram showing a superimposed timing producing unit 19 and a superimposed signal composer 54 in Embodiment 1.

The superimposed timing producing unit 19 enters three-phase position detecting signals Ja1, Jb1, and Jc1 of the altering signal producing unit 15 so as to produce first superimposed timing signals J1, J2, and J3, and second superimposed timing signals K1, K2, and K3. FIG. 8 shows the specific configuration of the superimposed timing producing unit 19. The three-phase position detecting signals Ja1, Jb1, and Jc1 are entered into comparison circuits 194, 195, and 196. The comparison circuits 194, 195, and 196 each compares two phases out of the three-phase position detecting signals Ja1, Jb1, and Jc1, and outputs the comparison results to a logic part 200. The logic part 200 produces first superimposed timing signals J1, J2, and J3, and second superimposed timing signals K1, K2, and K3 which have the two states of an H level (a high potential state) and an L level (low potential state). A part (b) of FIG. 9 shows the waveforms of the first superimposed timing signals J1, J2, and J3. A part (c) of FIG. 9 shows the waveforms of the second superimposed timing signals K1, K2, and K3. Thus the first superimposed timing signals J1, J2, and J3 and the second superimposed timing signals K1, K2, and K3, which have an H level period of an electric angle of 120 degrees, are three-phase signals having a phase difference each other by an angle of 120 degrees.

A current detector 11 shown in FIG. 1 detects a conduction current pulse Ig supplied from the DC power source 30 and outputs a current detecting pulse signal Ag responding to the conduction current pulse Ig. A switching controller 12 compares a command signal Ad and the current detecting pulse signal Ag, and outputs a switching control signal Ar responding to the comparison results. A synchronous rectifying controller 51 produces a synchronous pulse signal Ac and a switching pulse signal Aw from the switching control signal Ar.

Figure 10:
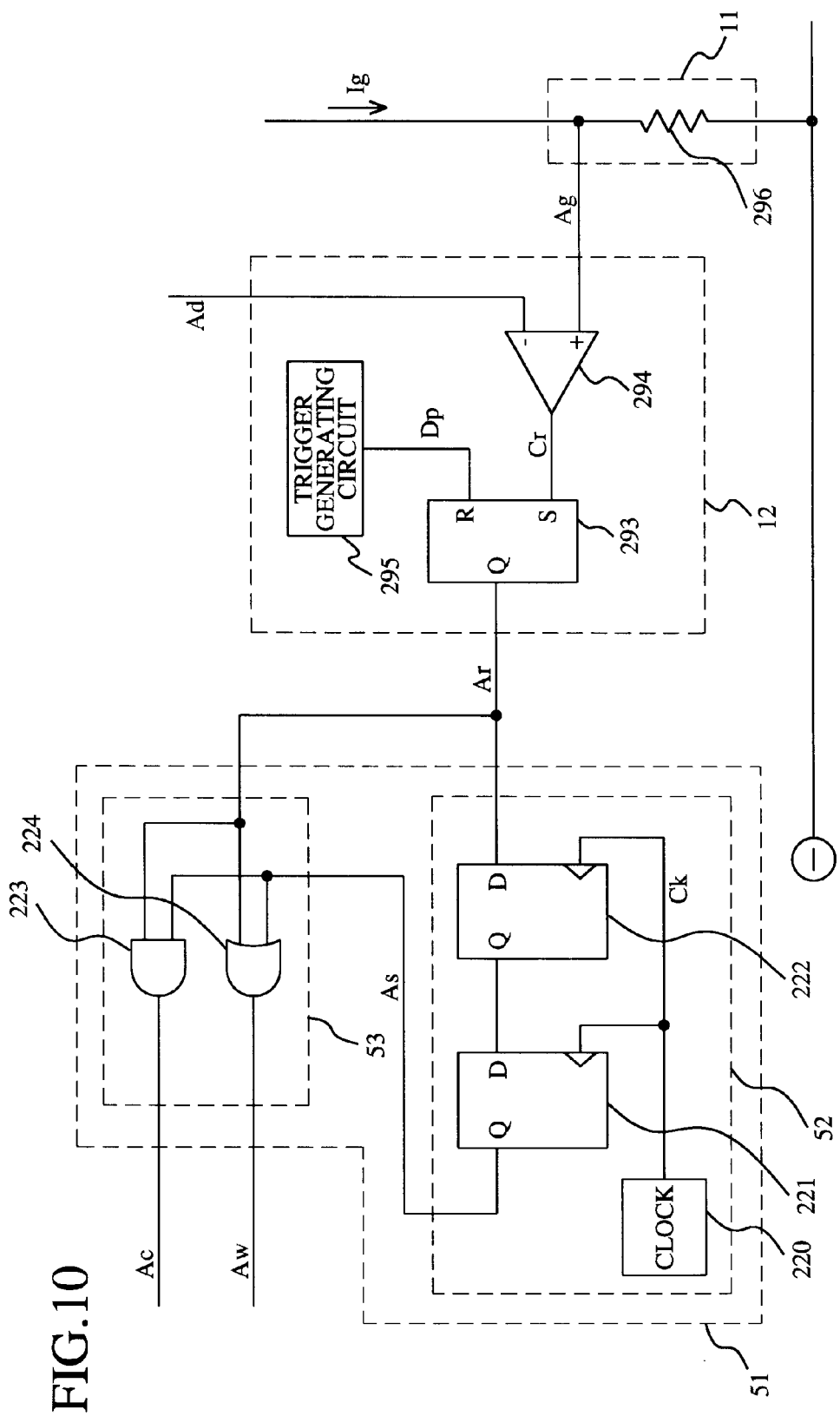
FIG. 10 is a circuit diagram showing a current detector 11, a switching controller 12, and a synchronous rectifying controller 51 in Embodiment 1.

FIG. 10 shows the specific configuration of the current detector 11, the switching controller 12, and the synchronous rectifying controller 51. The current detector 11 is composed of a resistor 296 for current detection which is interposed with the negative current supply path of the DC power source 30. The current detector 11 detects the conduction current pulse Ig of the DC power source 30 from a voltage decrease in the resistor 296 and outputs the current detecting pulse signal Ag.

Figure 13:
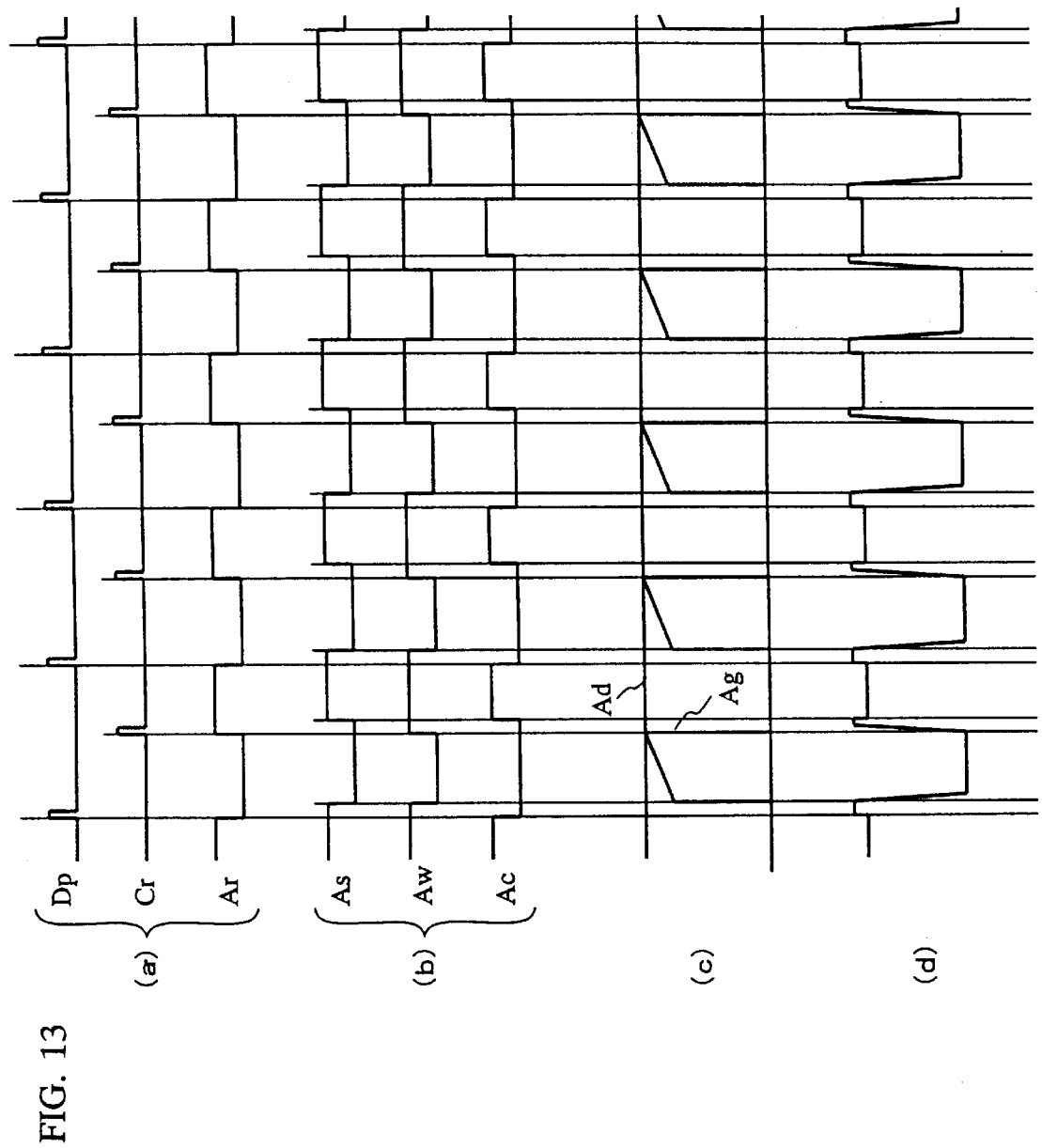
In FIG. 13, a part (a) is a waveform diagram showing a trigger pulse signal Dp in Embodiment 1. A part (b) is a waveform showing a delay pulse signal As, a switching pulse signal Aw, and a synchronous pulse signal Ac in Embodiment 1. A part (c) is a waveform diagram showing a command signal Ad and a current detecting pulse signal Ag in Embodiment 1. A part (d) is a voltage waveform diagram showing the drive current supplying terminal having the phase performing the synchronous rectification of the windings 2, 3, and 4 in Embodiment 1.

A comparison circuit 294 of the switching controller 12 compares the command signal Ad with the current detecting pulse signal Ag, and produces a compared output signal Cr. A trigger generating circuit 295 outputs a trigger pulse signal Dp having a frequency of about 100 kHz to trigger a state holding circuit 293 repeatedly at predetermined time intervals. The state holding circuit 293 changes the state of the switching control signal Ar to the L level (low potential state) at a rising edge of the trigger pulse signal Dp, and to the H level (high potential state) at a rising edge of the compared output signal Cr. A part (a) of FIG. 13 shows the waveforms of the trigger pulse signal Dp, the compared output signal Cr, and the switching control signal Ar. A part (c) of FIG. 13 shows the waveform of the current detecting pulse signal Ag.

As shown in FIG. 10 the synchronous rectifying controller 51 comprises a pulse delay circuit 52 and a logic part 53. The pulse delay circuit 52 consists of a reference clock 220 and flip flop circuits 221 and 222. The reference clock 220 outputs a reference pulse signal Ck having a frequency of about 1 MHz. The pulse delay circuit 52 enters the switching control signal Ar and outputs a delay pulse signal As, which is delayed by more than one period of the reference clock signal Ck. The switching control circuit Ar and the delay pulse signal As are entered into an AND circuit 223 and an OR circuit 224 of the logic part 53. The output of the AND circuit 223 is output as a synchronous pulse signal Ac to the superimposed signal composer 54. The output of the OR circuit 224 is output as a switching pulse signal Aw to a control pulse producing unit 50. A part (b) of FIG. 13 shows the waveforms of the delay pulse signal As, the synchronous pulse signal Ac, and the switching pulse signal Aw.

The superimposed signal composer 54 enters the first superimposed timing signals J1, J2, and J3, the second superimposed timing signals K1, K2, and K3, and the synchronous pulse signal Ac, and then outputs composed superimposed signals S1, S2, and S3, which are produced by composing the second superimposed timing signals K1, K2, and K3 and the synchronous pulse signal Ac. FIG. 8 is a circuit diagram showing the specific configuration of the superimposed signal composer 54. The superimposed signal composer 54 is composed of a synchronous period setting part 201 and a superimposition composing part 202.

The synchronous period setting part 201 enters the first superimposed timing signals J1, J2, and J3 and the synchronous pulse signal Ac, and outputs the three-phase period limited synchronous pulse signals Af1, Af2, and Af3 having a limited output period of the synchronous pulse signal AC. The synchronous period setting part 201 outputs as the period-limited synchronous pulse signals Af1, Af2, and Af3 the synchronous pulse signal Ac only when the first superimposed timing signals J1, J2, and J3 are at the H level (120-degree period). The superimposition composing part 202 composes the second superimposed timing signals K1, K2, and K3 with the period-limited synchronous pulse signals Af1, Af2, and Af3, and outputs three-phase composed superimposed signals Kc1, Kc2, and Kc3. A part (d) of FIG. 9 shows the waveforms of the composed superimposed signals Kc1, Kc2, and Kc3.

The superimposition supplying unit 20, which is composed of a first superimposed current supplying unit 21 and a second superimposed current supplying unit 22, outputs three-phase first superimposed current signals M1, M2, and M3 responding to the three-phase first superimposed timing signals J1, J2, and J3, respectively, and also outputs three-phase second superimposed current signals N1, N2, and N3 responding to the composed superimposed signals Kc1, Kc2, and Kc3, respectively.

Figure 11:
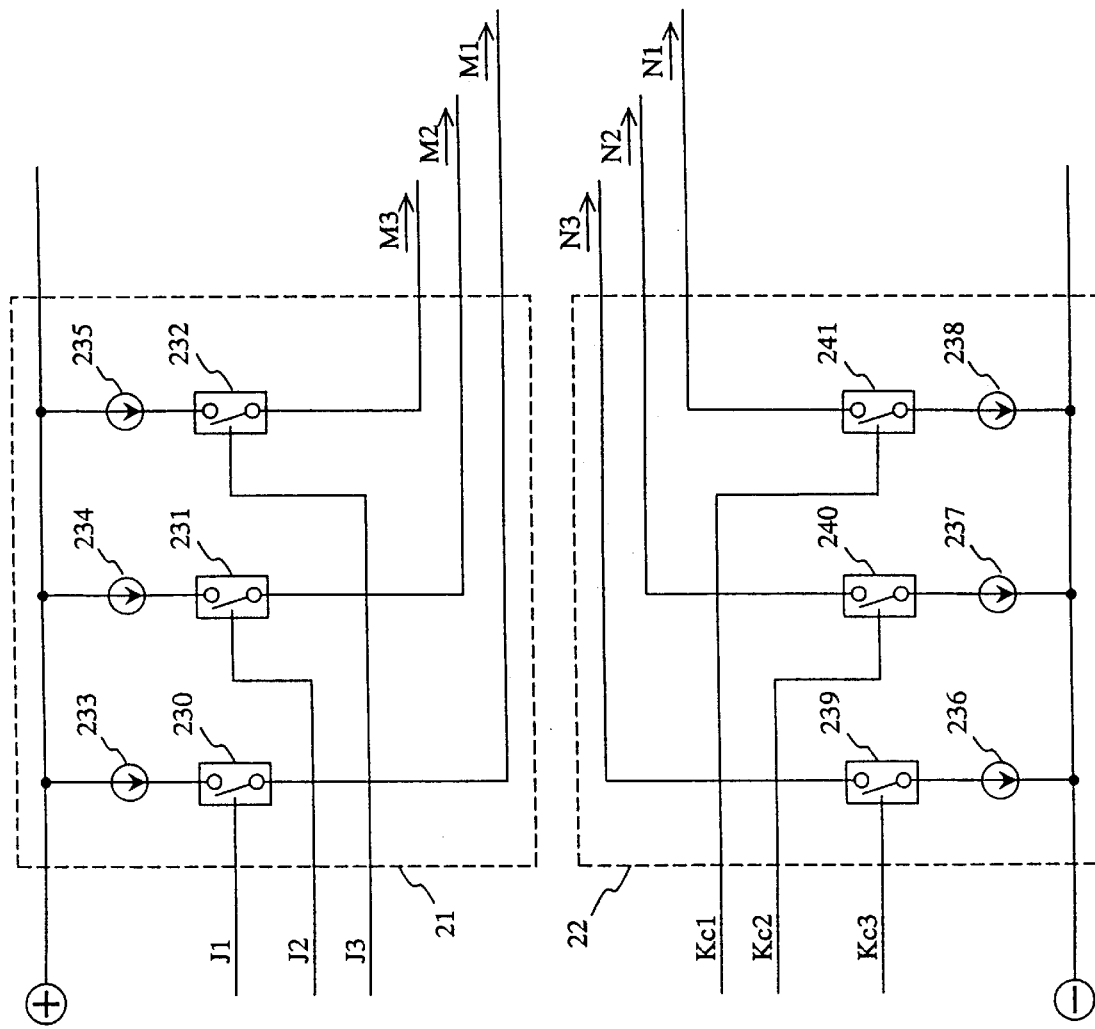
FIG. 11 is a circuit diagram showing a superimposed current supplying unit 20 in Embodiment 1.

FIG. 11 is a circuit diagram showing the specific configuration of the superimposed current supplying unit 20. The first superimposed current supplying unit 21 comprises constant current sources 233, 234, and 235 and switch circuits 230, 231, and 232.

The switch circuits 230, 231, and 232 each have two connection terminals and a connection control terminal, and when an H level signal is entered to the connection control terminal, the two connection terminals are closed (connected state), and when an L level signal is entered to the connection control terminal, the two connection terminals are opened (released state). The connection control terminals of the switch circuits 230, 231, and 232 enter the first superimposed timing signals J1, J2, and J3, respectively. One of the two connection terminals of each of the switch circuits 230, 231, and 232 outputs the first superimposed current signals M1, M2, and M3, respectively. In other words, when the first superimposed timing signal J1 is at the H level, the first superimposed current signal M1 is supplied with a current (current signal with positive polarity) from the constant current source 233. When the first superimposed timing signal J1 is at the L level, no current is supplied to the first superimposed current signal M1, making the current value zero. The similar relation holds true between the first superimposed timing signal J2 and the first superimposed current signal M2, and between the first superimposed timing signal J3 and the first superimposed current signal M3.

A second superimposed current supplying unit 22 comprises constant current sources 236, 237, and 238 and switch circuits 239, 240, and 241. The switch circuits 239, 240, and 241 each have two connection terminals and a connection control terminal. When an H level signal is entered to the connection control terminal, the two connection terminals are closed (connected state), and when an L level signal is entered to the connection control terminal, the two connection terminals are opened (released state). The connection control terminals of the switch circuits 239, 240, and 241 enter the composed superimposed signals Kc1, Kc2, and Kc3, respectively.

The second superimposed current signals N1, N2, and N3 are output from one of the two connection terminals of each of the switch circuits 239, 240, and 241. In other words, when the composed superimposed signal Kc1 is at the H level, the second superimposed current signal N1 is supplied with a current (current signal with negative polarity) from the constant current source 236. When the composed superimposed signal Kc1 is at the L level, no current is supplied to the second superimposed current signal N1, making the current value zero. The similar relation holds true between the composed superimposed signal Kc2 and the second superimposed current signal N2, and between the composed superimposed signal Kc3 and the second superimposed current signal N3.

In FIG. 1, the three-phase first superimposed current signals M1, M2, and M3 are connected to three-phase first distributed current signals E1, E2, and E3 at connection points 31, 32, and 33, respectively. The three-phase second superimposed current signals N1, N2, and N3 are connected to three-phase second distributed current signals G1, G2, and G3 at connection points 34 35, and 36, respectively. Since both the first superimposed current signals M1, M2, and M3 and first distributed current signals E1, E2, and E3 are with positive polarity, the respective current signals are combined at connection points 34 35, and 36, respectively, to form three-phase first composed current signals F1, F2, and F3 (current signals with positive polarity). Thus the connection points 31, 32, and 33 function as first composers 31, 32, and 33 for composing the first superimposed current signals M1, M2, and M3 and the first distributed current signals E1, E2, and E3, respectively. Similarly, since both the second superimposed current signals N1, N2, and N3 and the second distributed current signals G1, G2, and G3 have negative polarity, the respective current signals are combined at connection points 34, 35, and 36, respectively, to form three-phase second composed current signals H1, H2, and H3 (current signals with negative polarity). Thus the connection points 34, 35, and 36 function as second composers 34, 35, and 36 for composing the second superimposed current signals N1, N2, a nd N3 and the second distributed current signals G1, G2, and G3, respectively.

The part (b) of FIG. 6 shows the waveforms of the first distributed current signals E1, E2, and E3, and the part (c) of FIG. 6 shows the waveforms of the second distributed current signals G1, G2, and G3. A part (d) of FIG. 6 shows the waveform of the first composed current signal F3, and a part (e) of FIG. 6 shows the waveform of the second composed current signal H3. Thus, the first composed current signal F3 and the second composed current signal H3 have a phase difference each other by 180 degrees, and change complementarily. The same relation as between the first composed current signal F3 and the second composed current signal H3 exists between the first composed current signal F1 and the second composed current signal H1, and also between the first composed current signal F2 and the second composed current signal H2.

The three-phase first composed current signals F1, F2, and F3 are entered into respective first current amplifiers 23, 24, and 25. The first current amplifiers 23, 24, and 25 current-amplify the three-phase first composed current signals F1, F2, and F3 by a certain ratio to produce three-phase first amplified current signals P1, P2, and P3, respectively. The three-phase second composed current signal H1, H2, and H3 are entered into respective second current amplifiers 26, 27, and 28. The second current amplifiers 26, 27, and 28 current-amplify the three-phase second composed current signals G1, G2, and G3 by a certain ratio to produce three-phase second amplified current signals Q1, Q2, and Q3, respectively, which are supplied to the second power amplifiers 8, 9, and 10, respectively, via the high potential point Vu of the high-voltage outputting unit 29. The high voltage outputting unit 29 has a function of producing a output potential higher than an input potential like a charge pump. Supplying the three-phase second amplified current signals Q1, Q2, and Q3 from the high potential point Vu of the high voltage outputting unit 29 to the second power amplifiers 8, 9, and 10 makes it possible for the second NMOS power transistors 110, 113, and 116 shown in FIG. 2 to perform saturation operations.

Figure 12:
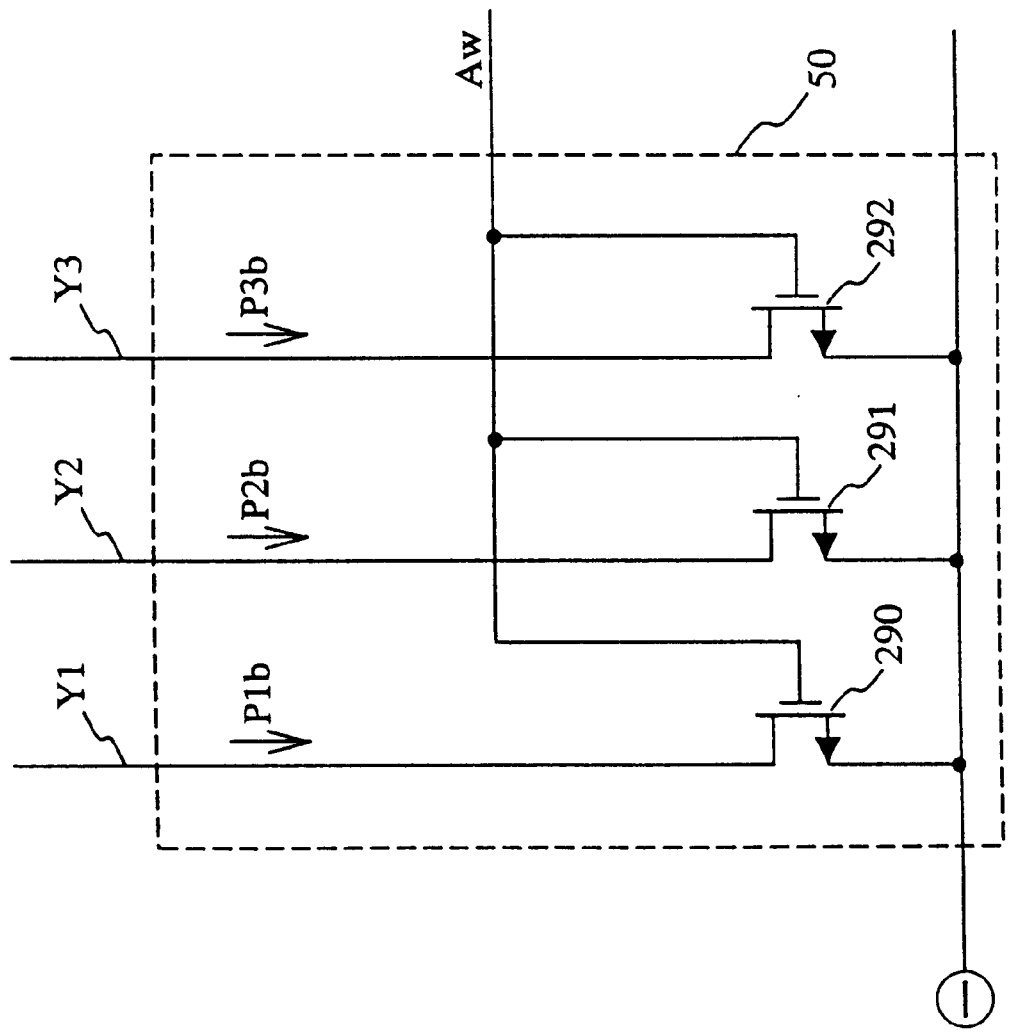
FIG. 12 is a circuit diagram showing a control pulse producing unit 50 in Embodiment 1.

The control pulse producing unit 50 controls the control pulse signals Y1, Y2, and Y3, responding to the switching pulse signal Aw so as to control the switching operations of the first NMOS power transistors 101, 104, and 107 of the first power amplifiers 5, 6, and 7. FIG. 12 is a circuit diagram showing the specific configuration of the control pulse signal producing unit 50. The conduction control terminals of NMOS transistors 290, 291, and 292 are common-connected to each other so as to enter the switching pulse signal Aw. The current output terminals of the NMOS transistors 290, 291, and 292 are common-connected to the negative terminal side of the DC power source 30. The current input terminals of the NMOS transistors 290, 291, and 292 become the output terminals of the control pulse signals Y1, Y2, and Y3. When the switching pulse signal Aw is at the H level, the control pulse signals Y1, Y2, and Y3 concurrently become ON (low potential state). When the switching pulse signal Aw is at the L level, the control pulse signals Y1, Y2, and Y3 concurrently become OFF (no signal state). The first NMOS power transistors 101, 104, and 107 of the first power amplifiers 5, 6, and 7 are switched between ON state and OFF state by the control pulse signals Y1, Y2, and Y3, respectively, and the drive currents I1, I2, and I3 to the windings 2, 3, and 4 are controlled to respond to the command signal Ad. The above-mentioned control will be described as follows with reference to FIG. 13.

In FIG. 13, the part (a) is a waveform diagram showing the trigger pulse signal Dp, and the part (b) is a waveform diagram showing the delay pulse signal As, the switching pulse signal Aw, and the synchronous pulse signal Ac. The part (c) of FIG. 13 is a waveform diagram showing the command signal Ad and the current detecting pulse signal Ag, and the part (d) is a voltage waveform diagram of the drive current supply terminal performing synchronous rectification, of the windings 2, 3, and 4.

The switching control signal Ar becomes the L level at a rising edge of the trigger pulse signal Dp. The switching pulse signal Aw becomes the L level a moment after the switching control signal Ar becomes the L level. In response to the switching pulse signal Aw becoming the L level, the control pulse signals Y1, Y2, and Y3 become OFF (no signal state). In this state, the first amplified current signals P1, P2, and P3 are entered to the drive command signal input terminals (signals P1a, P2a, and P3a shown in FIG. 1) of the first power amplifiers 5, 6, and 7, respectively. To be more specific, the first power amplifiers 5, 6, and 7 amplify the three-phase signals P1a, P2a, and P3a, and supply the windings 2, 3, and 4 with negative-side drive currents. At this moment, the total current value of the drive currents I1, I2, and I3 gradually increases due to an inductance of the windings 2, 3, and 4. As a result, the conduction current pulse Ig supplied by the DC power source 30 also increases, and the current detecting pulse signal Ag of the current detector 11 gradually amplifies.

The moment the current detecting pulse signal Ag becomes larger than the command signal Ad, the compared output signal Cr becomes the L level, and almost at the same time, the switching control signal Ar becomes the H level. As soon as the switching control signal Ar becomes the H level, the switching pulse signal Aw becomes the H level. In response to the switching pulse signal Aw becoming the H level, the control pulse signals Y1, Y2, and Y3 become ON (low potential state). At this moment, the first amplified current signals P1, P2, and P3 flow towards the control pulse producing unit 50 (signals P1b, P2b, and P3b shown in FIG. 12). Thus the first NMOS power transistors 101, 104, and 107 of the first power amplifiers 5, 6, and 7 concurrently become OFF in which no negative-side currents are supplied to the windings 2, 3, and 4. Of the windings 2, 3, and 4, the one with the phase to supply the negative-side currents continues to supply the drive currents due to an inductance of the windings 2, 3, and 4. As a result, current paths to the positive terminal side of the DC power source 30 are formed via the second power diodes of the second power amplifiers 8, 9, and 10. A moment after the switching pulse signal Aw becomes the H level, the synchronous rectifying signal Ac becomes the H level, and of the second superimposed current signals N1, N2, and N3, the one with the phase selected for the synchronous rectifying period is supplied from the superimposed signal composer 54.

The second superimposed current signals N1, N2, and N3 in the synchronous rectifying period become pulse current signals in sync with the synchronous rectifying signal Ac.

Thus, of the second power amplifiers 8, 9, and 10, the one with the phase selected for the synchronous rectifying period is supplied with the second amplified current signal Q1, Q2, or Q3 to turn on the second NMOS power transistor 110, 113, or 116 of the second power amplifier 8, 9, or 10. Hence, current paths are formed to the positive terminal side of the DC power source 30 from the windings 2, 3, and 4 supplying the negative-side currents, via the second NMOS power transistors 110, 113, and 116 of the second power amplifiers 8, 9, and 10. In the period (an electric angle of 180 degrees) where the first distributed current signals E1, E2, and E3 are selectively conducted, the synchronous rectifying period is an electric angle of 120 degrees where the first superimposed timing signals J1, J2, and J3 become the H level. When the switching pulse signal Aw is in the H level period, the sum of the negative-side currents of the drive currents I1, I2, and I3 gradually decreases. A little later, a rising edge of the trigger pulse signal Dp arrives to put the switching control signal Ar in the L level. The moment the switching control signal Ar becomes the L level, the synchronous rectifying signal Ac also becomes the L level, and the second NMOS power transistor 110, 113, or 116 of the second power amplifier 8, 9, or 10 having the phase selected for the synchronous rectifying period becomes OFF so as to form current paths again from the windings 2, 3, and 4 to the positive terminal side of the DC power source 30 via the second power diodes 100d, 113d, and 116d of the second power amplifiers 8, 9, and 10.

The switching pulse signal Aw becomes the L level a moment after the switching control signal Ar becomes the L level. In response to the switching pulse signal Aw becoming the L level, the control pulse signals Y1, Y2, and Y3 become OFF (no signal state), making the first NMOS power transistors 101, 104, and 107 of the first power amplifiers 5, 6, and 7 ON again. These switching operations are repeated to make the total current value of the drive currents I1, I2, and I3 respond to the command signal Ad. The voltage waveform of the drive current supply terminals of the windings 2, 3, and 4 in the synchronous rectifying period is shown in the part (d) of FIG. 13. The synchronous rectifying signal Ac becomes the H level later than a fixed time after the switching pulse signal Aw becomes the L level, and becomes the L level earlier than a fixed time before the switching pulse signal Aw becomes the L level.

As described hereinbefore, power transistors of the same phase are prevented from being turned on concurrently between the first NMOS transistors 101, 104, and 107 of the first power amplifiers 5, 6, and 7 and the second NMOS power transistors 110, 113, and 116 of the second power amplifiers 8, 9, and 10.

The waveforms of the positive-side currents of the drive currents I1, I2, and I3 will be described with reference to FIG. 3. The segments a-b-c-d-e-f-g-h shown in the part (c) of FIG. 3 indicate a waveform 200 times (mirror ratio of the second power current-mirrors of the second power amplifiers 8, 9, and 10) the magnitude of the second amplified current signal Q1. The segments i-g-f-j-k indicate a waveform 200 times the magnitude of the second amplified current signal Q3. The IgL indicates the limit of the total current value of the drive currents I1, I2, and I3 which are switching-controlled in response to the command signal Ad. The value of the IgL is set at 200 times as high as the maximum current excluding the superimposed currents of the amplified current signals Q1, Q2, and Q3. The value corresponds to the maximum values of the waveform G1' (segments a-b-m-n-g-h) and the waveform G2' (segments i-g-o-p). In order to simplify explanation, it is assumed that only the current amplifying characteristics in the linear range (range A) shown in the part (a) of FIG. 3 are used as the current amplifying characteristics of the second power current-mirrors of the second power amplifiers 8, 9, and 10. That is, the second power amplifier 8, which enters the second amplified current signal Q1, tries to flow the positive-side current of the drive current I1 in a manner to shape the waveform of the segments a-b-c-d-e-f-g-h shown in the part (c) of FIG. 3 by increasing the amplified current signal Q1 by 200 times in magnitude. Similarly, the second power amplifier 10 tries to flow the positive-side current of the drive current I3 so as to shape the waveform of the segments i-g-f-j-k. How ever, as described above, the total current of the drive currents I1, I2, and I3 is switching-controlled not to exceed the maximum limit value IgL. The waveforms of the drive currents I1, I2, and I3 in this case will be described by dividing the segments into ranges t1, t2, and t3. Since the drive currents I1, I2, and I3 are switching-controlled, they shape current waveforms having high-frequency ripples. However, the switching frequency is about 100 kHz, which makes the high-frequency ripples of the drive currents of the windings small enough to ignore in the following description.

In the range t1; of the positive-side currents of the drive currents I1, I2, and I3, only the positive-side current of the drive current I1 is supplied. The second power amplifier 8 tries to flow the positive-side current of the drive current I1 so as to shape the waveform of the segment d-e shown in the part (a) of FIG. 3; however, the total current value of the positive-side currents of the drive currents is switching-controlled to be IgL. Hence, the drive current I1 shapes the waveform of the segment m-n.

In the range t2, the positive-side currents of the two phases: the drive currents I1 and I3 are supplied. The second power amplifier 8 tries to supply the positive-side current of the drive current I1 so as to shape the waveform of the segments e-f-g.

The second power amplifier 10, on the other hands, tries to supply the positive-side current of the drive current I3 to shape the waveform of the segment i-g. However, in the range t2, too, the total current of the positive-side current s of the drive currents I1 and I3 is switching-controlled to be IgL. In this case, of the amplified current signals Q1 and Q3, the one with less current dominates the supply of a drive current. That is, the second power amplifier 10 supplies the positive-side current of the drive current I3 so as to shape the waveform of the segment i-g. Since the sum of the drive currents I1 and I3 becomes IgL, the second power amplifier 8 supplies the current value obtained by subtracting the drive current I3 from IgL (IgL—I3) as the positive-side current of the drive current I1. Thus the positive-side current of the drive current I1 shapes the waveform of the segment n-g.

Contrary to the range t2, in the range t3 the second power amplifier 8 dominates the supply of the positive-side current of the drive current I1. That is, the positive-side current of the drive current I1 shapes the waveform of the segment g-h and the positive-side current of the drive current I3 shapes the waveform of the segment g-o (IgL—I1). As described hereinbefore, in the ranges t1, t2, and t3 the positive-side current of the drive current I1 shapes the waveform of the segments m-n-g-h, and the positive-side current of the drive current I3 shapes the waveform of the segments i-g-o.

As a result of having repeated these operations, the positive-side currents of the drive currents I1, I2, and I3 shape smooth trapezoidal waveforms. In other words, regardless of the second superimposed current signals N1, N2, and N3, the drive currents shape the waveforms almost equal to amplified second distributed current signals (the waveform shaping signals) G1, G2, and G3.

The superimposed current signals N1, N2, and N3 have a function of turning on the power transistors of the power amplifiers 8, 9, and 10 to make them operate at a sufficiently low voltage. To be more specific, of the power transistors of the power amplifiers 8, 9, and 10, the power transistor of the power amplifier that is selectively conducted and does not enter a superimposed current signal performs current-amplification. Of the power transistors of the power amplifiers 8, 9, and 10, the power transistor of the power amplifier that is selectively conducted and enters a superimposed current signal is in ON state operating with a low voltage.

In the aforementioned description, the current amplifying characteristics of the second power current-mirrors of the second power amplifiers 8, 9, and 10 show a linear region; however, they actually have nonlinear characteristics as shown in the part (a) of FIG. 3. The reason for this will be explained as follows. As described above, in the range t2 shown in the part (c) of FIG. 3 the positive-side current (segment i-g) of the drive current I3 becomes dominant, and in the range t3 the positive-side current (segment g-h) of the drive current I1 becomes dominant to determine the waveform of the drive current. The current with the other phase has the current value obtained by merely subtracting the drive current value of the dominant phase from the current value IgL. Thus, the maximum current value of the phase that determines the drive current becomes IgM (½ IgL).

In this case, the maximum value of the second power current-mirrors of the second power amplifiers 8, 9, and 10 in the linear range can be IgM. In the present embodiment, as described above, the maximum output current in the linear range of the power current-mirrors is set at ½ the magnitude of the rated maximum current of the drive current. This causes no disturbance of the drive current waveform when the drive current is at its maximum. When the characteristics of the current amplifying ratio shown in the part (a) of FIG. 3 are in the nonlinear range (range B), the NMOS power transistors can be put in ON state with a small input current at a sufficiently low operation voltage. Hence, the successful reduction in the superimposed current improves the efficiency of the motor of Embodiment 1.

The waveforms of the negative-side currents of the drive currents I1, I2, and I3 will not be described in detail because they are similar to those of the positive-side currents. That is, the negative-side currents of the drive currents I1, I2, and I3 shape approximately the same waveforms as amplified first distributed current signals (the waveform shaping signals) E1, E2, and E3, regardless of the values of the first superimposed current signals M1, M2, and M3. It should be noted that since the negative-side currents is supplied under switching-control, the first power amplifier supplied with only a waveform shaping signal repeats a current amplifying operation state and an off state. The first power transistor of the first power amplifier supplied with both the waveform shaping signal and the superimposed signal repeats ON state and OFF state at a sufficiently low voltage.

Description of the nonlinear characteristics of the first power current-mirrors of the first power amplifiers 5, 6, and 7 will be omitted because it is similar to the above-mentioned description.

The overall behaviors of the motor shown in FIG. 1 will be described in brief. The altering signal producing unit 15 produces three-phase altering signals D1, D2, and D3, and three-phase position detecting signals Ja1, Jb1, and Jc1, which vary smoothly. The three-phase altering signals D1, D2, and D3 are supplied to the distribution producing unit 16, while the three-phase position detecting signals Ja1, Jb1, and Jc1 are supplied to the superimposed timing producing unit 19. The distribution producing unit 16 distributes the first supply current C1 and second supply current C2 of the current supplying unit 14 responding to the three-phase altering signals D1, D2, and D3, and outputs the three-phase first distributed current signals E1, E2, and E3 and the three-phase second distributed current signals G1, G2, and G3. The superimposed timing producing unit 19 produces the first superimposed timing signals J1, J2, and J3 and the second superimposed timing signals K1, K2, and K3 from the position detecting signals Ja1, Jb1, and Jc1.

The current detector 11 detects the conduction current pulse Ig of the DC power source 30 and outputs a current detecting pulse signal Ag responding to the conduction current pulse Ig. The switching controller 12 varies the switching control signal Ar responding to the comparison results of the command signal Ad of the commander 13 and the current detecting pulse signal Ag of the current detector 11, as well as the trigger pulse signal Dp, and outputs the signal to the synchronous rectifying controller 51. The synchronous rectifying controller 51 outputs the switching pulse signal Aw and the synchronous pulse signal Ac which are considered not to cause the concurrent turn-on of the first NMOS power transistors 101, 104, and 107 of the first power amplifiers 5, 6, and 7 and the second NMOS power transistors 110, 113, and 116 of the second power amplifiers 8, 9, and 10.

The superimposed signal composer 54 composes the synchronous pulse signal Ac with the second superimposed timing signals K1, K2, and K3 only in the synchronous rectifying period of each phase, and outputs composed superimposed signals Kc1, Kc2, and Kc3. A superimposed current supplying unit 20 outputs the first superimposed current signals M1, M2, and M3 and the second superimposed current signals N1, N2, and N3 responding to the first superimposed timing signals J1, J2, and J3, and the composed superimposed signals Kc1, Kc2, and Kc3.

The first distributed current signals (the waveform shaping signals) E1, E2, and E3 and the first superimposed current signals M1, M2, and M3 are combined by first composers 31, 32, and 33 to produce the three-phase first composed current signals F1, F2, and F3. The second distributed current signals (the waveform shaping signals) G1, G2, and G3 and the first superimposed current signals N1, N2, and N3 are combined by second composers 34, 35, and 36 to produce the three-phase second composed current signals H1, H2, a nd H3. First current amplifiers 23, 24, and 25 current-amplify the three-phase first composed current signals F1, F2, and F3, respectively, by a certain ratio, and output three-phase first amplified current signals P1, P2, and P3, respectively, to supply them to the respective drive command signal input terminals of the firs t power amplifiers 5, 6, and 7. Second current amplifiers 26, 27, and 28 current-amplify the three-phase second composed current signals H1, H2, and H3, respectively, by a certain ratio, and output three-phase second amplified current signals Q1, Q2, and Q3, respectively, to supply them to the respective drive command signal input terminals of the second power amplifiers 8, 9, and 10.

The first power amplifiers 5, 6, and 7 perform high-frequency switching operations by the control pulse signals Y1, Y2, and Y3 of the control pulse producing unit 50. When the control pulse signals Y1, Y2, and Y3 are OFF (no signal state), the first power amplifiers 5, 6, and 7 current-amplify the three-phase amplified current signals P1a, P2a, and P3a, respectively, to form current paths for supplying the negative-side currents of the drive currents I1, I2, and I3 to the three-phase windings 2, 3, and 4. When the control pulse signals Y1, Y2, and Y3 are ON (low potential state), the first power transistors 101, 104, and 107 of the first power amplifiers 5, 6, and 7 all become OFF. At this moment, current paths for supplying the negative-side currents of the drive currents I1, I2, and I13 to the three-phase windings 2, 3, and 4 are formed by the second power diodes 110d, 113d, and 116d of the second power amplifiers 8, 9, and 10. In the synchronous rectifying period, of the second NMOS power transistors of the second power amplifiers 8, 9, and 10, the second NMOS power transistor corresponding to the phase in the synchronous rectifying period is turned on to form current paths for supplying the negative-side currents of the drive currents I1, I2, and I3. Thus, the supply currents of the drive currents I1, I2, and I3 to the windings are adjusted to a value responding to the command signal Ad.

The negative-side currents of the drive currents I1, I2, and I3 shape the waveforms equal to amplified first distributed current signals E1, E2, and E3, regardless of the first superimposed current signals M1, M2, and M3. As a result, the negative-side currents of the drive currents I1, I2, and I3 shape smoothly varying waveforms.

The second power amplifiers 8, 9, and 10 current-amplify the second amplified current signals Q1, Q2, and Q3, respectively, to supply the positive-side currents of the drive currents I1, I2, and I3 to the three-phase windings 2, 3, and 4. The positive-side currents of the drive currents I1, I2, and I3 shape the waveforms equal to amplified second distributed current signals G1, G2, and G3, regardless of the second superimposed current signals N1, N2, and N3. As a result, the positive-side currents of the drive currents I1, I2, and I3 shape smoothly varying waveforms.

The operations of the first distributor 17 and the second distributor 18 make the first distributed signal and the second distributed signal having the same phase flow complementarily, so that the first NMOS power transistors of the first power amplifiers and the second NMOS power transistors of the second power amplifiers also operate complementarily. Consequently, continuously varying smooth bi-directional drive currents are supplied to the windings and no short-circuit current is caused by first power transistor and the second power transistor of the same phase. As a result, the pulse of the driving force generated by the motor is greatly reduced to achieve a high-performing motor with little vibration.

In Embodiment 1 the high-frequency switching operations of the first NMOS power transistors of the first power amplifiers makes the power loss of the first power amplifiers small. This makes the motor in Embodiment 1 have excellent power efficiency. Furthermore, in Embodiment 1 the first supply current signal C1 and the second supply current signal C2 are varied in response to the command signal Ad in order to reduce the power loss due to the input currents to the first power amplifiers and the second power amplifiers.

Moreover, in Embodiment 1, the first supply current signal C1 is distributed to one phase or two phases alternately as the movable body 1 moves, to produce the smoothly varying three-phase first distributed current signals and to supply them to the first power current mirrors of the first power amplifiers. Consequently, the first NMOS power transistors 101, 104, and 107 of the first power amplifiers 5, 6, and 7 smoothly change the negative-side currents of the drive currents I1, I2, and I3 to the windings 2, 3, and 4, while performing high-frequency switching operations. Similarly, the second supply current signal C2 is distributed to one phase or two phases alternately as the movable body 1 moves, to produce the smoothly varying three-phase second distributed current signals and to supply them to the second power current mirror circuits of the second power amplifiers. Hence, the second NMOS power transistors 110, 113, and 116 of the second power amplifiers 8, 9, and 10 smoothly change the positive-side currents of the drive currents I1, I2, and I3 supplied to the windings 2, 3, and 4. As a result, the pulsation of the drive currents are greatly reduced, which remarkably diminishes the pulsation of the driving power and motor vibration. Furthermore, the first supply current signal C1 and the second supply current signal C2 are changed in proportion to the command signal Ad in a manner to reduce the first supply current signal C1 and the second supply current signal C2 when the DC power source 30 supplies a small conduction current. Thus smooth switching of the current paths is maintained in spite of a change in magnitudes of the supply currents to the windings.

In Embodiment 1 the conduction current pulse Ig of the DC power source 30 is detected by the current detector 11, and the output signal Ag of the current detector 11 is compared with the command signal Ad so as to switching-control the first power amplifiers with a high-frequency in response to the compared results. As a result, an accurate conduction current pulse Ig responding to the command signal Ad can be distributed to the three-phase windings 2, 3, and 4, which allows the motor generation force to be controlled accurately with the command signal Ad. In the repetition timing of the trigger pulse signal Dp, the first power amplifiers selected by the distribution producing unit 16 are turned on, and then turned off concurrently according to the comparison results of the command signal Ad and the output signal Ag of the current detector 11, which realizes the control of the conduction current pulse Ig with a quite simple configuration. To be more specific, one-phase or two-phase first power amplifiers are in active along with the rotation of the movable body 1; however, all the three-phase first power amplifiers 5, 6, and 7 can be concurrently turned off. This simplifies the configuration of the motor of Embodiment 1. In addition, the timing control of the high-frequency switching is done only by the current detector 11, so that the current detection control is stabilized.

In Embodiment 1, the superimposed current supplying unit 20 combines the first superimposed current signals M1, M2, and M3 with the first distributed current signals E1, E2, and E3, respectively, and also combines the second superimposed current signals N1, N2, and N3 with the second distributed current signals G1, G2, and G3, respectively, which can greatly decrease the on-resistance of the first NMOS power transistors 101, 104, and 107 of the first power amplifiers 5, 6, and 7 and the second NMOS power transistors 110, 113, and 116 of the second power amplifiers 8, 9, and 10 without disturbing the current waveforms of the drive currents I1, I2, and I3. As a result, the motor of Embodiment 1 achieves a remarkable reduction in power loss.

In Embodiment 1, while the first power amplifier 5, 6, or 7 having a phase selected for conduction is in the off period, the second superimposed current signals are brought into conduction to turn on the corresponding one of the second NMOS power transistors 110, 113, and 116 of the second power amplifiers 8, 9, and 10 to form the current paths from the windings 2, 3, and 4 to the positive-side of the DC power source 30 via the second NMOS power transistors 110, 113, and 116. Consequently, the motor of Embodiment 1 achieves a reduction in power loss, compared with the current paths from the windings 2, 3, and 4 to the positive side of the DC power source 30 via the second power diodes 110*d*, 113*d*, and 116*d*.

In Embodiment 1, power transistors and power diodes formed as their parasitic diode elements are used as power elements having a motor configuration suitable for circuit integration. This configuration of the mot or of Embodiment 1 achieves a low production cost and integration on a small chip. It is also possible in Embodiment 1 to integrate necessary transistors and resistance including the switching controller 12, the commander 13, the current supplying unit 14, the altering signal producing unit 15, the distribution producing unit 16 on the same chip as the power transistors.

The motor of Embodiment 1 has a configuration suitable for circuit integration by reducing heat generation in the power elements to a great degree. Since the current paths are formed during switch operations or saturated operations at a low operation voltage, the first NMOS power transistors 101, 104, and 107 and the second NMOS power transistors 110, 113, and 116 cause quite a small power loss and heat generation. Consequently, one-chip integration of these power elements does not need to take countermeasures against heat generation such as release of heat.

In Embodiment 1, the fi rst power amplifiers 5, 6, and 7 constitute first power amplifying means, whereas the second power amplifiers 8, 9, and 10 constitute second power amplifying means. The current supplying unit 14, the altering signal producing unit 15, the distribution producing unit 16 constitute waveform shaping signal producing means. The current detector 11, the switching controller 12, and the control pulse producing unit 50 constitute switching control means. The synchronous rectifying controller 51 constitutes synchronous rectifying control means. The DC power source 30 constitutes DC power source means. Drive command means is composed of the superimposed timing producing unit 19, the superimposed current supplying unit 20, the first current amplifiers 23, 24, and 25, the second current amplifiers 26, 27, and 28, a high-voltage outputting unit 29, the connection points 31, 32, and 33, second composers 34, 35, and 36, and the superimposed signal composer 54. Conduction control means comprises the above-mentioned waveform shaping signal producing means, the synchronous rectifying control means, the drive command means, and the superimposed timing producing means. It goes without saying that these components in the present invention can be replaced by those having the same functions.

<<Embodiment 2>>

Figure 14:
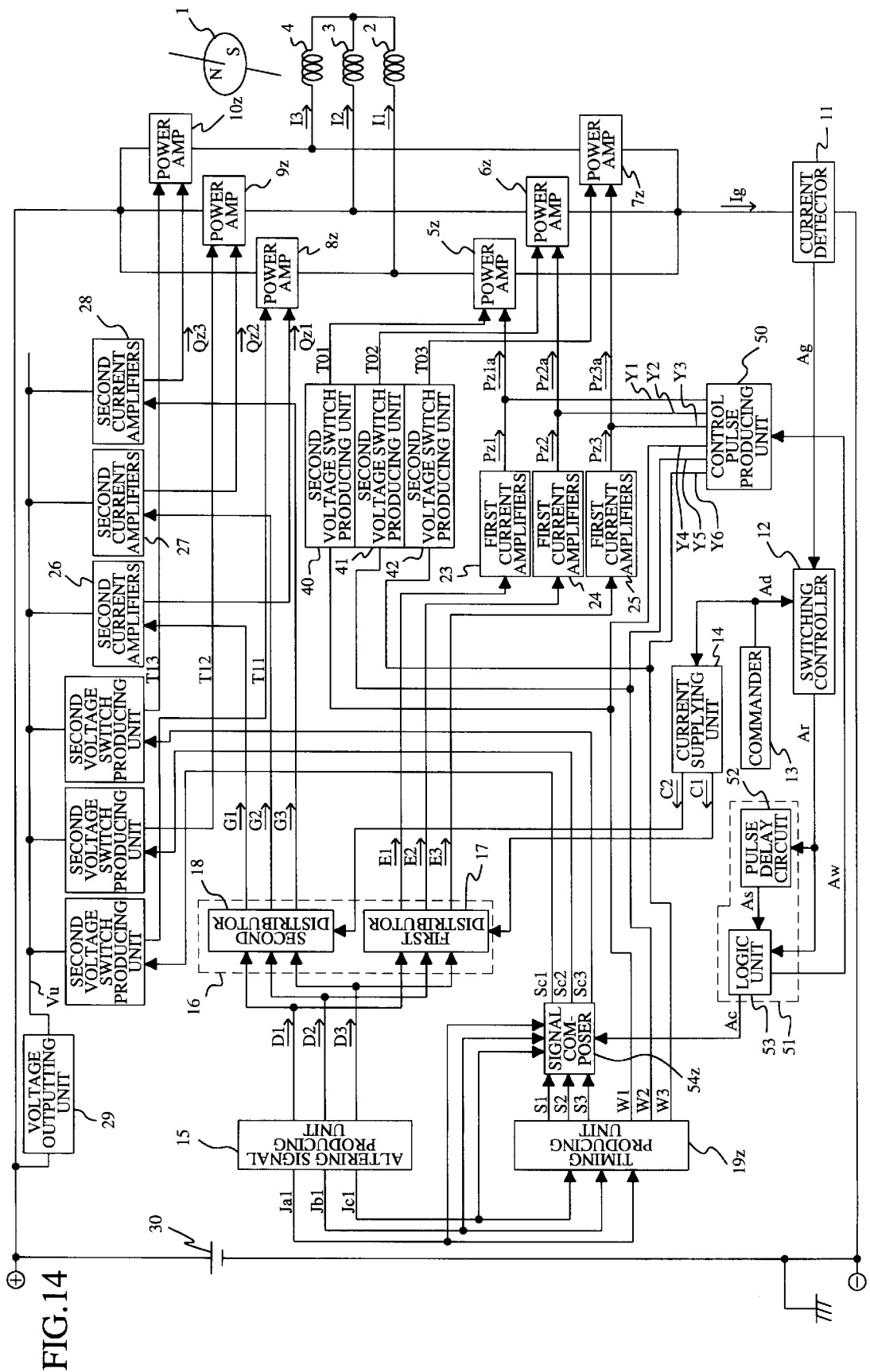
FIG. 14 is a diagram showing the entire configuration in Embodiment 2 of the present invention.

The motor of Embodiment 2 of the present invention will be detailed with reference to FIGS. 14 through 19. FIG. 14 shows the entire configuration of the motor of Embodiment 2. The motor of Embodiment 2 is different from the motor of Embodiment 1 in that it does not comprise the superimposed current supplying unit 20, the first composers 31, 32, and 33, or the second composers 34, 35, and 36, but is provided with a pulse switch producing unit 56, first voltage switch producing units 40, 41, and 42, and second voltage switch producing units 43, 44, and 45. In Embodiment 2, the first current amplifiers 23, 24, and 25 current-amplify the first distributed current signals E1, E2, and E3 by a certain ratio so as to produce first amplified current signals Pz1, Pz2, and Pz3. The second current amplifiers 25, 26, and 27 current-amplify the second distributed current signals G1, G2, and G3 by a certain ratio so as to produce second amplified current signals Qz1, Qz2, and Qz3.

First power amplifiers 5*z*, 6*z*, and 7*z* and second power amplifiers 8*z*, 9*z*, and 10*z* have voltage switch signal input terminals in addition to drive current input terminals, drive current output terminals, and drive command signal input terminals. A control pulse producing unit 50*z* outputs six control pulse signals Y1, Y2, Y3, Y4, Y5, and Y6. In another configuration of Embodiment 2, like components are labeled with like reference numerals with respect to Embodiment 1, and the description of these components is not repeated. Furthermore, the components labeled with reference numerals ending with "z" have approximately the same structures as the corresponding components in Embodiment 1, and they will be described.

Figure 15:
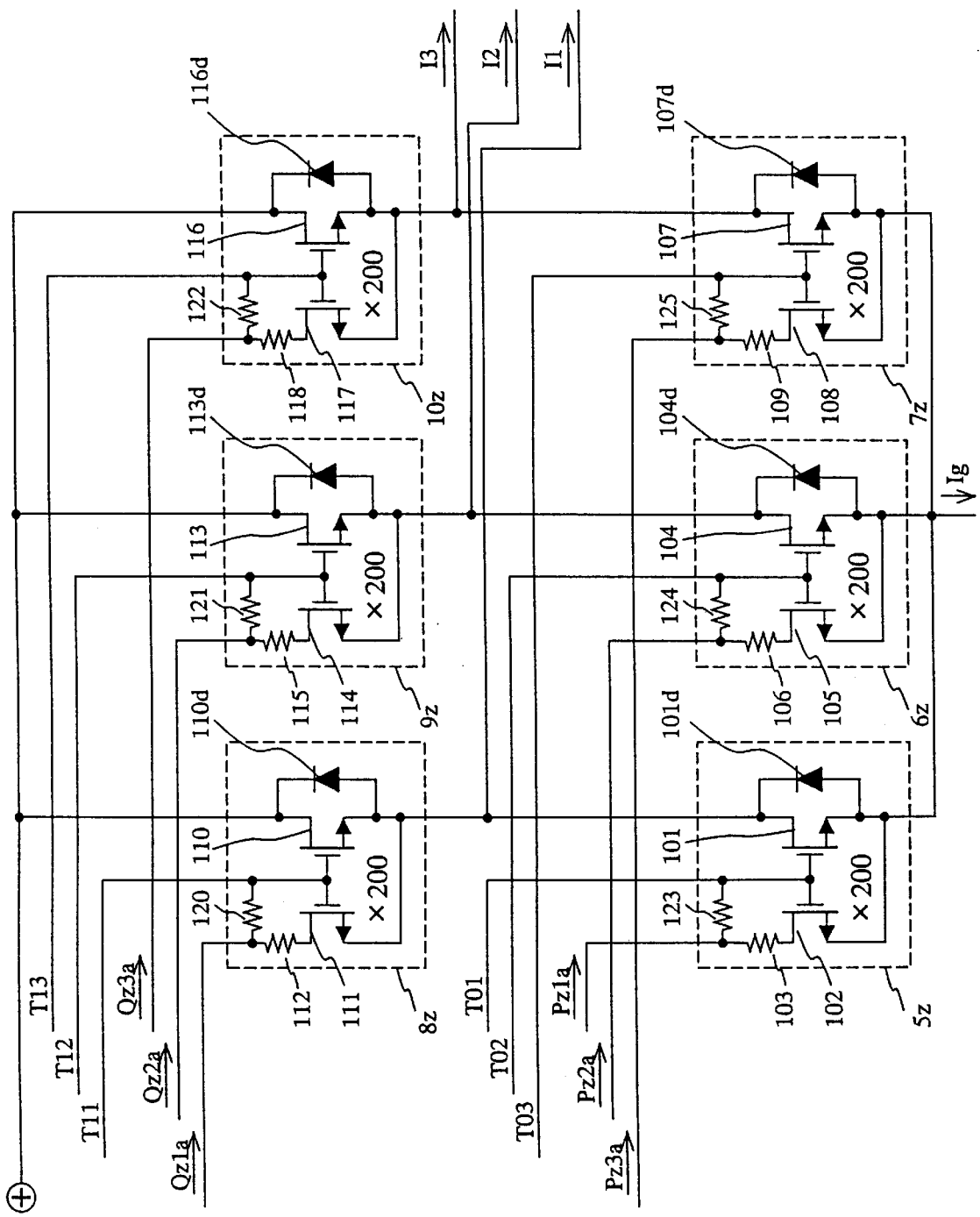
FIG. 15 is a circuit diagram showing first power amplifiers 5z, 6z, and 7z and second power amplifiers 8z, 9z, and 10z in Embodiment 2.

FIG. 15 is a circuit diagram showing the specific configurations of the first power amplifiers 5*z*, 6*z*, and 7*z* and the second power amplifiers 8*z*, 9*z*, and 10*z*. The first power amplifier 5*z* comprises a first NMOS power transistor 101, a first power diode 101*d* reversely connected to the first NMOS power transistor 101, a NMOS transistor 102, and resistors 103 and 123. The current output terminal of the first NMOS power transistor 101, the current input terminal of the first power diode 101*d*, and the current output terminal of the NMOS transistor 102 are common-connected so as to form the drive current output terminal of the first power amplifier 5*z*.

The cur rent input terminal of the first NMOS power transistor 101 and the current output terminal of the first power diode 101*d* are connected to each other so as to form the drive current input terminal of the first power amplifier 5*z*. The conduction control terminal of the first NMOS power transistor 101, the conduction control terminal of the NMOS transistor 102, and one side of the resistor 123 are connected to each other so as to form the voltage switch signal input terminal. To the voltage switch signal input terminal, a voltage switch signal T01 is entered. The other side of the resistor 123 is connected to one side of the resistor 103 so as to form the drive command signal input terminal. To the drive command signal input terminal, a first amplified current signal Pz1*a* is entered. The other side of the resistor 103 is connected to the current input terminal of the NMOS transistor 102.

Thus the first NMOS power transistor 101, the NMOS transistor 102, and the resistors 103 and 123 constitute a first NMOS power current-mirror circuit. The ratio of chip areas of the first NMOS power transistor 101 to the NMOS transistor 102 is set at 200 times. When the voltage switch signal T01 is in no signal state, the first NMOS power current-mirror circuit functions as an ordinary current amplifying circuit. When the voltage switch signal T01 is in a high potential state, on the other hand, the conduction control terminal of the first NMOS power transistor has almost the same potential as the positive side of the DC power source 30. The operations of this circuit will be detailed below.

Similarly, the first power amplifier 6*z* comprises a first NMOS power transistor 104, a first power diode 104*d* reversely connected to the first NMOS power transistor 104, a NMOS transistor 105, and resistors 106 and 124. Also, the first power amplifier 7*z* comprises a first NMOS power transistor 107, a first power diode 107*d* reversely connected to the first NMOS power transistor 107, a NMOS transistor 108, and resistors 109 and 125.

The second power amplifier 8z consists of a second NMOS power transistor 110, a second power diode 110d reversely connected to the second NMOS power transistor 110, a NMOS transistor 111, and resistors 112 and 120. The current output terminal of the second NMOS power transistor 110, the current input terminal of the second power diode 110d, and the current output terminal of the NMOS transistor 111 are common-connected so as to form the drive current output terminal of the second power amplifier 8z. The current input terminal of the second NMOS power transistor 110 and the current output terminal of the second power diode 110d are connected to each other so as to form the drive current input terminal of the second power amplifier 8z.

The conduction control terminal of the second NMOS power transistor 110, the conduction control terminal of the NMOS transistor 111, and one side of the resistor 120 are connected to each other so as to form the voltage switch signal input terminal. To the voltage switch signal input terminal, a voltage switch signal T11 is entered. The other side of the resistor 120 is connected to one side of the resistor 112 so as to form the drive command signal input terminal. To the drive command signal input terminal, a second amplified current signal Qz1a is entered. The other side of the resistor 112 is connected to the current input terminal of the NMOS transistor 111.

Thus the second NMOS power transistor 110, the NMOS transistor 111, the resistors 112 and 120 constitute a second NMOS power current-mirror circuit. The ratio of chip areas of the first NMOS power transistor 110 to the NMOS transistor 111 is set at 200 times. When the voltage switch signal T11 is in no signal state, the second NMOS power current-mirror circuit functions as an ordinary current amplifying circuit. When the voltage switch signal T11 is in a high potential state, the conduction control terminal of the second NMOS power transistor has almost the same potential as the high potential point Vu. The operations of this circuit will be detailed below.

Similarly, the second power amplifier 9z consists of a second NMOS power transistor 113, a second power diode 113d reversely connected to the second NMOS power transistor 113, a NMOS transistor 114, and resistors 115 and 121. Similarly, the second power amplifier 10z consists of a second NMOS power transistor 116, a second power diode 116d reversely connected to the second NMOS power transistor 116, a NMOS transistor 117, and resistors 118 and 122.

Figure 16:
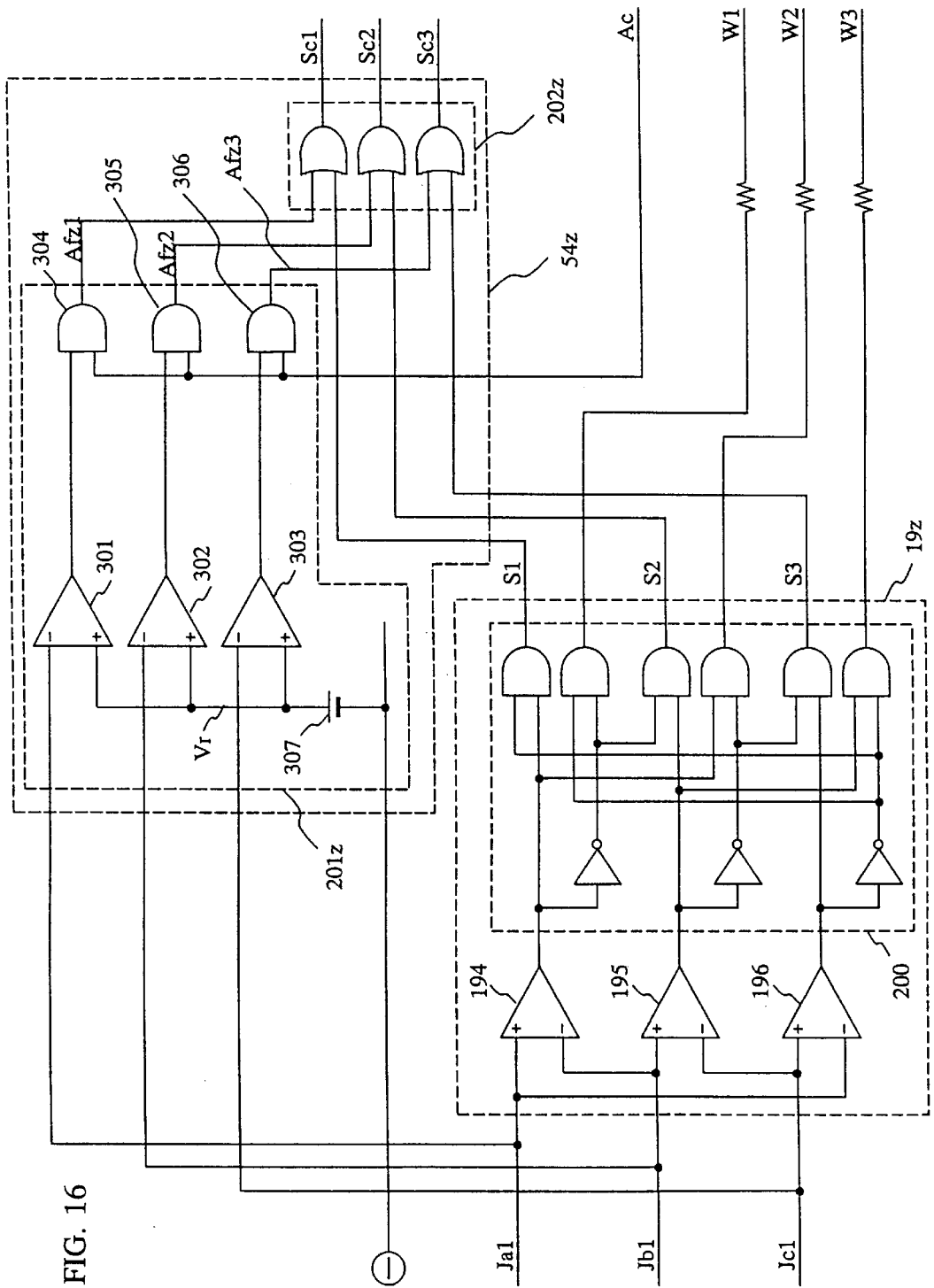
FIG. 16 is a circuit diagram showing a switch timing producing unit 19z and a switch signal composer 54z in Embodiment 2.

FIG. 16 is a circuit diagram showing the specific configurations of a switch timing producing unit 19z and a switch signal composer 54z. The switch timing producing unit 19z, which enters three-phase position detecting signals Ja1, Jb1, and Jc1 of the altering signal producing unit 15 to form first switch timing signals W1, W2, and W3, and second switch timing signals S1, S2, and S3. The switch timing producing unit 19z has the same configuration as the superimposed timing producing unit 19 described in Embodiment 1. To be more specific, the first superimposed timing signals J1, J2, and J3 in Embodiment 1 are equal to the first switch timing signals W1, W2, and W3 in Embodiment 2, while the second superimposed timing signals K1, K2, and K3 in Embodiment 1 are equal to the second switch timing signals S1, S2, and S3 in Embodiment 2.

The switch signal composer 54z enters the position detecting signals Ja1, Jb1, and Jc1, the second switch timing signals S1, S2, and S3 and the synchronous pulse signal Ac, and outputs composed switch signals Sc1, Sc2, and Sc3 produced by composing the signals S1, S2, and S3 and the synchronous pulse signal Ac. The switch signal composer 54z consists of a synchronous period setting part 201z and a switch timing composing part 202z. The synchronous period setting part 201z is composed of comparison circuits 301, 302, and 303, AND circuits 304, 305, and 306, and a DC power source 307. The DC power source 307 supplies a DC voltage Vr to each of the comparison circuits 301, 302, and 303. The comparison circuits 301, 302, and 303 compare each of the position detecting signals Ja1, Jb1, and Jc1 with the DC voltage Vr, and output a H level when the position detecting signals Ja1, Jb1, and Jc1 have a voltage lower than the DC voltage Vr. The relation between the position detecting signals Ja1, Jb1, and Jc1 and the DC voltage Vr is shown in a part (a) of FIG. 19.

Figure 19:
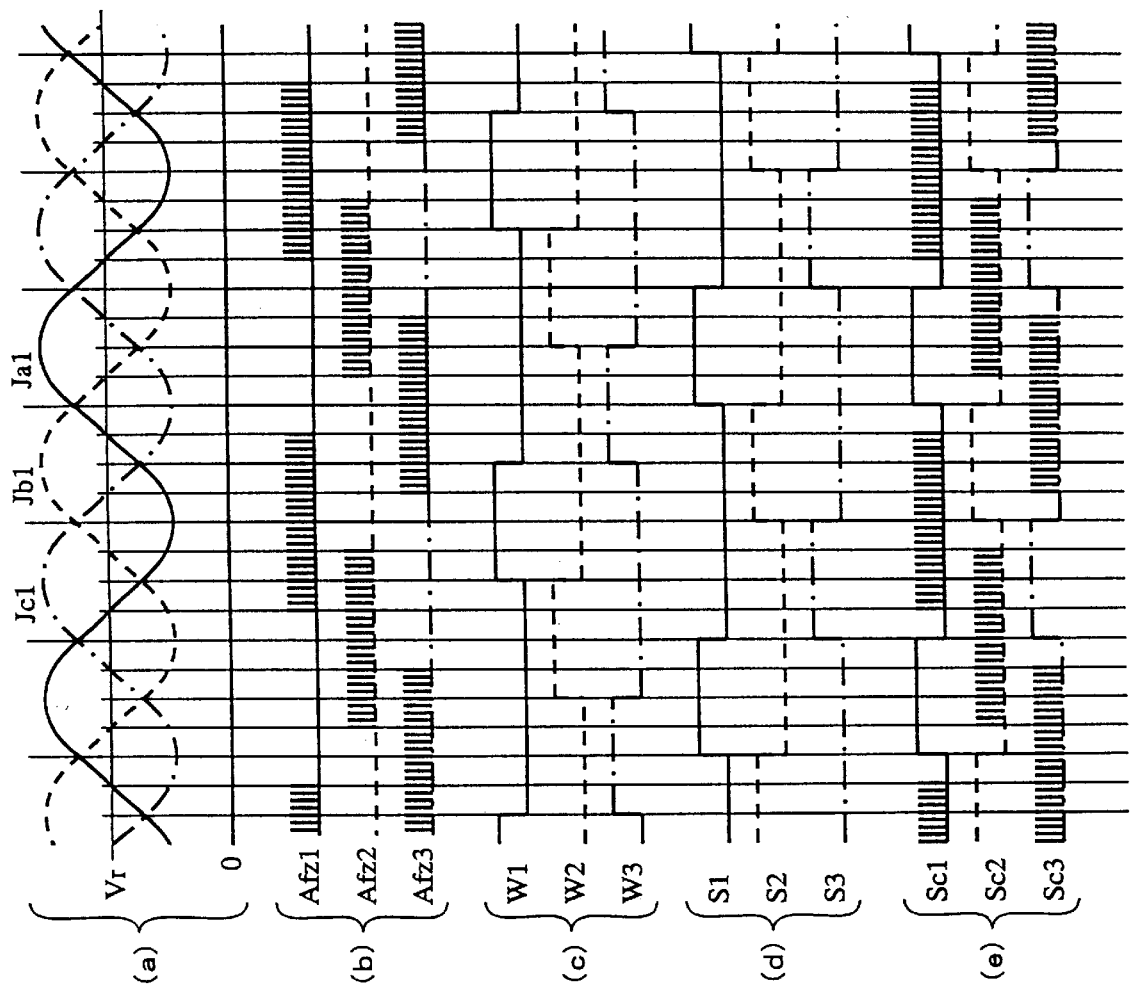
In FIG. 19, a part (a) is a waveform diagram showing position detecting signals Ja1, Jb1, and Jc1 and a DC voltage Vr in Embodiment 2. A part (b) is a waveform showing synchronous timing signals Afz1, Afz2, and Afz3 in Embodiment 2. A part (c) is a waveform showing first pulse timing signals W1, W2, and W3 in Embodiment 2. A part (d) is a waveform showing second pulse timing signals S1, S2, and S3 in Embodiment 2. A part (e) is a waveform showing composed switch signals Sc1, Sc2, and Sc3 in Embodiment 2.

The AND circuits 304, 305, and 306 of the synchronous period setting part 20z restrict the period for the synchronous pulse signal Ac in accordance with the outputs of the comparison circuits 301, 302, and 303, and output synchronous timing signals Afz1, Afz2, and Afz3. The waveforms of the signals Afz1, Afz2, and Afz3 are shown in a part (b) of FIG. 19. The synchronous timing signals Afz1, Afz2, and Afz3 are signals which are output in the period of an electric angle of 180 degrees. The switch timing composing part 202z composes the second switch timing signals S1, S2, and S3 and the limited synchronous pulse signals Afz1, Afz2, and Afz3 to output three-phase composed switch signals Sc1, Sc2, and Sc3. A part (c) through a part (e) of FIG. 19 show the waveforms of the first switch timing signals W1, W2, and W3, the second switch timing signals S1, S2, and S3, and the composed switch signals sc1, Sc2, and Sc3, respectively.

Figure 17:
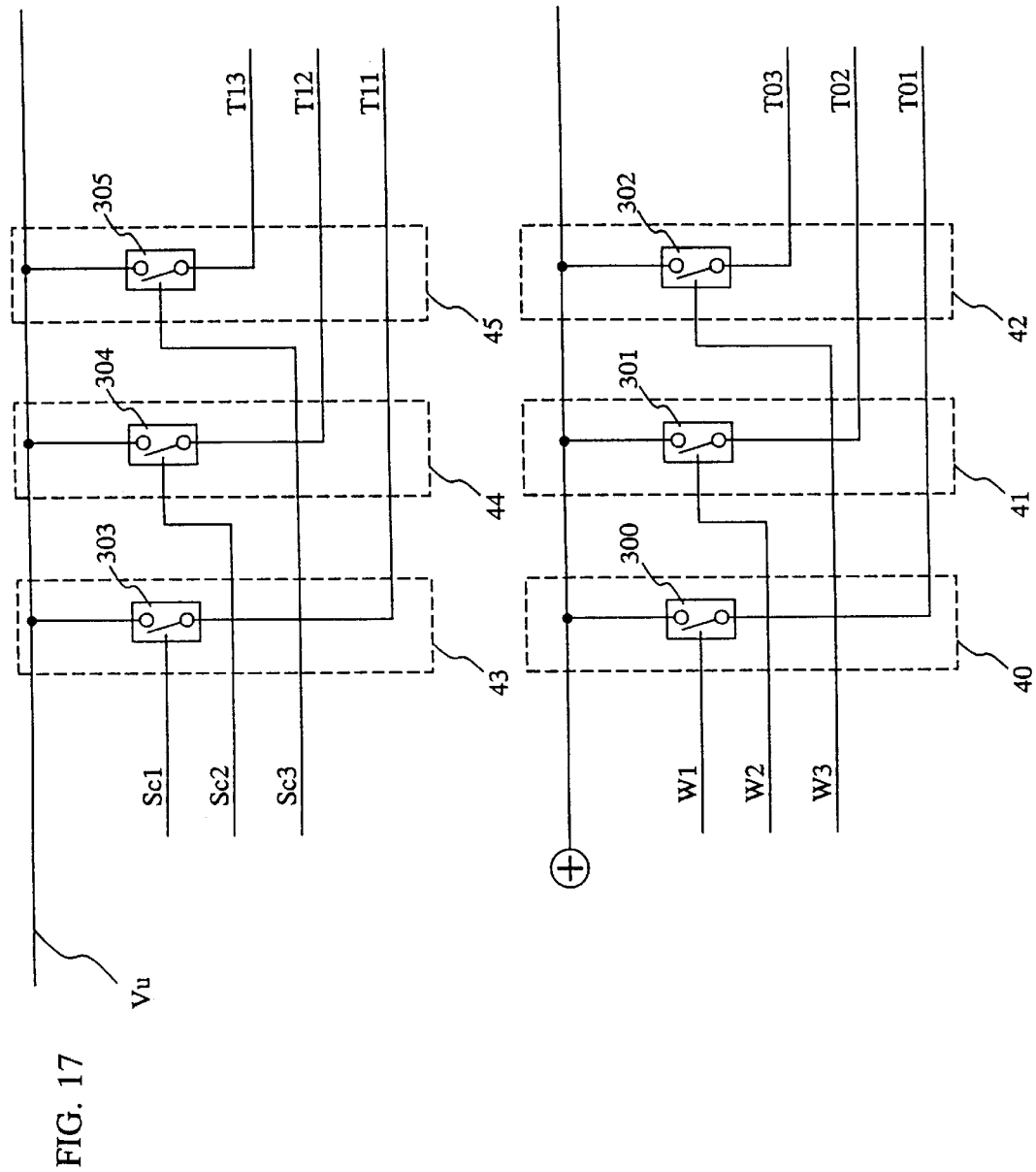
FIG. 17 is a circuit diagram showing first voltage switch producing units 40, 41, and 42, and second voltage switch producing units 43, 44, and 45 in Embodiment 2.

FIG. 17 shows the specific configurations of first voltage switch producing units 40, 41, and 42 and second voltage switch producing units 43, 44, and 45. The first voltage switch producing units 40, 41, and 42 are composed of switch circuits 300, 301, and 302, respectively. In switch circuits 300, 301, and 302, one side of their connection terminals is common-connected to the positive side of the DC power source 30. The other side of the connection terminals is the signal output terminal of each of the first voltage switch signals T01, T02, and T03. To the connection control terminals, the first switch timing signals W1, W2, and W3, respectively, are entered. @99In each of the switch circuits 300, 301, and 302, two connection terminals are closed (connected state) when the connection control terminal is at the H level (high potential state), and are opened (released state) when the connection control terminal is at the L level (low potential state). To be more specific, when the first switch timing signal W1 is at the H level, the two connection terminals of the switch circuit 300 are closed so as to make the potential of the first voltage switch signal T01 be in a high potential state (almost equal to the positive terminal side voltage Vcc of the DC power source 30). When the first switch timing signal WI is at the L level, the two connection terminals of the switch circuit 300 become open so as to make the first voltage switch signal T01 OFF (no signal state).

Similarly, when the first switch timing signal W2 is at the H level, the first voltage switch signal T02 is in a high potential state, while when the first switch timing signal W2 is at the L level, the first voltage switch signal T02 becomes OFF. Also when the first switch timing signal W3 is at the H level, the first voltage switch signal T03 gets in a high potential state, while when the first switch timing signal W3 is at the L level, the first voltage switch signal T03 becomes OFF.

The second voltage switch producing units 43, 44, and 45 are made of switch circuits 303, 304, and 305, respectively. In the switch circuits 303, 304, and 305 their connection terminals are common-connected at one side thereof to the high-potential point Vu. The other side of the connection terminals is the signal output terminals of the second voltage switch signals T11, T12, and T13. To the connection control terminals, the composed switch signals Sc1, Sc2, and Sc3, respectively, are entered. In each of the switch circuits 303, 304, and 305, two connection terminals are closed (connected state) when the connection control terminal is at the H level (high potential state), and become open (released state) when the connection control terminal is at the L level (low potential state). To be more specific, when the composed switch signal Sc1 is at the H level, the two connection terminals of the switch circuit 303 are closed so as to make the potential of the second voltage switch signal T11 a high potential state (almost equal to the high potential point Vu). When the composed switch signal S11 is at the L level, the two connection terminals of the switch circuit 303 become open to make the second voltage switch signal T11 OFF (no signal state). Similarly, when the composed switch signal Sc2 is at the H level, the second voltage switch signal T12 is in a high potential state, and when the composed switch signal Sc2 is at the L level, the second voltage switch signal T12 becomes OFF. Similarly, when the composed switch signal Sc3 is at the H level, the second voltage switch signal T13 is in a high potential state, and when the composed switch signal Sc3 is at the L level, the second voltage switch signal T13 becomes OFF.

Figure 18:
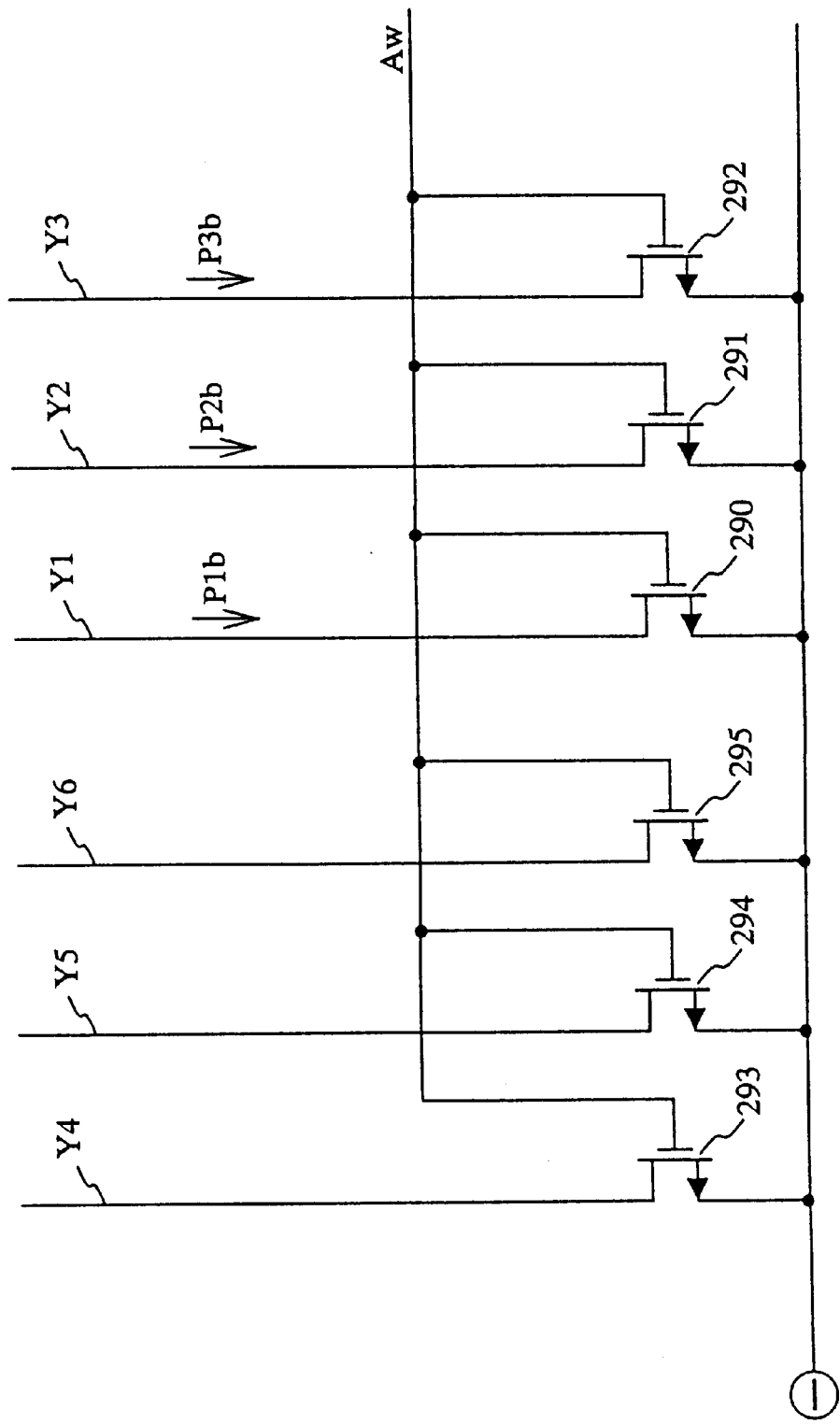
FIG. 18 is a circuit diagram showing a control pulse producing unit 50z in Embodiment 2.

FIG. 18 is a circuit diagram showing the specific configuration of the control pulse producing unit 50z. The control pulse producing unit 50z controls the control pulse signals Y1, Y2, Y3, Y4, Y5, and Y6 in response to the switching pulse signal Aw. Through the control of the control pulse signals Y1, Y2, Y3, Y4, Y5, and Y6, the control pulse producing unit 50z performs the switching on/off of the first NMOS power transistors 101, 104, and 107 of the first power amplifiers 5z, 6z, and 7z. In the control pulse producing unit 50z the conduction control terminals of the NMOS transistors 290, 291, 292, 293, 294, and 295 are common-connected so as to enter the switching pulse signal Aw. The current output terminals of NMOS transistors 290, 291, 292, 293, 294, and 295 are common-connected to the negative terminal side of the DC power source 30. The current input terminals of the NMOS transistors 290, 291, 292, 293, 294, and 295 function as the output terminals of the control pulse signals Y1, Y2, Y3, Y4, Y5, and Y6, respectively. When the switching pulse signal Aw is at the H level, the control pulse signals Y1, Y2, Y3, Y4, Y5, and Y6 concurrently become ON (low potential state). When the switching pulse signal Aw is at the L level, the control pulse signals Y1, Y2, Y3, Y4, Y5, and Y6 concurrently become OFF (no signal state). The first NMOS power transistors 101, 104, and 107 of the first power amplifiers 5z, 6z, and 7z are switched between on and off by control pulse signals Y1, Y2, and Y3 respectively, thereby making the drive currents I1, I2, and I3 to the windings respond to the command signal Ad. These operations are equal to those in Embodiment 1.

The control pulse signals Y4, Y5, and Y6 are connected to the first switch timing signals W1, W2, and W3, respectively. The control pulse signals Y4, Y5, and Y6 force the first switch timing signals W1, W2, and W3 to be at the L level at the same time as the control pulse signals Y1, Y2, and Y3 turn off the first NMOS power transistors 101, 104, and 107 of the first power amplifiers 5z, 6z, and 7z, respectively, thereby making the first voltage switch signals T01, T02, and T03 OFF (no signal state Functions of the first voltage switch signals T01, T02, and T03 and the second voltage switch signals T11, T12, and T13 will be described as follows.

In FIG. 15 the first voltage switch signal T01 is entered to the voltage switch signal input terminal of the first power amplifier 5z. When the voltage switch signal T01 is OFF (no signal state), the first power current-mirror of the first power amplifier 5z becomes equivalent to the corresponding circuit in Embodiment 1. When the voltage switch signal T01 is in a high potential state, the current supplied from the voltage switch signal T01 is entered to the drive command signal input terminal of the first power amplifier 5z via the resistor 123 and is combined with the first amplified current signal Pz1a entered to the drive command signal input terminal. The combined signal functions equivalently to the first superimposed current signal M1 output from the superimposed current supplying unit 20 in Embodiment 1. The resistor 123 restricts the current to be supplied to the first voltage switch signal T01. Hence, the current to be supplied to the voltage switch signal T01 in Embodiment 2 is smaller than the superimposed current component of the drive command signal P1a entered into the first power amplifier 5 in Embodiment 1, which leads to a further improvement in motor efficiency.

Similarly, the first voltage switch signals T02 and T03 entering to the first power amplifiers 6z and 7z, respectively, have functions equivalent to the first superimposed current signals M2 and M3. Since have the same configurations as the first power amplifiers 5z, 6z, and 7z, the second voltage switch signals T11, T12, and T13 entered to the second power amplifiers 8z, 9z, and 10z function equivalently to the second superimposed current signals N1, N2, and N3. The first switch timing signals W1, W2, and W3 and the second switch timing signals S1, S2, and S3 have the same relation as the first superimposed timing signals J1, J2, and J3 and the second superimposed timing signals K1, K2, and K3. Like Embodiment 1 described above, the negative-side currents of the drive currents I1, I2, and I3 shape approximately the same waveforms as amplified first distributed current signals E1, E2, and E3, regardless of the first voltage switch signals T01, T02, and T03. The positive-side currents of the drive currents I1, I2, and I3 shape approximately the same waveforms as amplified first distributed current signals G1, G2, and G3, regardless of the second voltage switch signals T11, T12, and T13.

The following is a description of synchronous rectifying operations in Embodiment 2. The synchronous period setting part 201z of the switch signal composer 54 sets the synchronous rectifying period at an electrical angle of 180 degrees. As described above, the second superimposed current signals N1, N2, and N3 in Embodiment 1 function equivalently to the second voltage switch signals T11, T12, and T13, so that the pulse synchronous signal Ac and switching pulse signal Aw output from the synchronous rectifying controller 51 are equal to those in Embodiment 1. As a result, the synchronous rectifying in Embodiment 2 is the same timing as that in Embodiment 1; its detailed description will be omitted. It should be noted that the synchronous rectifying period, which is an electric angle of 120 degrees in Embodiment 1, is an electric angle of 180 degrees in Embodiment 2.

The motor of Embodiment 2 is more efficient than that in Embodiment 1. In Embodiment 2 the current supplied to the first voltage switch signal can be extremely small by means of the resistors 123, 124, and 125 of the first power amplifiers 5z, 6z, and 7z shown in FIG. 15. Since the synchronous rectifying period is an electric angle of 180 degrees in Embodiment 2, the motor has improved efficiency, compared with Embodiment 1.

In Embodiment 2, the first voltage switch signals T01, T02, and T03 are entered to the first power amplifiers 5z, 6z, and 7z, respectively, whereas the second voltage switch signals T11, T12, and T13 are entered to the second power amplifiers 8z, 9z, and 10z, respectively. This allows the motor to realize a great reduction in the on-resistance of the first NMOS power transistors 101, 104, and 107 of the first power amplifiers 5z, 6z, and 7z and the second NMOS power transistors 110, 113, and 116 of the second power amplifiers 8z, 9z, and 10z, without disturbing the current waveforms of the drive currents I1, I2, and I3. As a result, a remarkable reduction in power loss can be achieved in Embodiment 2.

The other configurations and operations in Embodiment 2 will not be detailed because they are similar to those in Embodiment 1. Moreover, the motor of Embodiment 2 has the same various advantages as in Embodiment 1.

In Embodiment 2, the first power amplifiers 5z, 6z, and 7z constitute first power amplifying means, whereas the second power amplifiers 8z, 9z, and 10z constitute second power amplifying means. The current supplying unit 14, the altering signal producing unit 15, and the distribution producing unit 16 constitute waveform shaping signal producing means. The current detector 11, the switching controller 12, and the control pulse producing unit 50z constitute switching control means. The synchronous rectifying control means is made of the synchronous rectifying controller 51. DC power source means is composed of the DC power source 30. Drive command means consists of the first current amplifiers 23, 24, and 25, the second current amplifiers 26, 27, and 28, the high voltage outputting part 29, first voltage switch producing units 40, 41, and 42, second voltage switch producing units 43, 44, and 45, and the switch signal composer 54z. Switch signal producing means is composed of the altering signal producing unit 19z. In addition, conduction control means comprises the waveform shaping signal producing means, the synchronous rectifying control means, the switch producing means, and the drive command means. It goes without saying that these components in the present invention can be replaced by those having the same functions.

<<Embodiment 3>>

Figure 20:
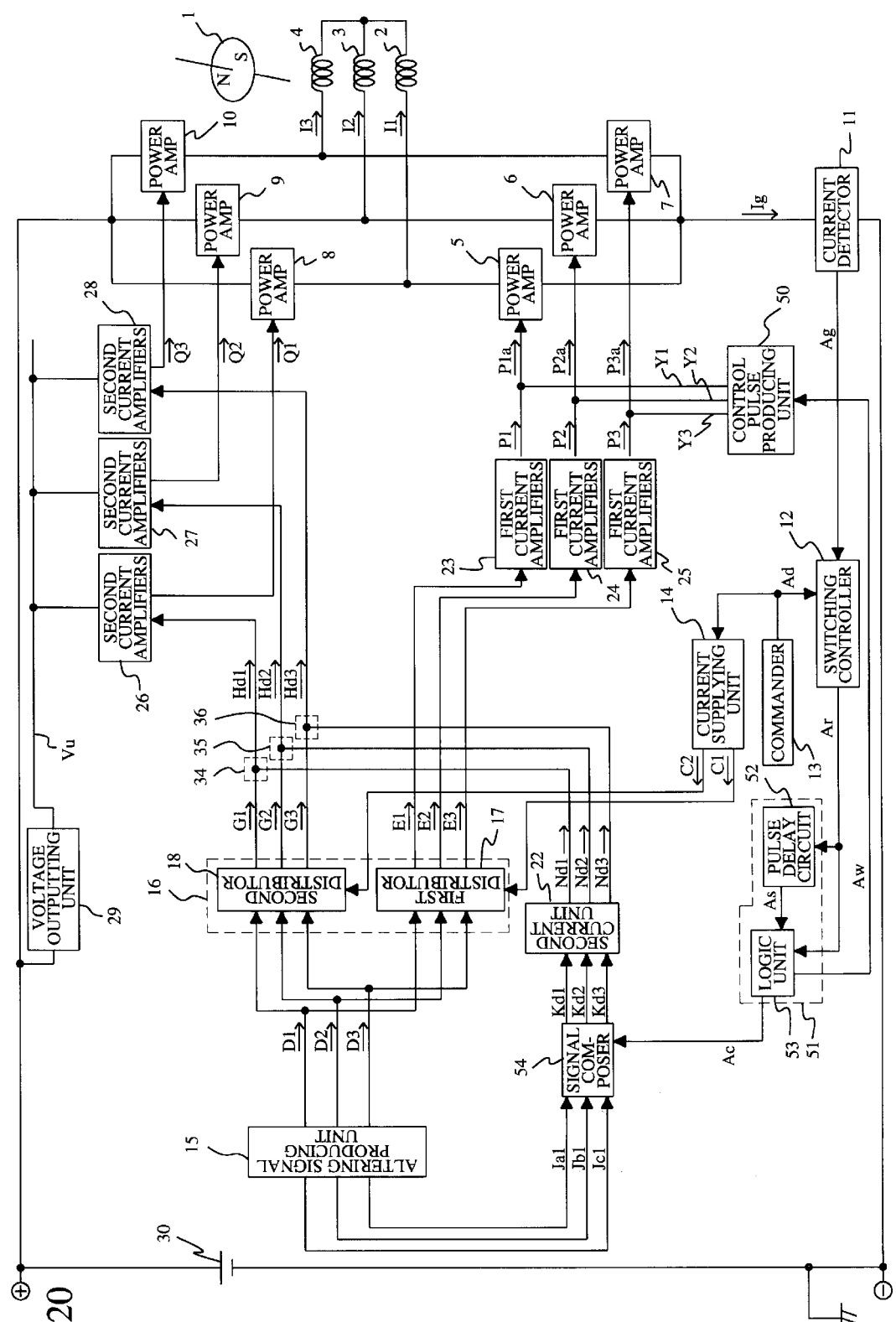
FIG. 20 is a diagram showing the entire configuration of the motor of Embodiment 3 of the present invention.

The motor of Embodiment 3 of the present invention will be described with reference to FIGS. 20 through 22. FIG. 20 shows the entire configuration of the motor of Embodiment 3. The motor of Embodiment 3 is different from the motor of Embodiment 1 in that it does not have the superimposed timing producing unit 19, the first superimposed current supplying unit 21, or the first composers 31, 32, and 33 of Embodiment 1, and is provided with a synchronous timing producing unit 54y configured differently from the superimposed signal composer 54 of Embodiment 1. The other configurations in Embodiment 3 will not be detailed because they are similar to those in Embodiment 1.

Figure 21:
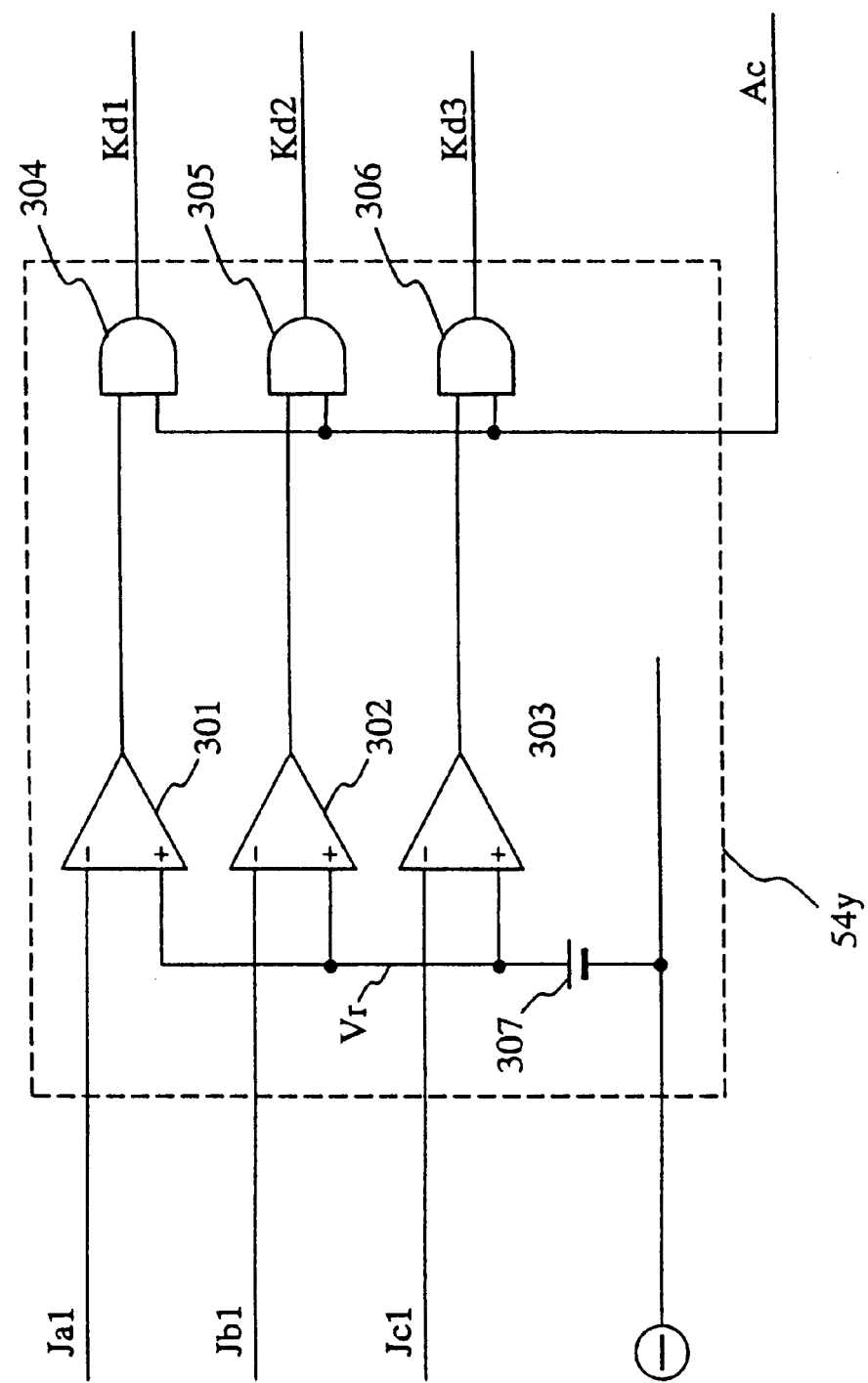
FIG. 21 is a circuit diagram showing the configuration of a synchronous timing producing unit 54y in Embodiment 3.
Figure 22:
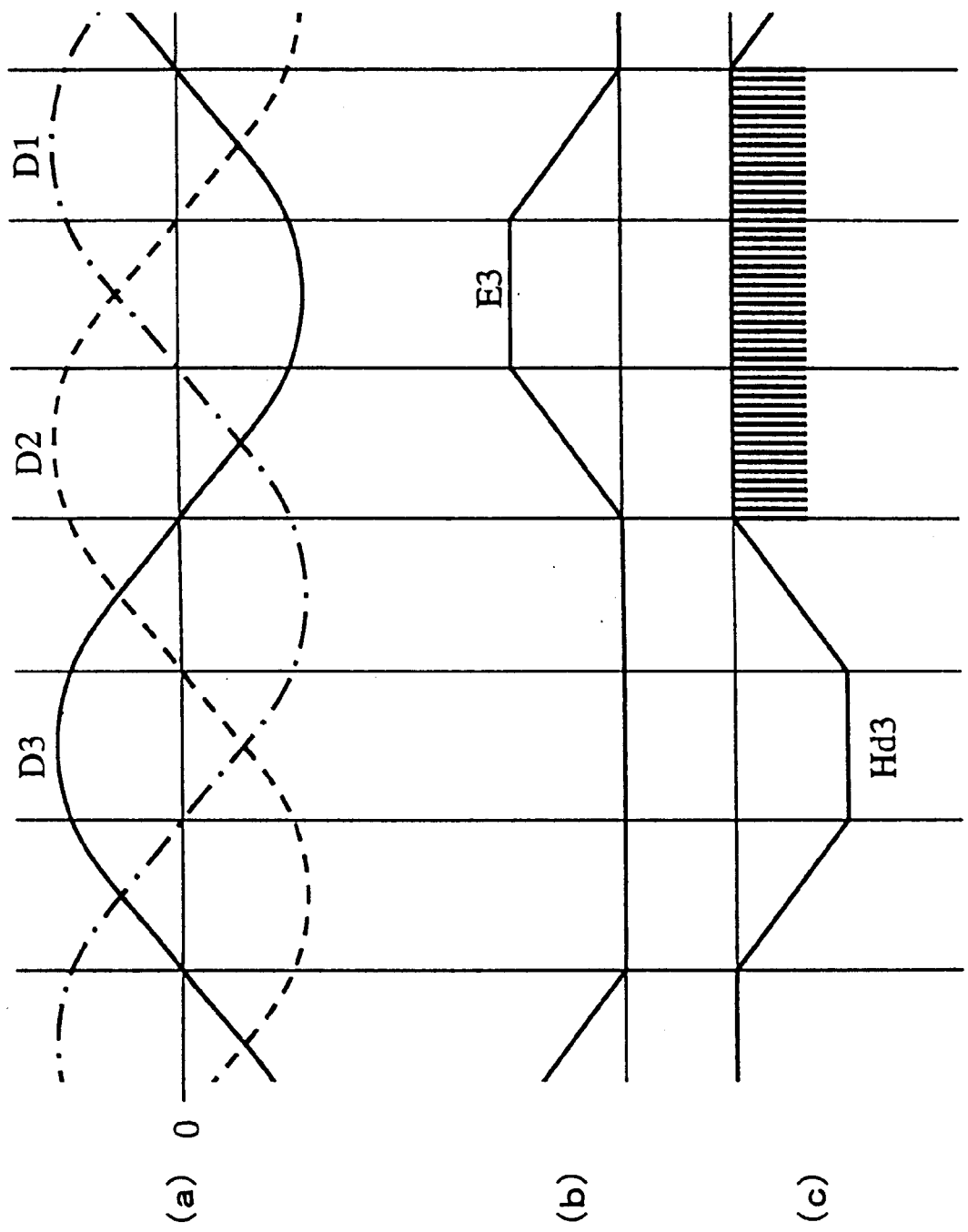
FIG. 22 is a waveform diagram only showing a one-phase composed current signal Hd3 of three-phase composed current signals Hd1, Hd2, and Hd3 in Embodiment 3.

FIG. 21 is a circuit diagram showing the configuration of the synchronous timing producing unit 54y. The synchronous timing producing unit 54y produces three-phase synchronous timing signals Kd1, Kd2, and Kd3 from the synchronous pulse signal Ac, and outputs the signals to the superimposed current supplying unit 22. The superimposed current supplying unit 22 outputs three-phase superimposed current signals Nd1, Nd2, and Nd3 responding to the three-phase synchronous timing signals Kd1, Kd2, and Kd3, respectively. The composers 34, 35, and 36 compose the three-phase superimposed current signals Nd1, Nd2, and Nd3 and the second distributed current signals G1, G2, and G3 to form three-phase composed current signals Hd1, Hd2, and Hd3, respectively. FIG. 22 only shows the waveform of the one-phase composed current signal Hd3 out of the three-phase composed current signals Hd1, Hd2, and Hd3. Thus the second distributed current signal G3 is composed with a current signal responding to the synchronous timing signal Kd3. The signals of the other phases have similar waveforms.

Since the power transistors of the power amplifiers in Embodiment 3 have similar switching operations and synchronous rectifying timing to those in Embodiments 1 and 2, their detailed description will be omitted. As described above, the superimposed current signals and switch signals in Embodiments 1 and 2 do not affect the drive current waveforms. Therefore, the drive currents shape as smooth waveforms as in Embodiments 1 and 2.

The motor of Embodiment 3 achieves smooth drive current waveforms while performing the switching operations of the power transistors of the power amplifiers, and realizes synchronous rectifying operations at the same time. Hence Embodiment 3 provides a motor with high efficiency and minor vibration.

In Embodiment 3, the first power amplifiers 5, 6, and 7 constitute first power amplifying means, while the second power amplifiers 8, 9, and 10 constitute second power amplifying means. The current supplying unit 14, the altering signal producing unit 15, and the distribution producing unit 16 constitute waveform shaping signal producing means. The current detector 11, the switching controller 12, and the control pulse producing unit 50 constitute switching control means. Synchronous rectifying control means is made of the synchronous rectifying controller 51. DC power source means is composed of the DC power source 30. Drive command means consists of the superimposed current supplying unit 22, the first current amplifiers 23, 24, and 25, the second current amplifiers 26, 27, and 28, a high-voltage outputting unit 29, the second composers 34, 35, and 36, and the synchronous timing producing unit 54y. In addition, conduction control means comprises the waveform shaping signal producing means, the synchronous rectifying control means, and the drive command means. It goes without saying that these components in the present invention can be replaced by those having the same functions.

The specific configurations of Embodiments 1, 2, and 3 described hereinbefore can be modified variously. For example, the windings with different phases can be structured by connecting plural windings either in serial or parallel. The number of the phases of the windings is not limited to three.

The movable body in the motor of the present invention can be designed to perform a linear movement instead of a rotary movement. The number of poles of the movable body is not limited to two; a multi-pole configuration may be possible, and a magnetic wheel can be used.

The number of the position detecting elements used in the altering signal producing unit of the present invention is not restricted to three; it can be two or more than three. The altering signal producing unit comprises a position detection part employing magnetic-electronic converting elements in the above-mentioned embodiments; however, the present invention is not restricted to the configuration, and for example, the altering signals can be produced by making use of reversed voltage caused in windings.

The configuration of the distribution producing unit in the motor of the present invention is not restricted to the embodiments. For the purpose of preventing the pulsation of the drive currents, it is preferable that when the polarity of the drive currents changes, the current value is continuously varied; however, since there is a time period when the first distributed current signal and the second distributed current signal having the same phase concurrently become zero, the drive current for the phase can be made zero in a certain time period.

The motor of the present invention does not necessarily need to use the altering signal producing unit or the distribution producing unit; sine wave signals can be output by using, for example, a one-chip micro computer, a ROM, and a D/A converter. Besides sine waveforms or trapezoidal waveforms, any other waveform can be possible as long as it has a conduction width larger than an electric angle of 360/Q degrees.

In the motor of the present invention, the first power amplifiers are not exclusively switching-controlled; both the first power amplifiers and the second power amplifiers may be switching-controlled, or the second power amplifiers only can be switching-controlled.

In the motor of the present invention, FET transistors (Field Effect Transistors) can be employed as the transistors and diodes used in the switching controller 12, the commander 13, the current supplying unit 14, the altering signal producing unit 15, the distribution producing unit 20, and other components.

In the aforementioned embodiments, double-diffused NMOS-FET transistors are used as the power transistors, and parasitic diodes reversely connected to the FET transistors are used as the power diodes so as to simplify the configuration. Although power diodes can be mounted in an integrated circuit together with power transistors, they can be added externally to the integrated circuit, and it goes without saying that the present invention includes such a configuration. For example, Schottky-type power diodes may be connected reversely to the power transistors in parallel.

In the motor of the present invention, the pulse delay circuit 52 of the synchronous rectifying controller 51 can be composed of a resistor and a capacitor instead of employing a reference clock and a flip flop circuit.

In the aforementioned embodiments, the periods of synchronized rectification have an electric angle of 180 degrees or 120 degrees; however, the present invention does not restrict the angle to these degrees.

The aforementioned embodiments show the production of either the first superimposed timing signals J1, J2, and J3 and the second superimposed timing signals K1, K2, and K3, or the first switch timing signals W1, W2, and W3 and the second switch timing signals S1, S2, and S3 from the position detecting signals of the altering signal producing unit 15; however, the present invention allows these signals to be produced from the altering signals D1, D2, and D3. The present invention also makes it possible to produce either the first superimposed timing signals J1, J2, and J3 and the second superimposed timing signals K1, K2, and K3, or the first switch timing signals W1, W2, and W3 and the second switch timing signals S1, S2, and S3 from the first distributed current signals E1, E2, and E3 or the second distributed current signals G1, G2, and G3.

It goes without saying that various other modifications are possible without changing the subject of the present invention and that they are included in the present invention.

The motor of the present invention detects the conduction current pulse supplied by the DC power source, and switching-controls the power transistors in response to the comparison results of the command signal and the detected signal. Thus the power amplifiers reduce power loss and heat generation, thereby achieving a motor having excellent power efficiency.

The motor of the present invention improves power efficiency by performing synchronous rectification.

The motor of the present invention can switch the current paths simply and smoothly by supplying the power amplifiers with smoothly changing distributed current signals. As a result, according to the present invention, the drive currents have less pulsation, thereby greatly diminishing the pulsation of the driving force generated by the motors as well as motor vibration.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above-mentioned disclosure. Accordingly, it is intended that the appended claims be interpreted as covering all alterations and modifications as fall within the true spirit and scope of the invention.

What is claimed is:

1. A motor comprising: a movable body, plural-phase windings; DC power source means as power supply source; Q pieces (Q is an integer of 3 or greater) of first power amplifying means each including a first power transistor forming a current path between one terminal side of said DC power source means and one terminal of said plural-phase windings; and Q pieces of second power amplifying means each including a second power transistor forming a current path between the other terminal side of said DC power source means and one terminal of said plural-phase windings; conduction control means for controlling conduction of said first power amplifying means and said second power amplifying means; and switching control means for controlling high-frequency switching operations for one or both of the first power transistors of said first power amplifying means and the second power transistors of said second power amplifying means, wherein said conduction control means comprises waveform shaping signal producing means for producing Q-phase waveform shaping signals each having a conduction width larger than an electric angle of 360/Q degrees; synchronous rectifying control means for controlling the timing of synchronous rectification; and drive command means for controlling conduction of at least one of said second power amplifying means in response to said waveform shaping signals and the output signal of said synchronous rectifying control means.

2. The motor in accordance with claim 1, wherein said waveform shaping signal producing means comprises altering signal producing means for outputting plural-phase altering signals, current supplying means for outputting supply current signals which are supply currents of one or both of said first power amplifying means and said second power amplifying means, and which vary in response to a command signal, and distribution control means for producing Q-phase waveform shaping current signals by distributing said supply current signals to one phase or two phases alternately responding to the output signals of said altering signal producing means.

3. The motor in accordance with claim 1, wherein said switching control means comprises comparison means for comparing a command signal with the drive currents to said windings, and means for outputting switching control signals varying in direct response to output pulse signals of said comparison means, wherein said synchronous rectifying control means comprises, delay means for producing delay pulse signals by delaying said switching control signals, and means for producing two pulse signals having change points shifted in time from each other responding to said switching control signals and said delay pulse signals.

4. The motor in accordance with claim 1, wherein said drive command means comprises, composing means for composing said waveform shaping signals with output signals of said synchronous rectifying control means and for outputting composed command signals, and current amplifying means for producing amplified current signals by current-amplifying said composed command signals by a certain ratio and for outputting them to said first power amplifying means.

5. The motor in accordance with claim 1, wherein said drive command means comprises, composing means for composing said waveform shaping signals with output signals of said synchronous rectifying control means and for outputting composed command signals, and current amplifying means for producing amplified current signals by current-amplifying said composed command signals by a certain ratio and for outputting them to said second power amplifying means.

6. The motor of in accordance with claim 1, wherein said conduction control means comprises superimposed signal producing means for producing superimposed signals which are output in a period shorter than a conduction period of said waveform shaping signals in a conduction period larger than the 360/Q degrees of said waveform shaping signals, and said drive command means comprises composing means for composing said waveform shaping signals with said superimposed signals.

7. The motor in accordance with claim 6, wherein said conduction control means comprises superimposed signal composing means for composing said superimposed signals with the output signals of said synchronous rectifying control means.

8. The motor of claim 6, wherein said superimposed signal producing means produces superimposed signals from the output signals of said altering signal producing means, said superimposed signals being output in a period of an electric angle of 360/Q degrees.

9. The motor in accordance with claim 1, wherein said conduction control means comprises switch signal producing means for producing switch signals which are output in a period shorter than a conduction period of said waveform shaping signals in a conduction period larger than the 360/Q degrees of said waveform shaping signals, and said drive command means outputs voltage switch signals responding to said switch signals to said first power amplifying means.

10. The motor in accordance with claim 1, wherein said conduction control means comprises switch signal producing means for producing switch signals which are output in a period shorter than a conduction period of said waveform shaping signals in a conduction period larger than the 360/Q degrees of said waveform shaping signals, and said drive command means outputs voltage switch signals responding to said switch signals to said second power amplifying means.

11. The motor in accordance with claim 9, wherein said switch signal producing means produces switch signals from the output signals of said altering switch producing means, said switch signals being output in a period of an electric angle of 360/Q degrees.

12. A motor comprising: a movable body; plural-phase windings; DC power source means as power supply source; Q pieces (Q is an integer of 3 or greater) of first power amplifying means each including a first power transistor forming a current path between one terminal side of said DC power source means and one terminal of said plural-phase windings; and Q pieces of second power amplifying means each including a second power transistor forming a current path between the other terminal side of said DC power source means and one terminal of said plural-phase windings; conduction control means for controlling conduction of said first power amplifying means and said second power amplifying means; and switching control means for controlling high-frequency switching operations for one or both of the first power transistors of said first power amplifying means and the second power transistors of said second power amplifying means, wherein said conduction control means comprises waveform shaping signal producing means for producing Q-phase waveform shaping signals each having a conduction width larger than an electric angle of 360/Q degrees; synchronous rectifying control means for controlling the timing of synchronous rectification; switch signal producing means for producing switch signals which are output in a period shorter than a conduction period of said waveform shaping signals in a conduction period larger than the 360/Q degrees of said waveform shaping signals; and drive command means for controlling conduction of at least one of said second power amplifying means in response to said waveform shaping signals, the output signals of sa id synchronous rectifying control means, and said switch signals.

13. The motor in accordance with claim 12, wherein said drive command means comprises current amplifying means for producing amplified current signal by current-amplifying said waveform shaping signals at a certain ratio and outputting them to said second power amplifying means, switch composing means for composing the output signals of said synchronous rectifying control means with said switch signals, and voltage switch producing means for outputting voltage switch signals responding to the output signals of said switch composing means to said second power amplifying mean s.

14. The motor in accordance with claim 12 wherein said waveform shaping signal producing means comprises altering sign al producing means for outputting plural-phase altering signals, current supplying means for outputting supply current signals which are supply currents of one or both of said first power amplifying means and said second power amplifying means, and which vary in response to a command signal, and distribution control means for producing Q-phase waveform shaping current signals by distributing said supply current signals to one phase or two phases alternately responding to the output signals of said altering signal producing means.

15. The motor in accordance with claim 12 wherein said switching control means comprises comparison means for comparing a command signal with the drive currents to said windings, and means for outputting switching control signals varying in direct response to output pulse signals of said comparison means, wherein said synchronous rectifying control means comprises, delay means for producing delay pulse signals by delaying said switching control signals, and means for producing two pulse signals having change points shifted in time from each other responding to said switching control signals and said delay pulse signals.

16. The motor in accordance with claim 12, wherein said switch signal producing means produces switch signals from the output signals of said altering signal producing means, said switch signals being output in a period of an electric angle of 360/Q degrees.

* * * * *

UNITED STATES PATENT AND TRADEMARK OFFICE
CERTIFICATE OF CORRECTION

PATENT NO.   : 6,255,789 B1
DATED        : July 3, 2001
INVENTOR(S)  : Ochi et al.

It is certified that error appears in the above-identified patent and that said Letters Patent is hereby corrected as shown below:

Column 4,
Line 64, please delete "th rough", and insert therefor -- through --.

Column 6,
Line 48, please delete "Apart", and insert therefor -- A part --.
Line 56, please delete "times ." and insert therefor -- times --.

Column 13,
Line 21, please delete "a nd" and insert therefor -- and --.

Column 16,
Line 23, please delete "How ever,", and insert therefor -- However, --.
Line 51, please delete "current s", and insert therefor -- currents --.

Column 18,
Line 58, please delete "a nd", and insert therefor -- and --.
Line 63, please delete "firs t", and insert therefor -- first --.

Column 21,
Line 15, please delete "mot or", and insert therefor -- motor --.
Line 32, please delete "fi rst", and insert therefor -- first --.

Column 22,
Line 32, please delete "cur rent", and insert therefor -- current --.

Column 24,
Line 17, please delete "20z", and insert therefor -- 201z --.

Column 25,
Line 19, please delete "S11", and insert therefor -- Sc1 --.
Line 67, please delete "state" and insert therefor -- state). --.

Column 29,
Line 28, please delete "an", and insert therefor -- and --.
Line 29, please delete "d".

UNITED STATES PATENT AND TRADEMARK OFFICE
CERTIFICATE OF CORRECTION

PATENT NO. : 6,255,789 B1
DATED : July 3, 2001
INVENTOR(S) : Ochi et al.

It is certified that error appears in the above-identified patent and that said Letters Patent is hereby corrected as shown below:

Column 32,
Line 25, please delete "sa id", and insert therefor -- said --.
Line 37, please delete "mean s.", and insert therefor -- means. --.
Line 40, please delete "sign al", and insert therefor -- signal --.

Signed and Sealed this

Fourth Day of June, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.    : 6,255,789 B1
DATED         : July 3, 2001
INVENTOR(S)   : Ochi et al.

It is certified that error appears in the above-identified patent and that said Letters Patent is hereby corrected as shown below:

The title page showing the illustrative figure should be deleted and replaced therefore with the attached title page.

Figure 23:
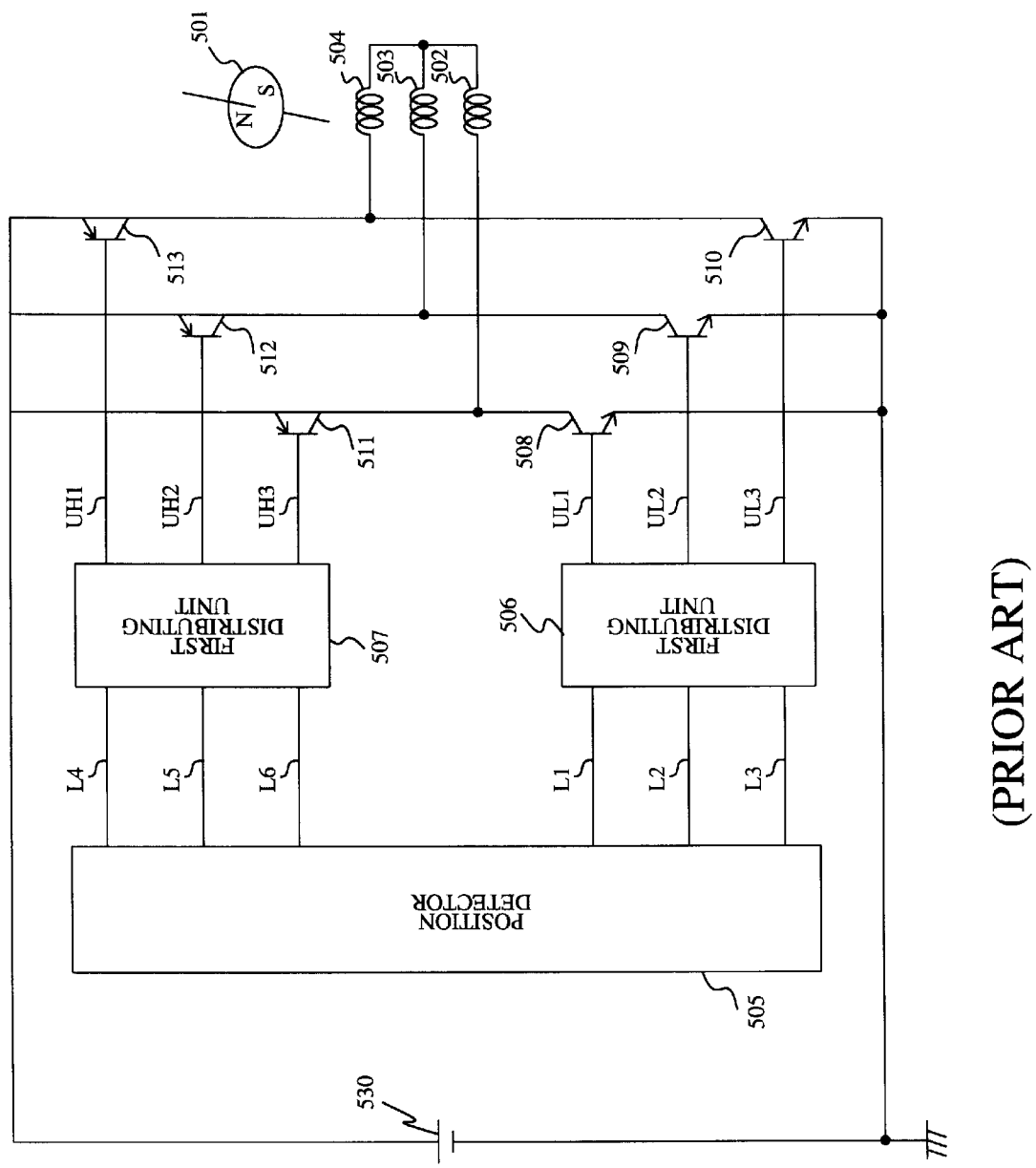
FIG. 23 is a diagram showing the configuration of a prior art motor.
Figure 1:
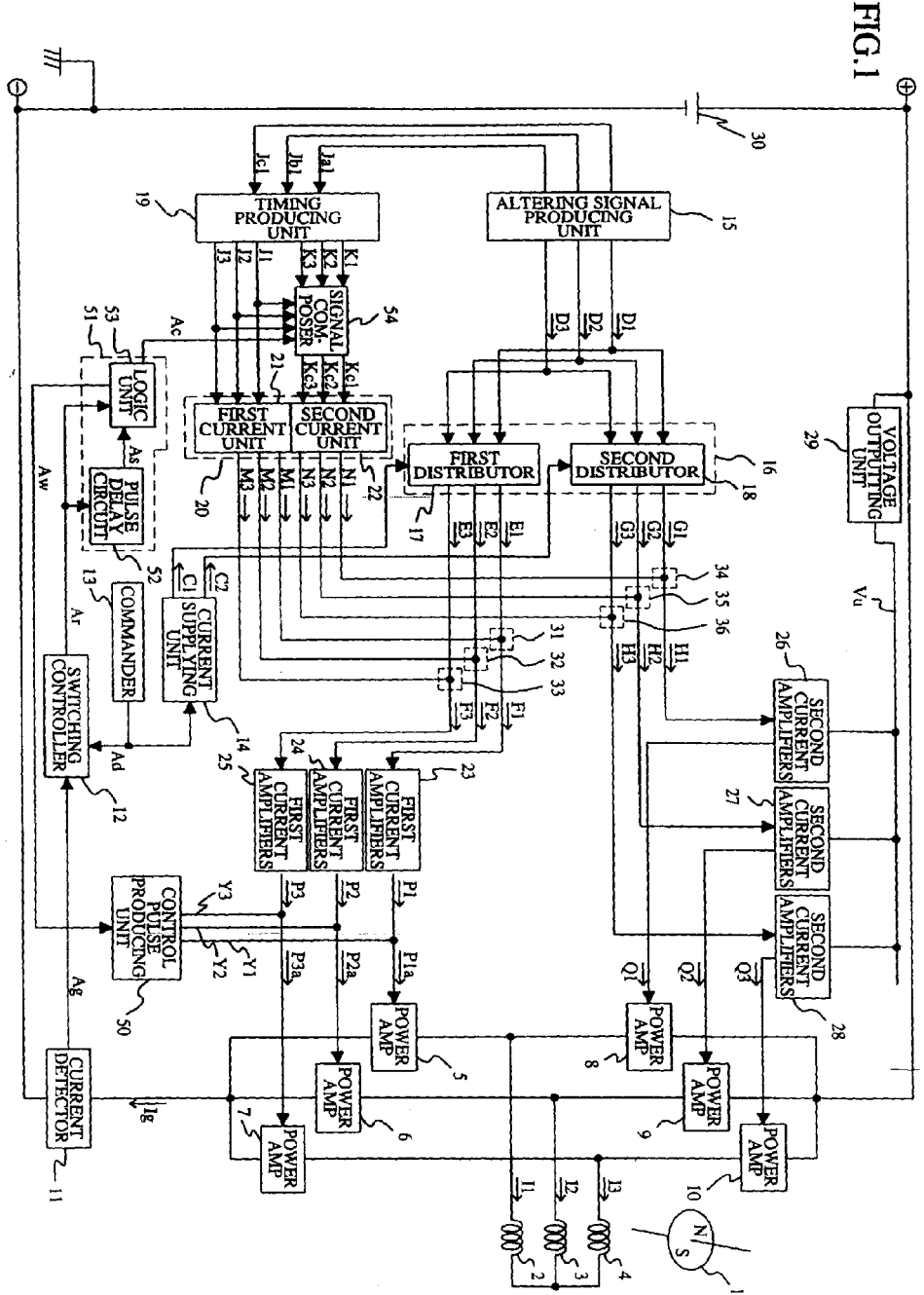
Figure 2:
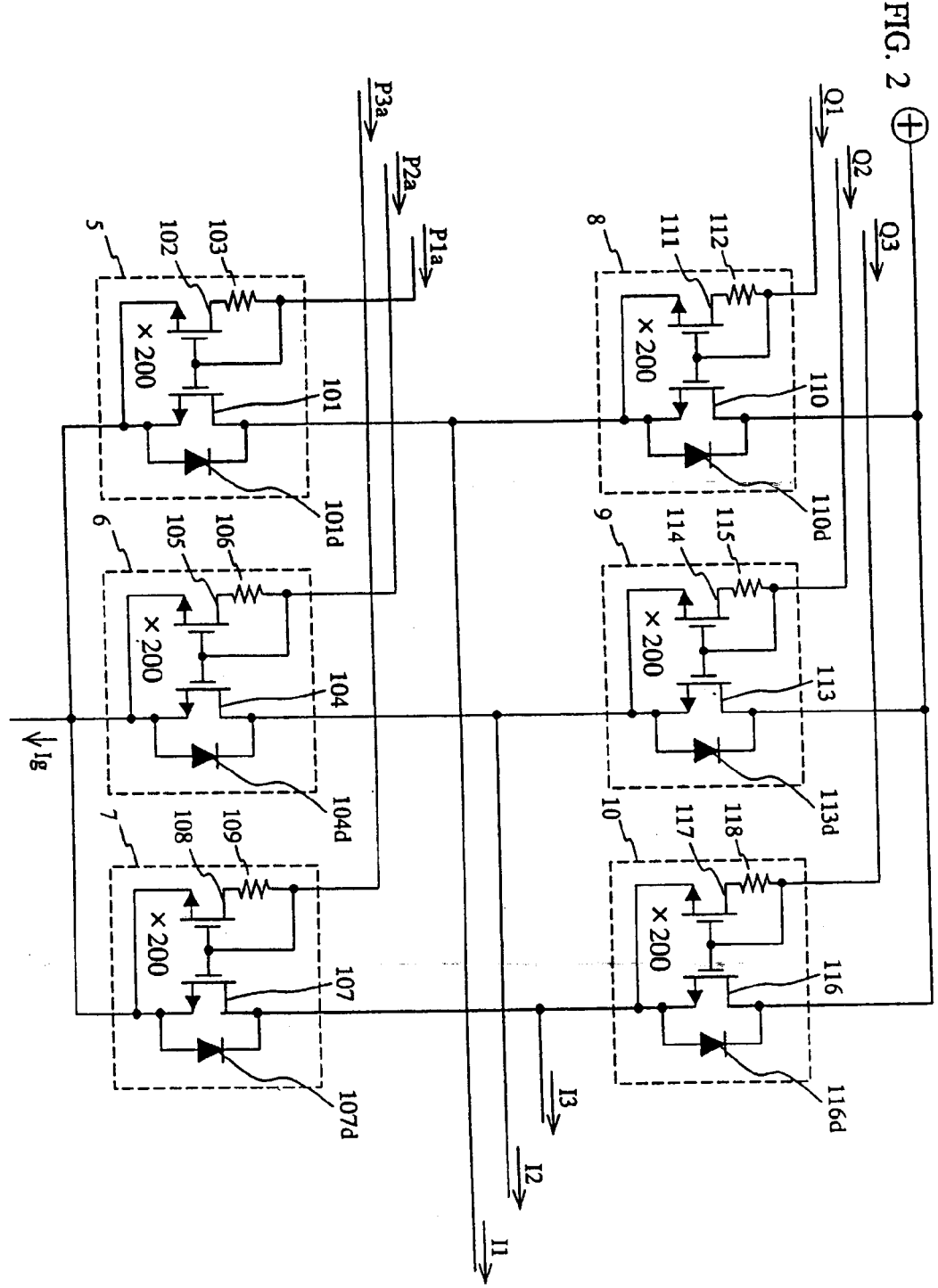
Figure 3:
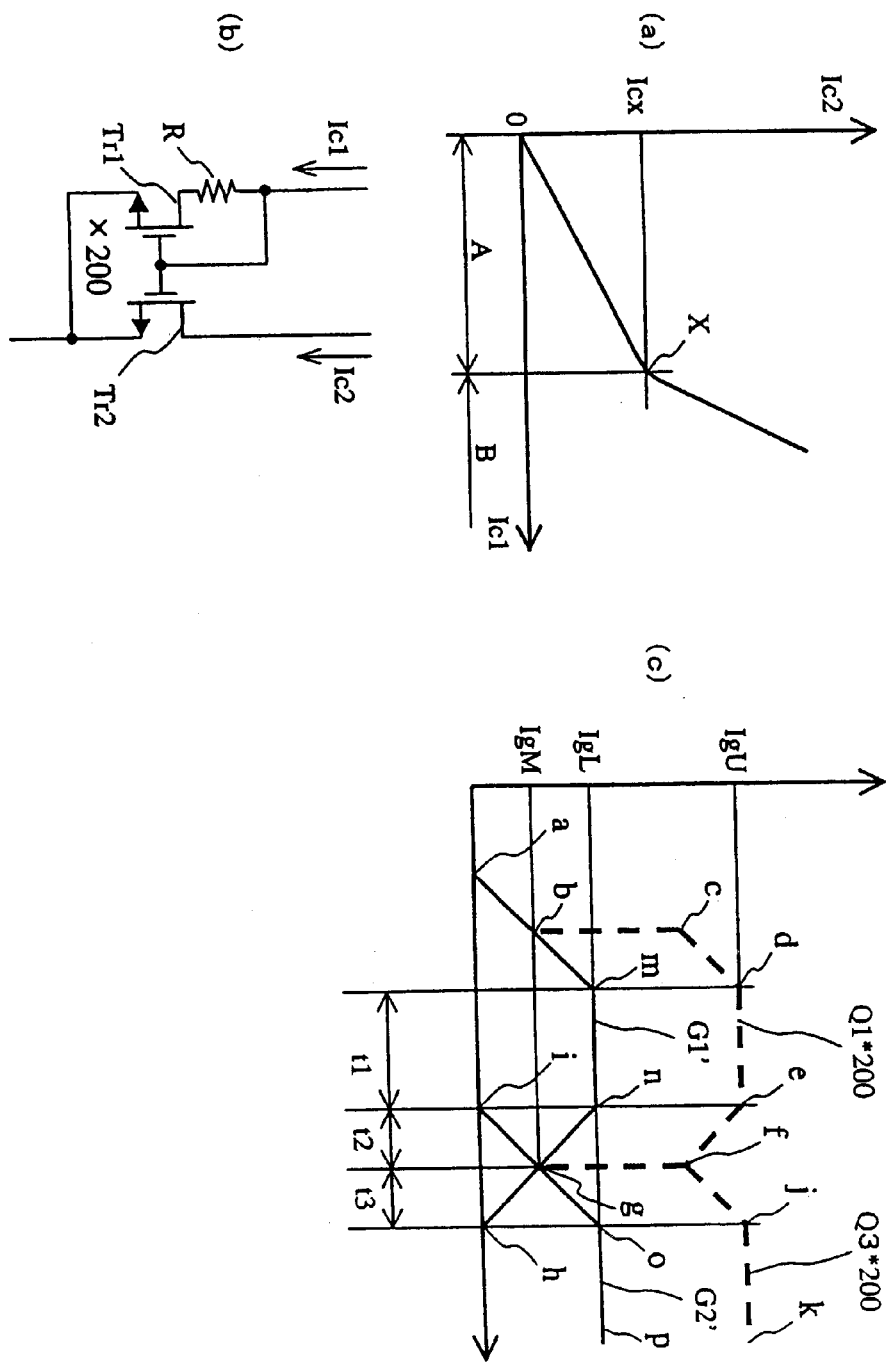
Figure 4:
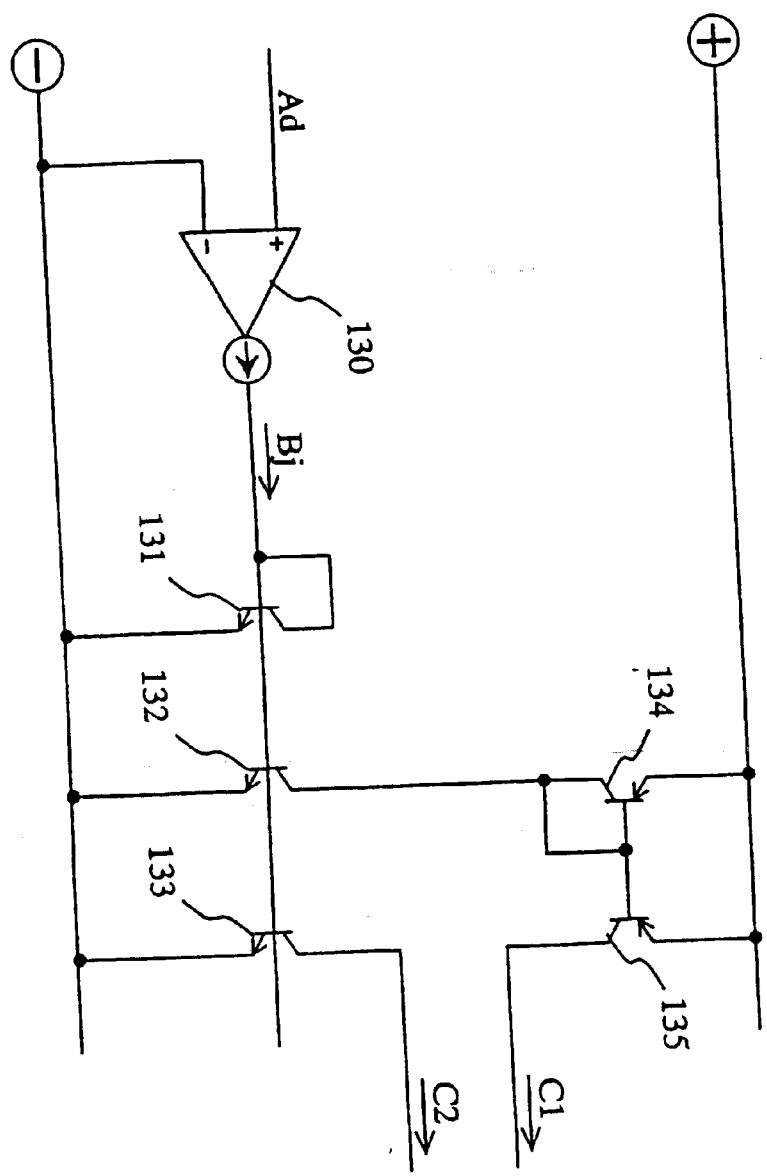
Figure 5:
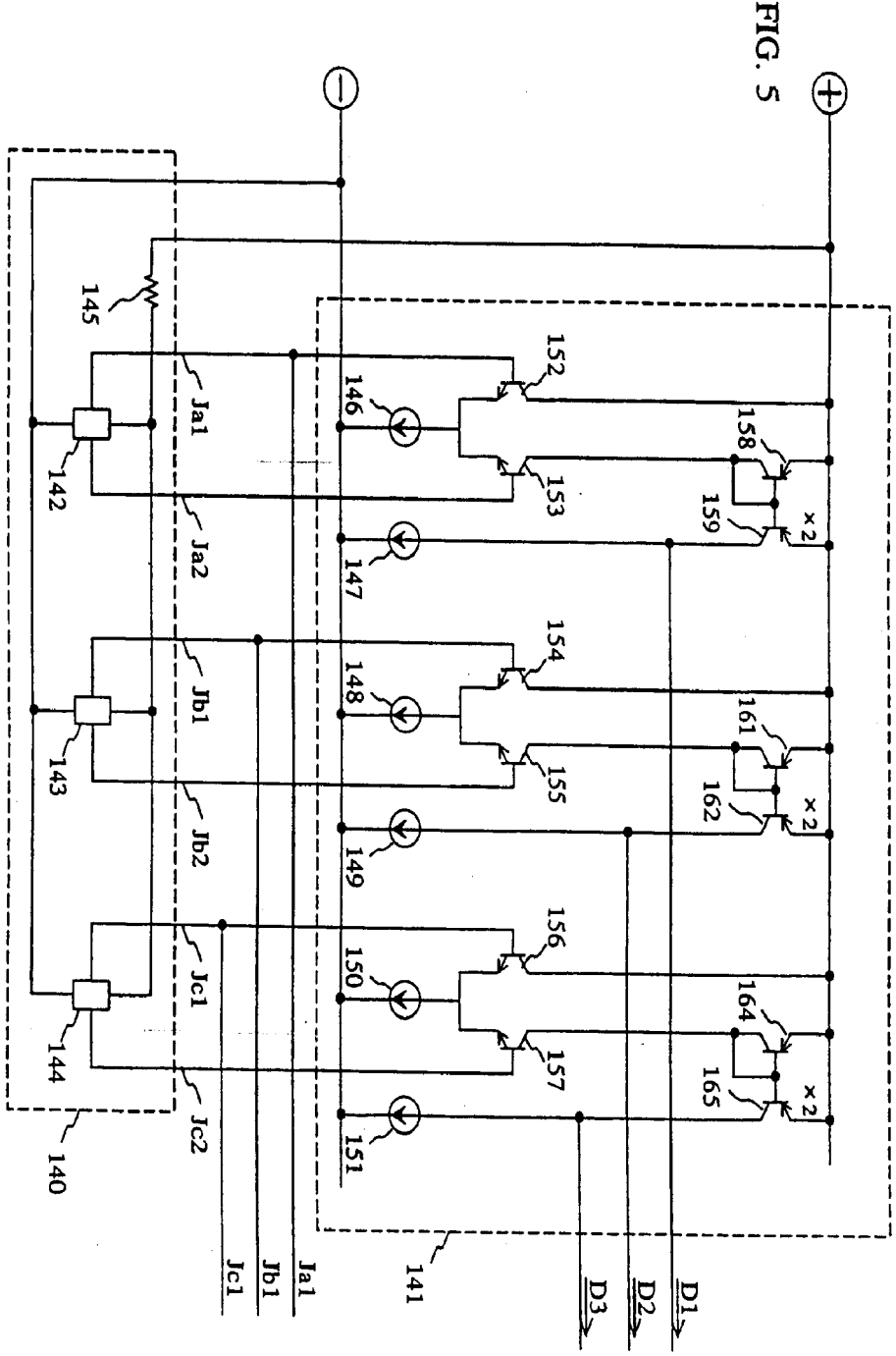
Figure 6:
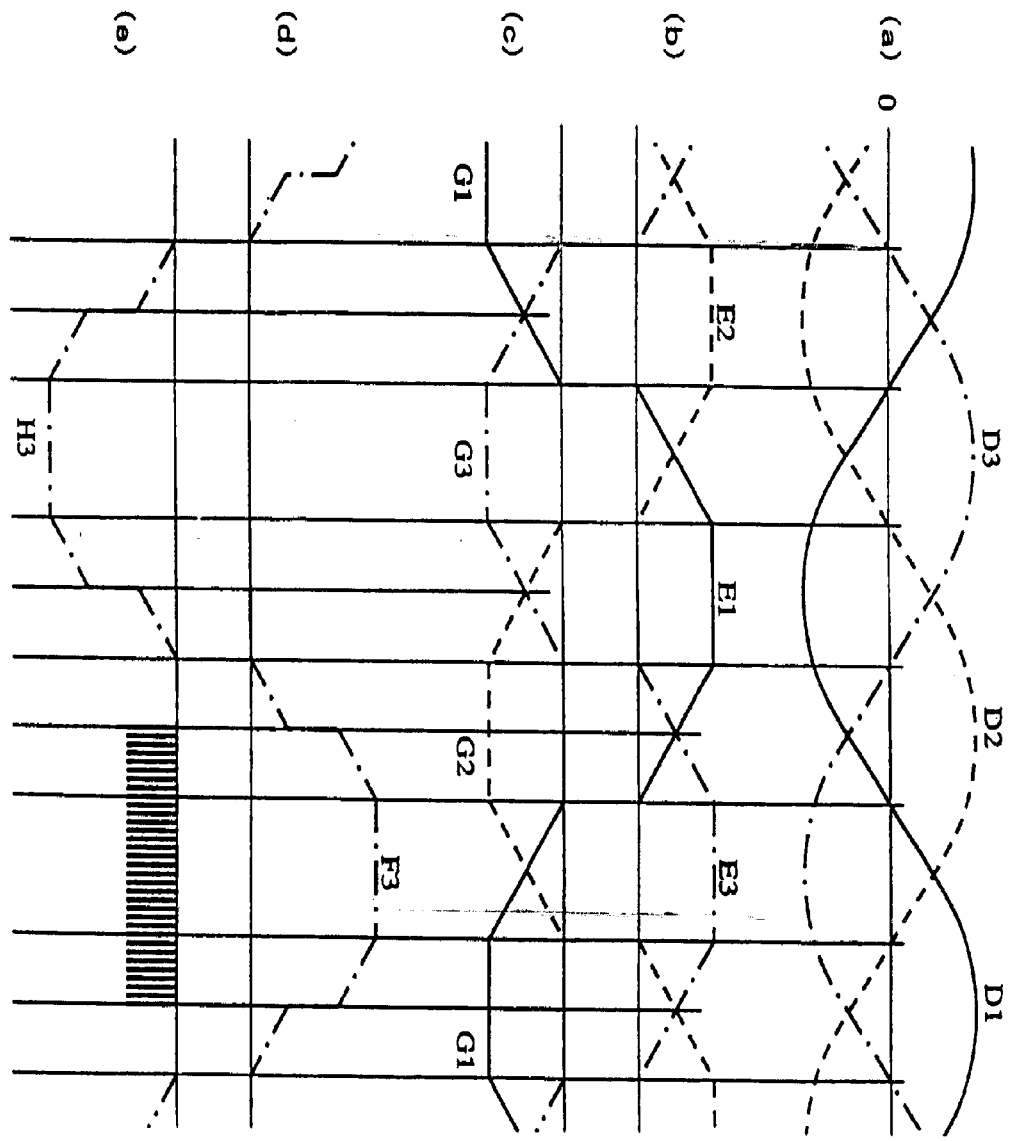
Figure 7:
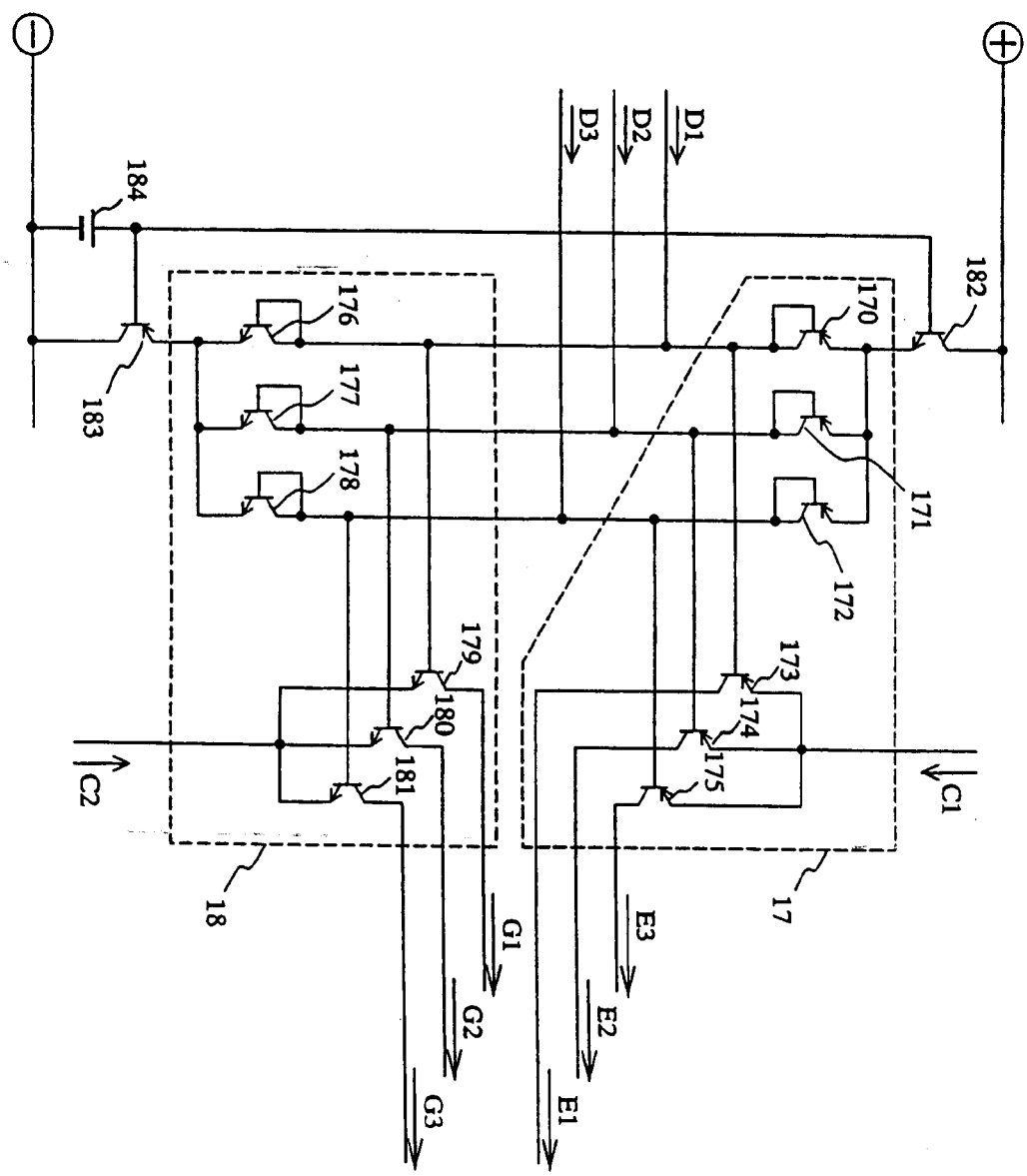
Figure 8:
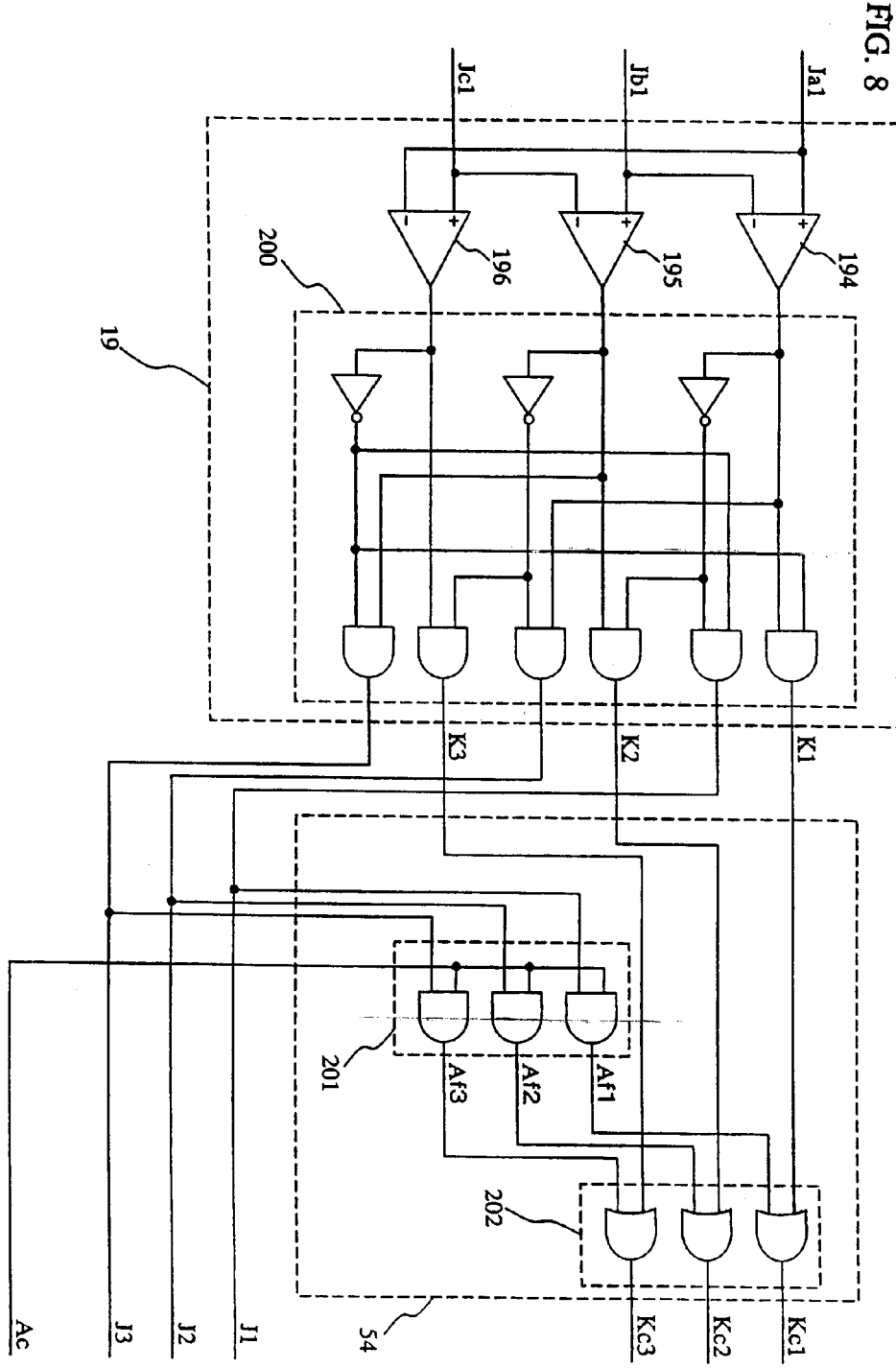
Figure 9:
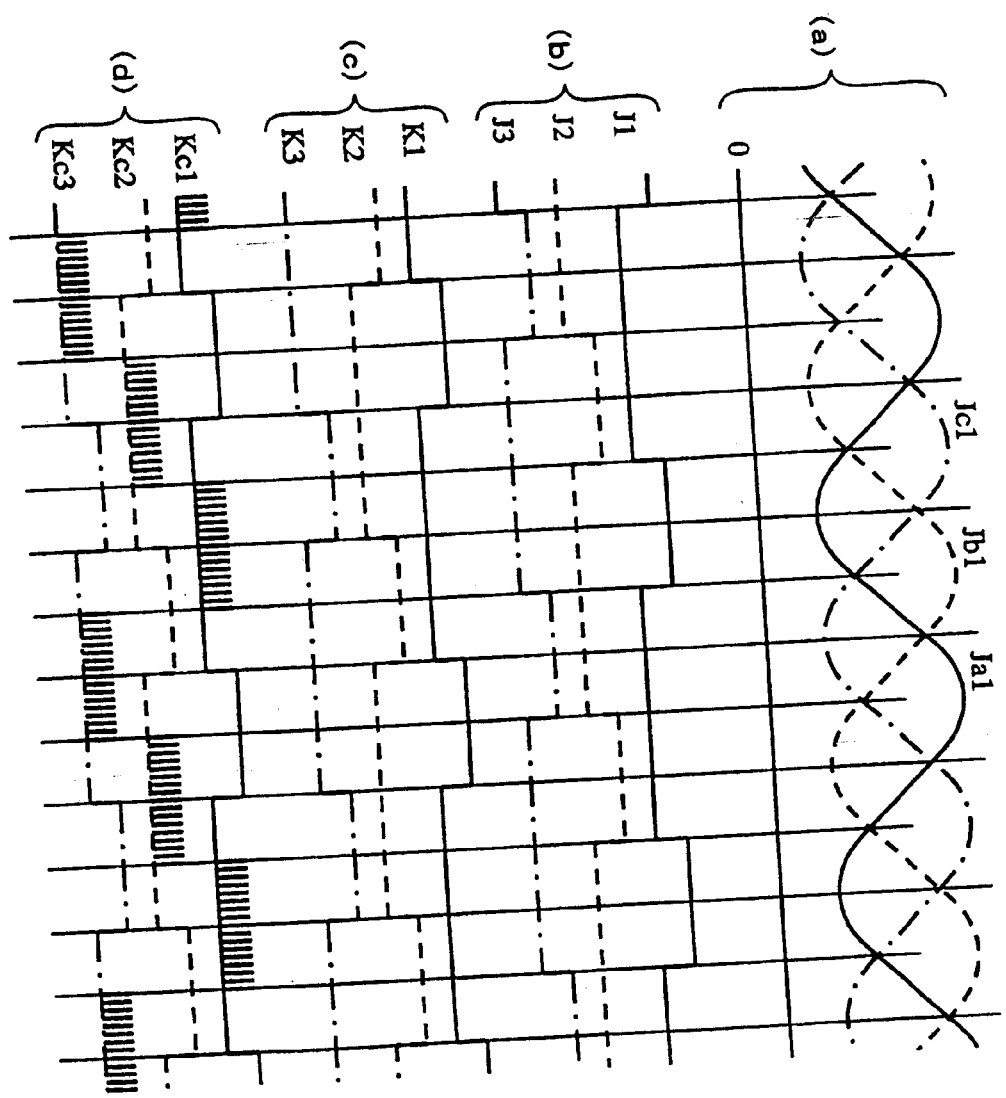
Figure 10:
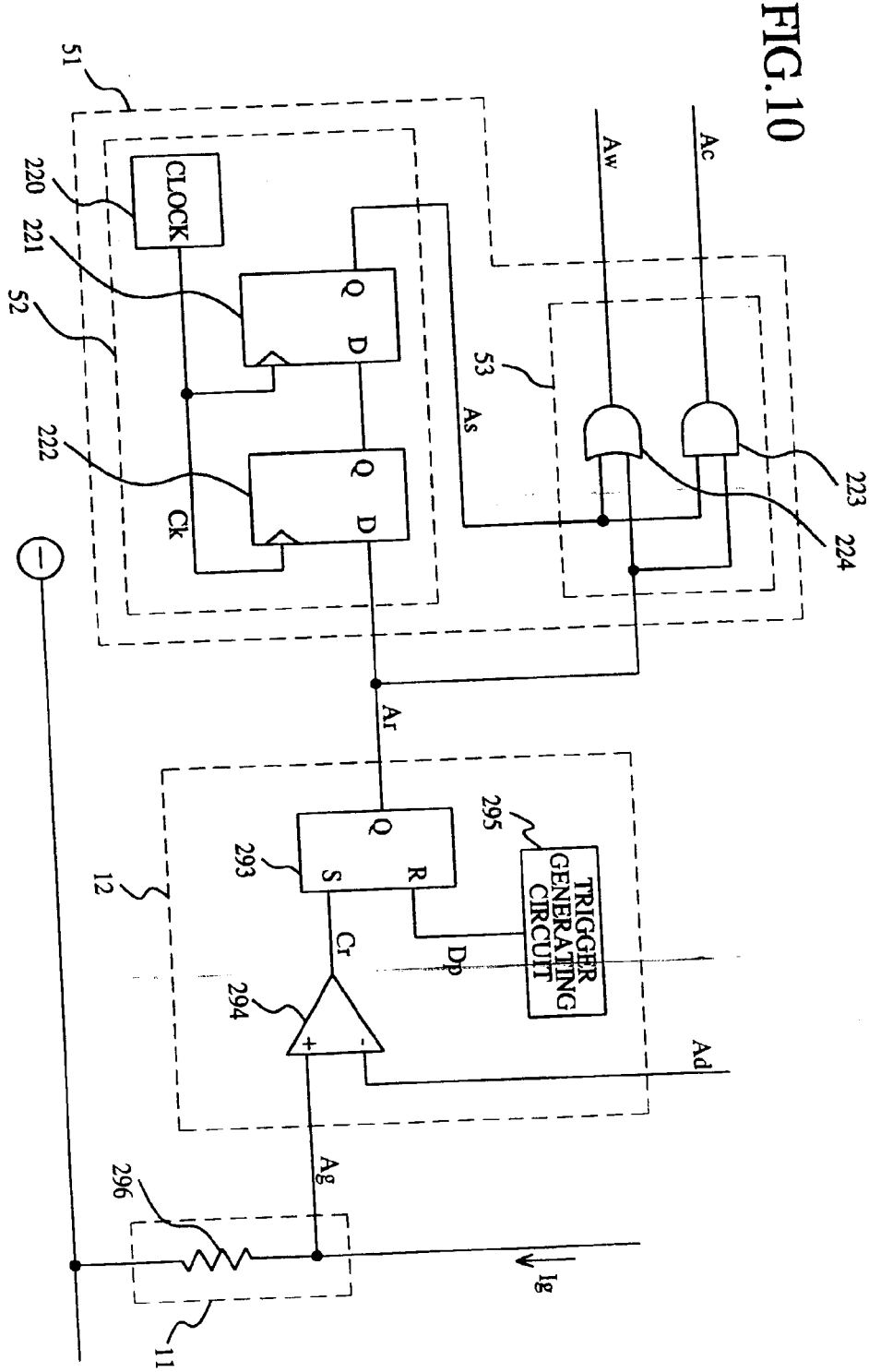
Figure 11:
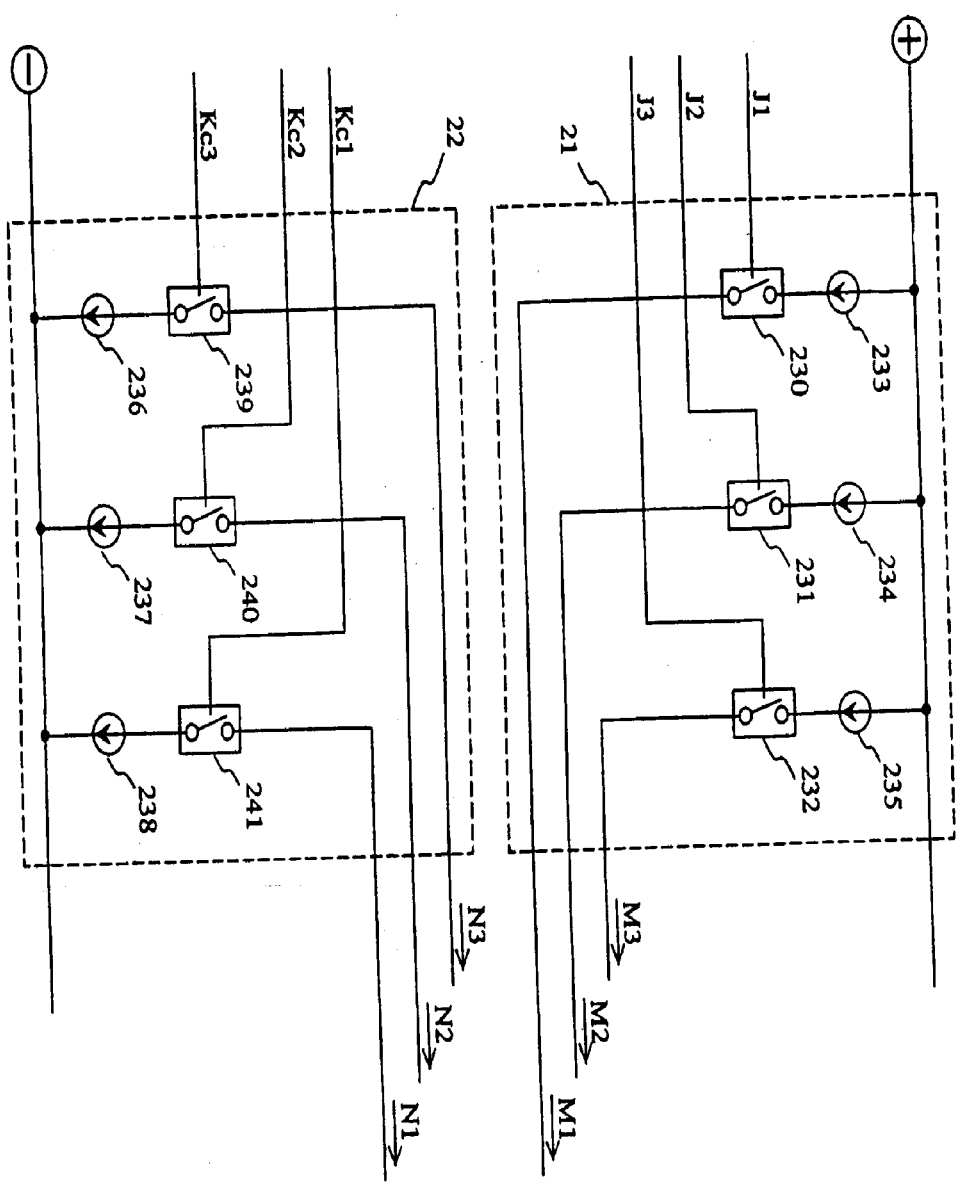
Figure 12:
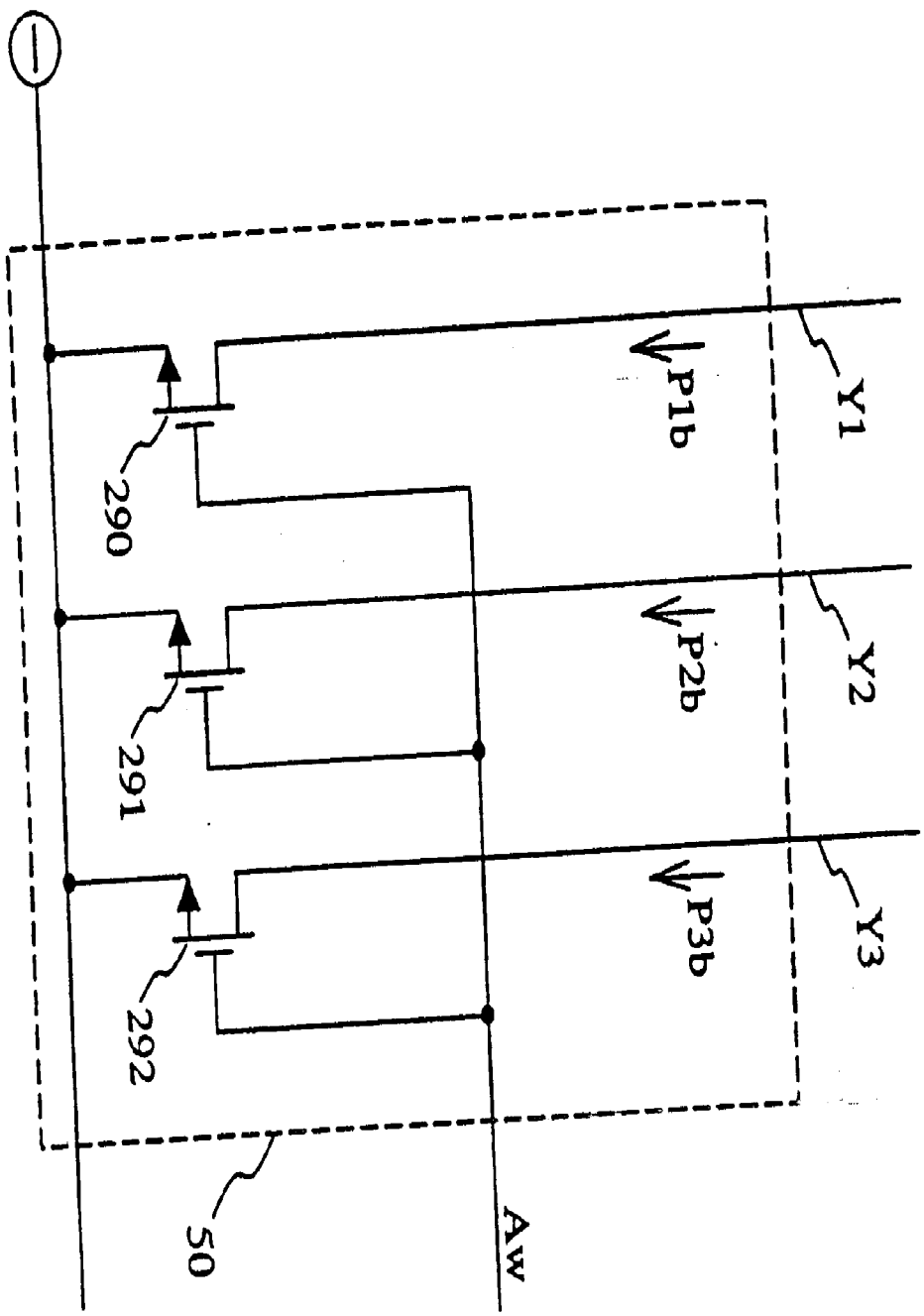
Figure 13:
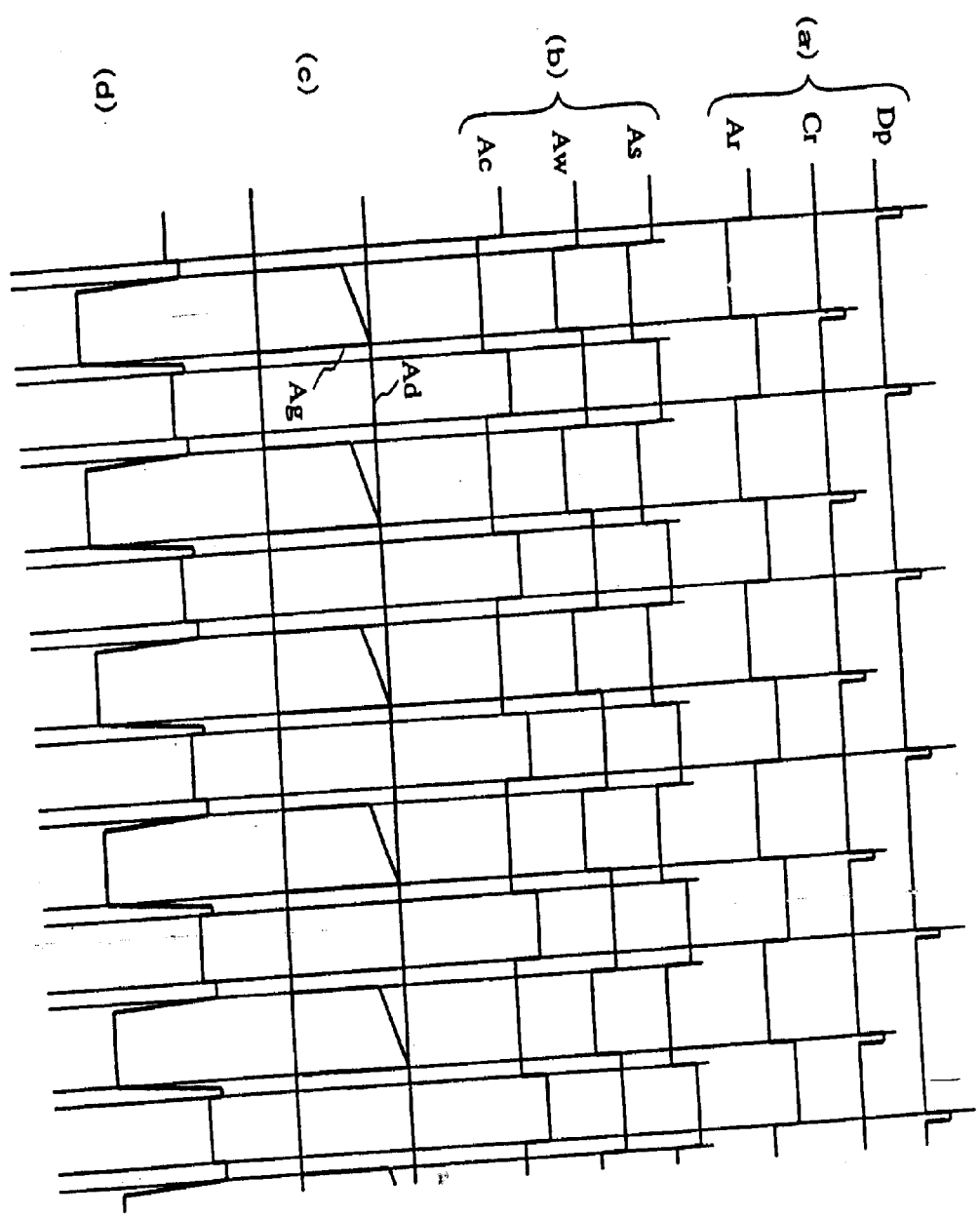
Figure 14:
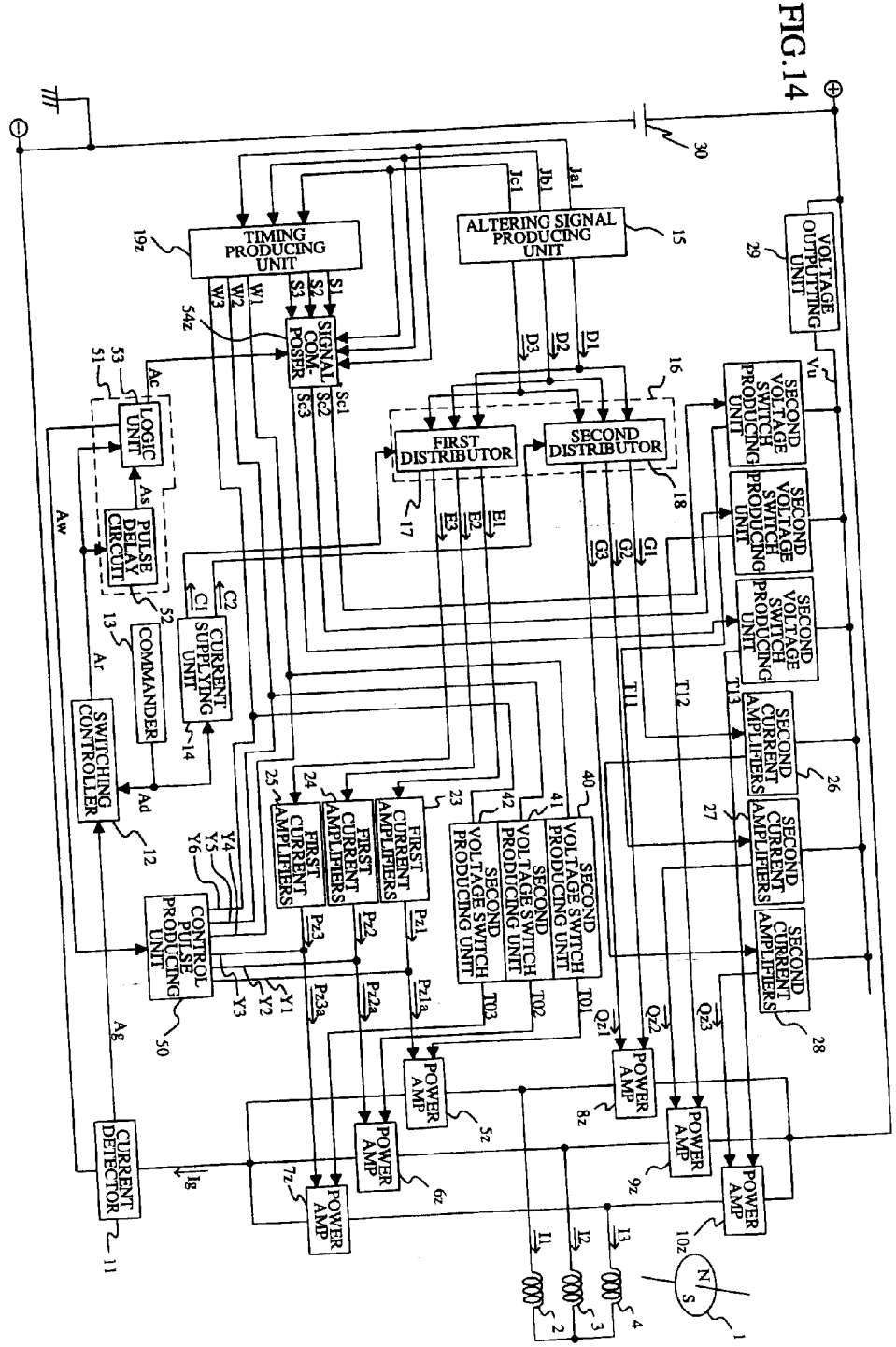
Figure 15:
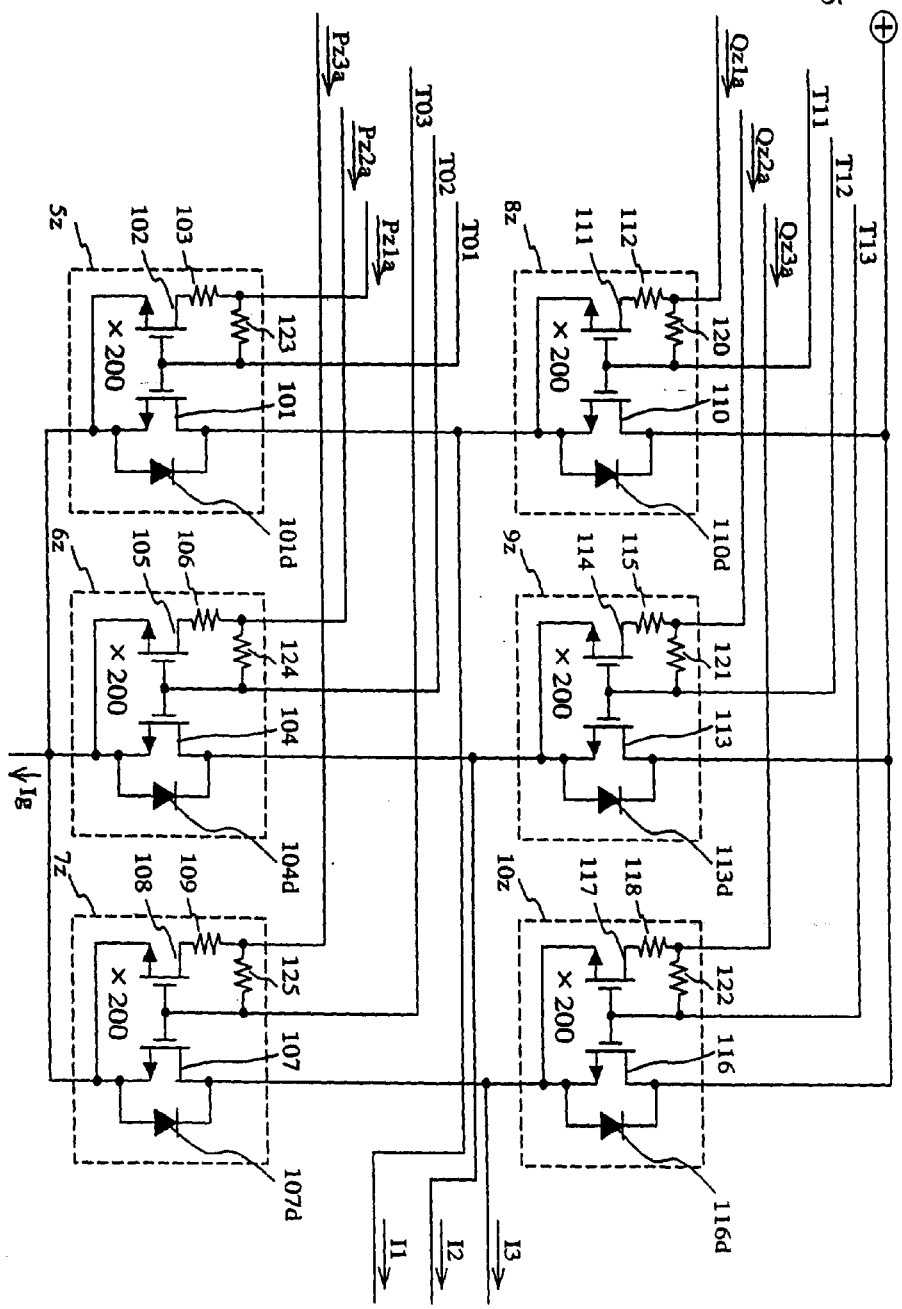
Figure 16:
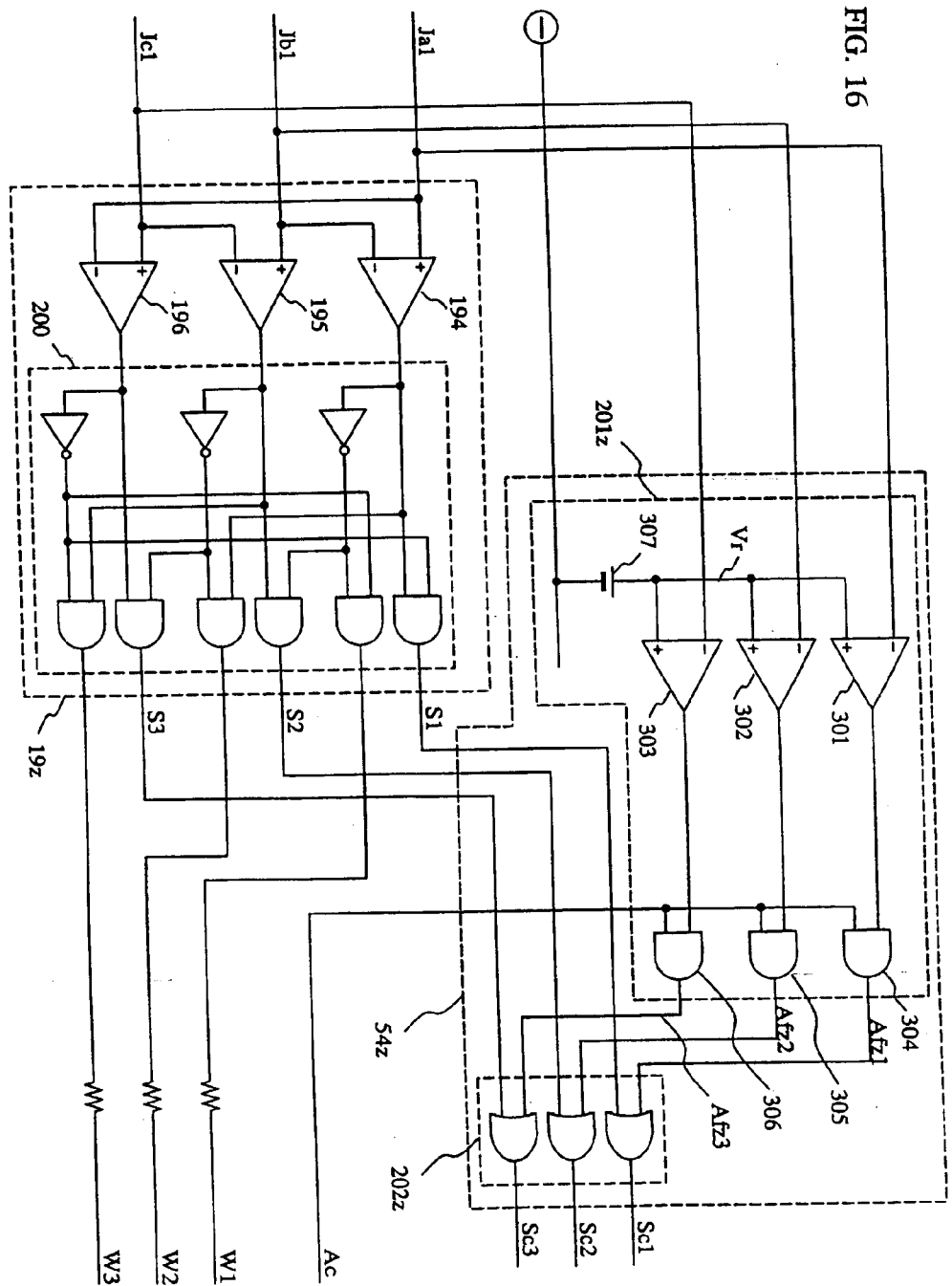
Figure 17:
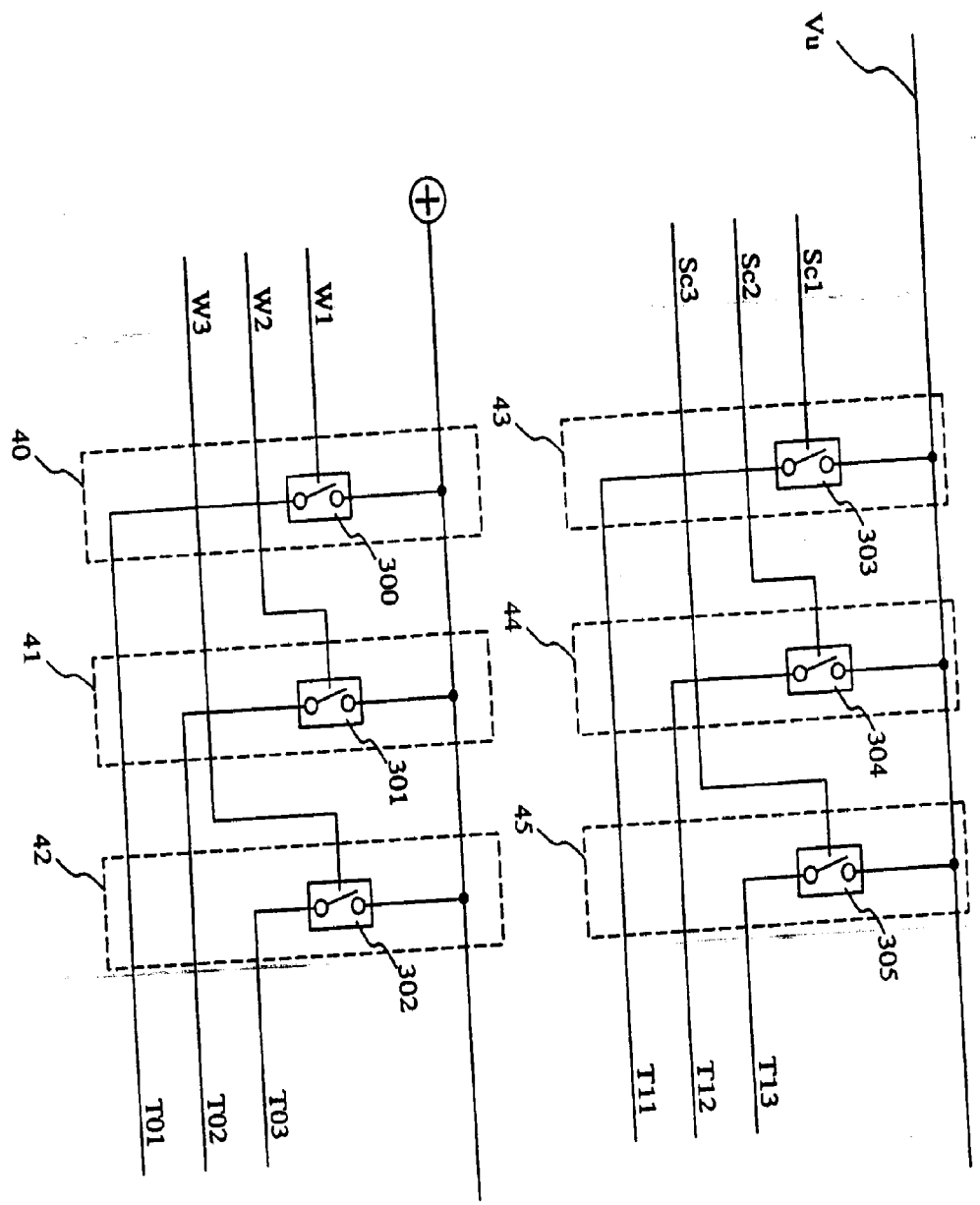
Figure 18:
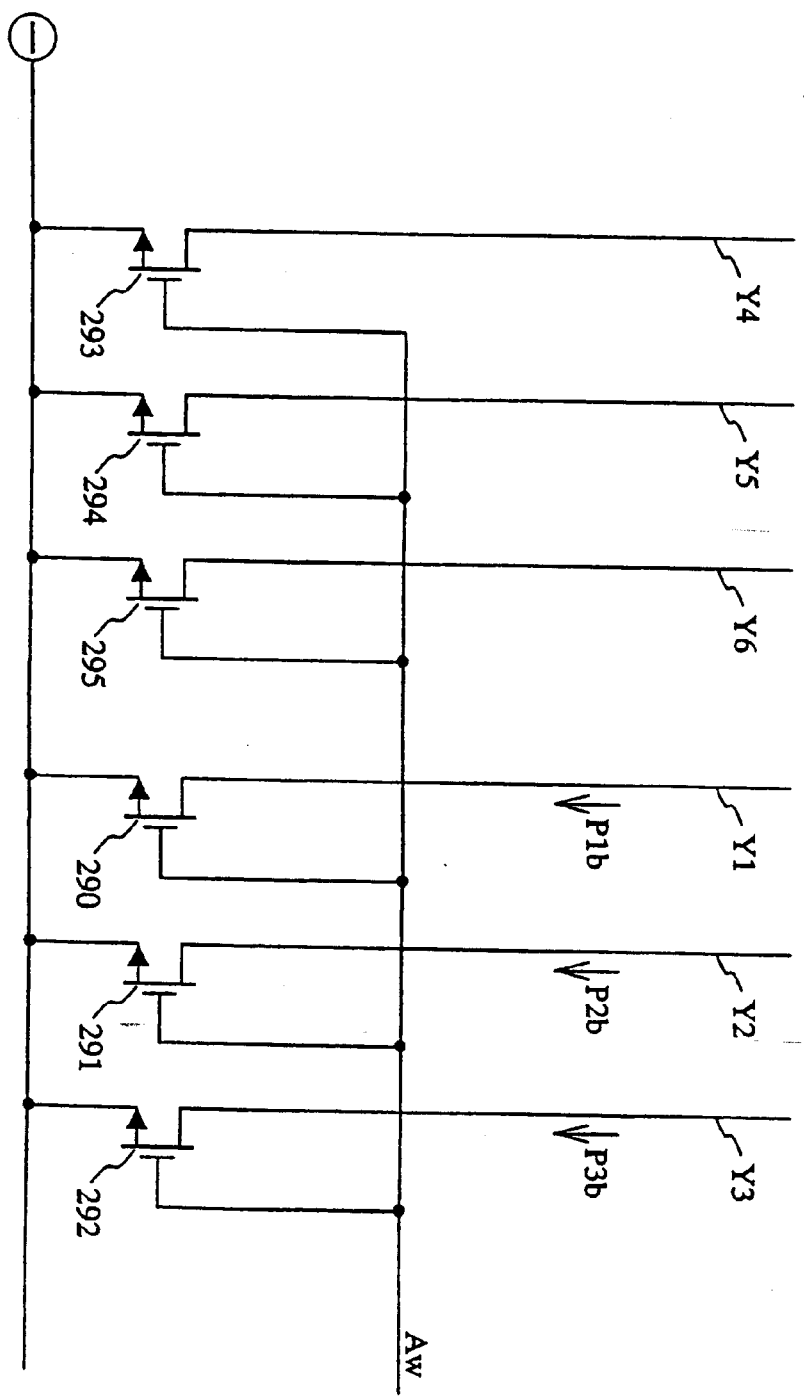
Figure 19:
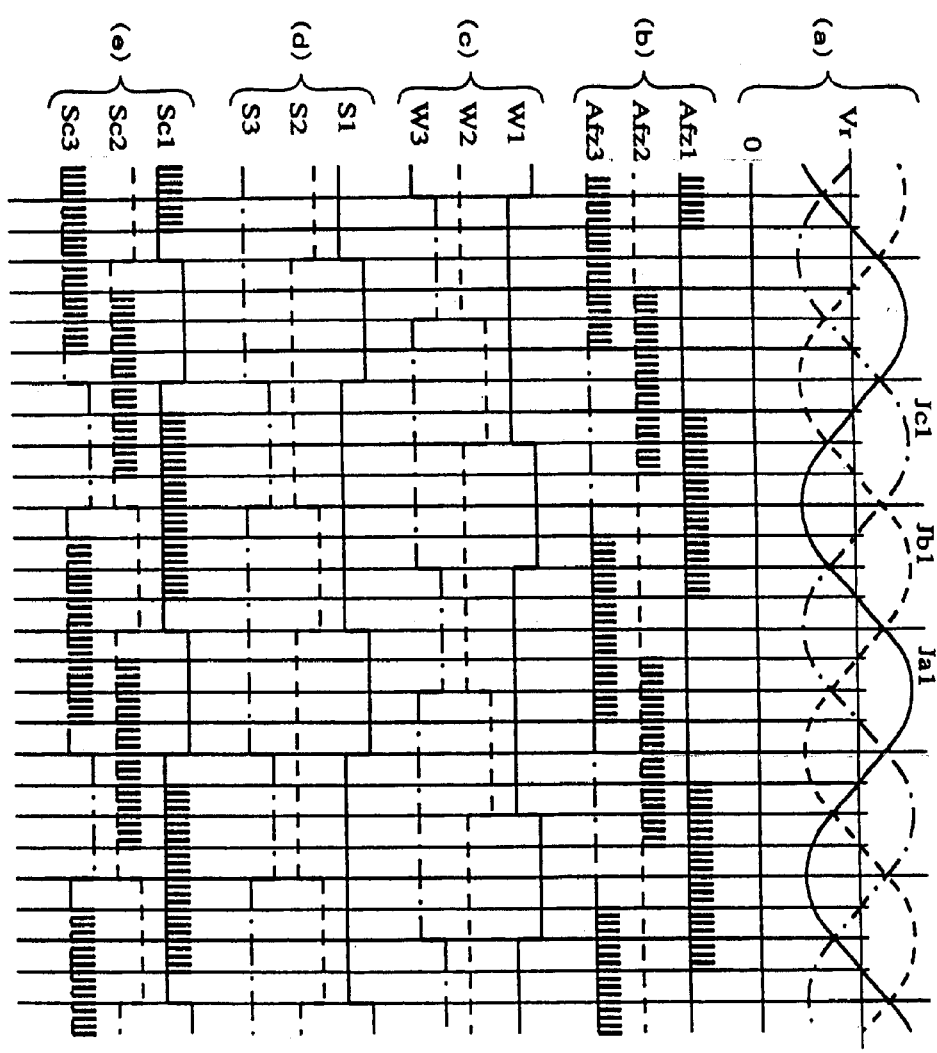
Figure 20:
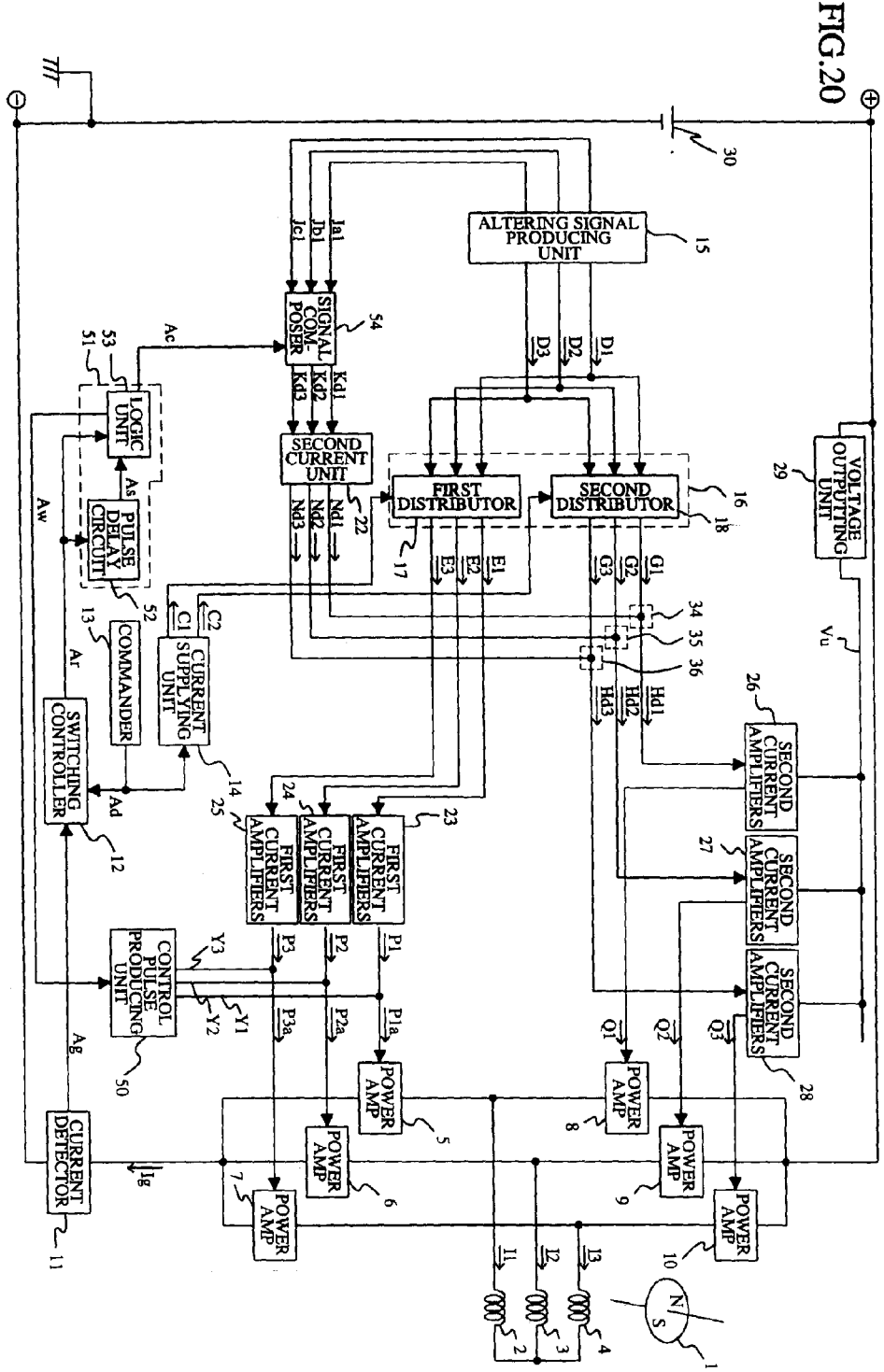
Figure 21:
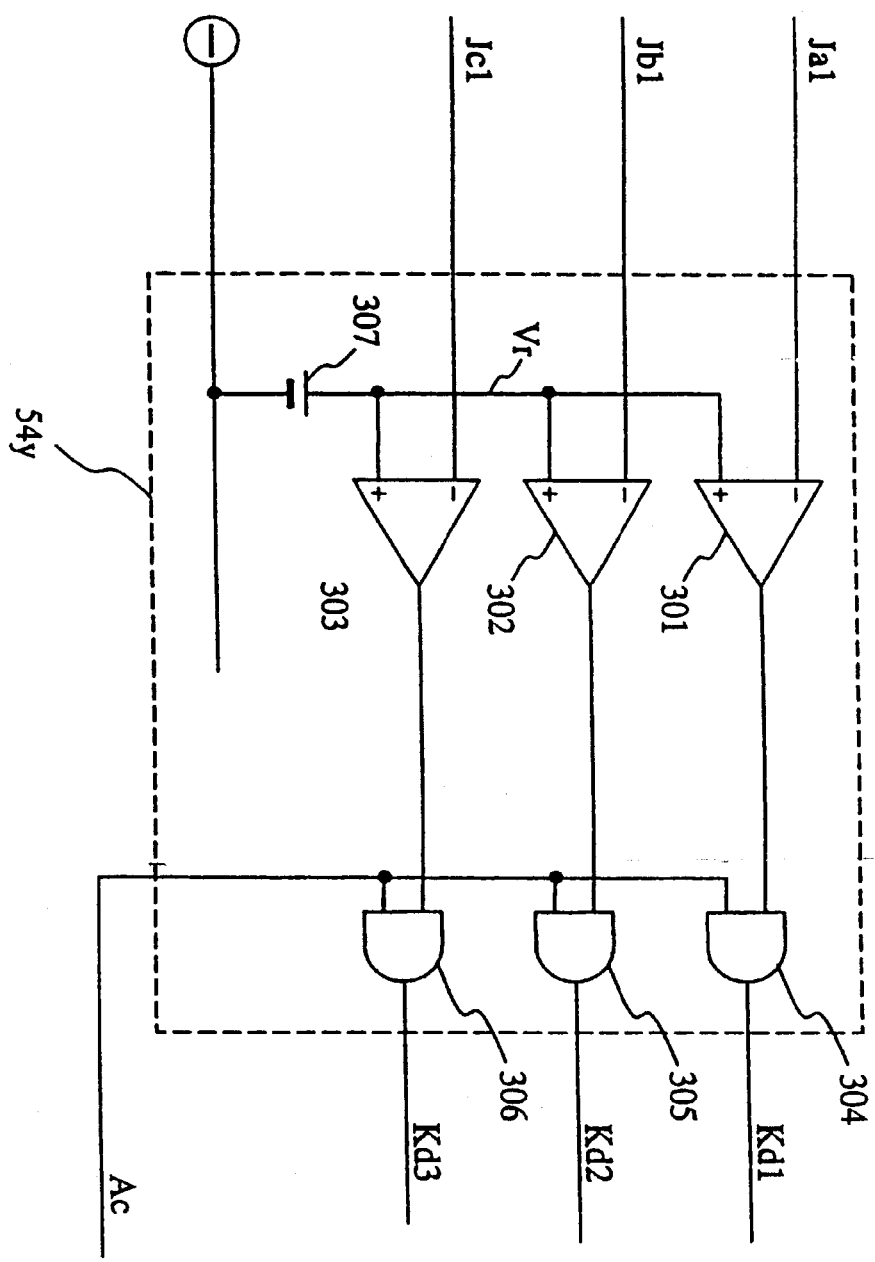
Figure 22:
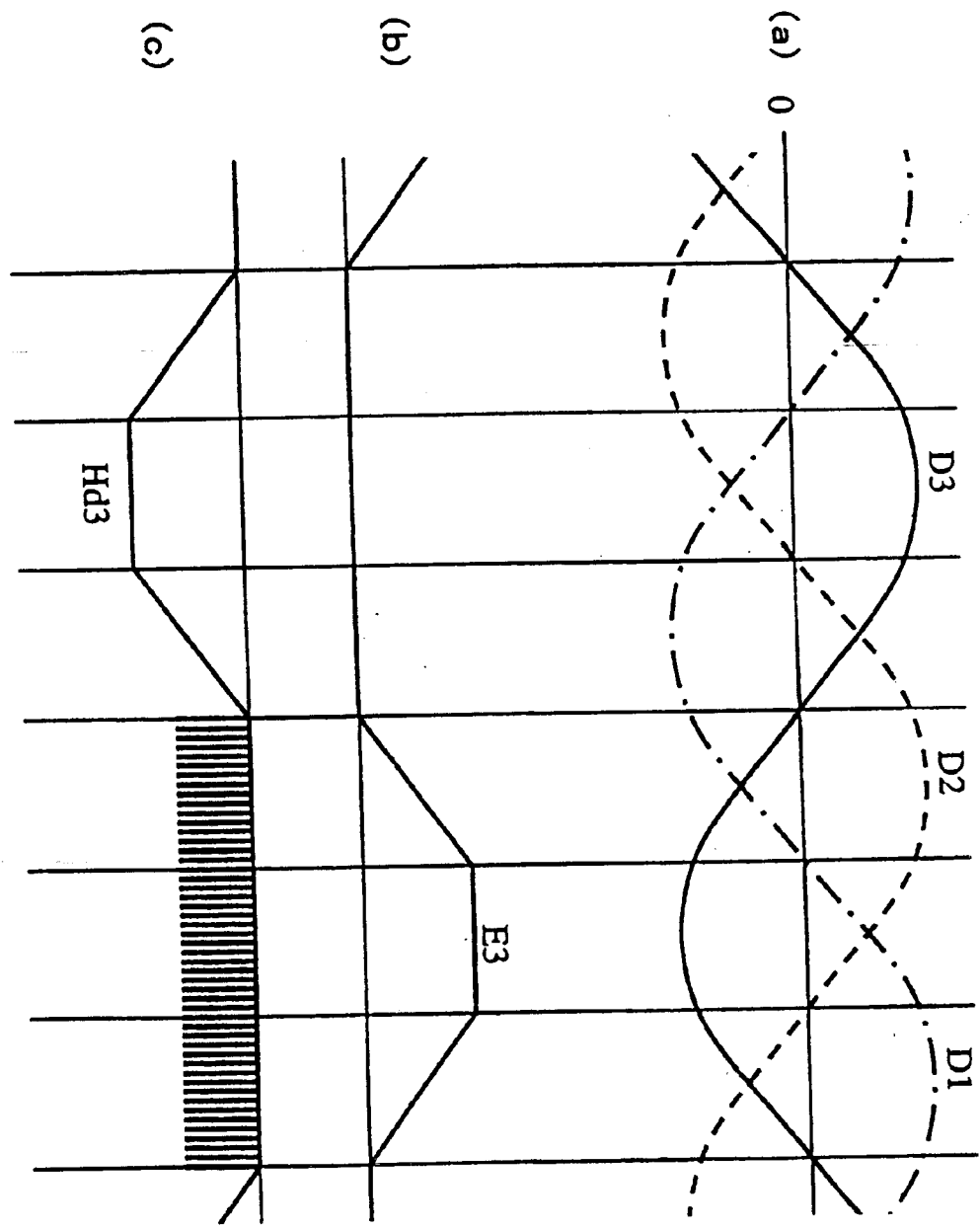
Figure 23:
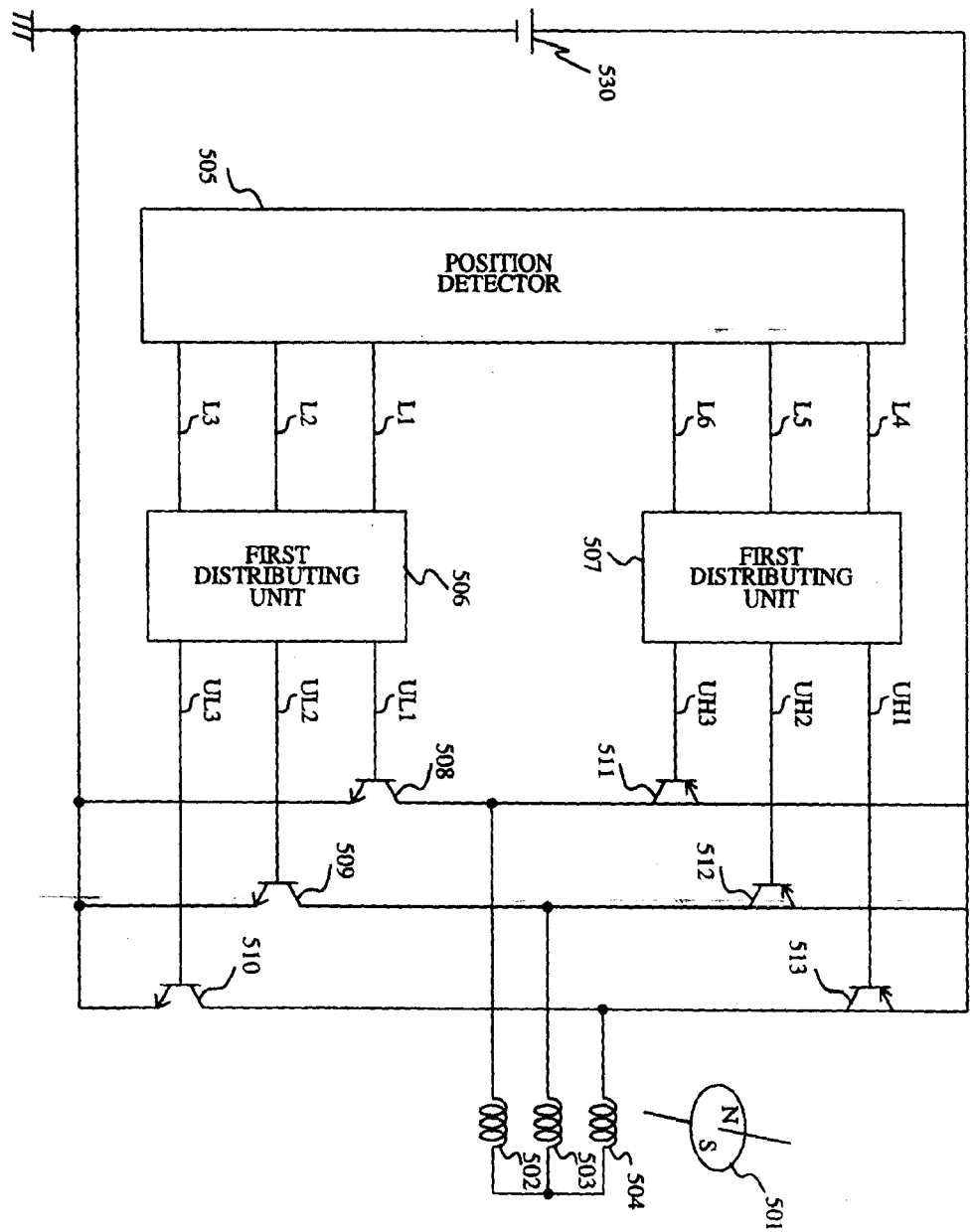

<u>Drawings,</u>
Please replace FIG. 23 with the attached FIG. 23.

Signed and Sealed this

Twenty-seventh Day of May, 2003

JAMES E. ROGAN
*Director of the United States Patent and Trademark Office*

(12) United States Patent
Ochi et al.

(10) Patent No.: US 6,255,789 B1
(45) Date of Patent: Jul. 3, 2001

(54) MOTOR

(75) Inventors: Masaaki Ochi, Hirakata; Makoto Gotou, Nishinomiya; Hideaki Mori, Moriguchi, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/489,107

(22) Filed: Jan. 21, 2000

(30) Foreign Application Priority Data

Feb. 4, 1999 (JP) .................................... 11-027572

(51) Int. Cl.$^7$ .................................................. H02P 7/06
(52) U.S. Cl. ........................ 318/254; 318/138; 363/34
(58) Field of Search .............................. 318/138, 439, 318/254; 363/34, 37, 74, 95

(56) References Cited

U.S. PATENT DOCUMENTS

| | | | |
|---|---|---|---|
| 4,494,053 | * | 1/1985 | Gotou .................... 318/254 |
| 5,309,078 | | 5/1994 | Cameron ................. 318/811 |
| 5,331,258 | * | 7/1994 | Lankin et al. .......... 318/139 |
| 5,661,382 | * | 8/1997 | Enami et al. ........... 318/439 |
| 5,869,946 | * | 2/1999 | Carobolante ........... 318/811 |
| 5,959,418 | * | 9/1999 | Gotou .................... 318/254 |
| 5,982,118 | * | 11/1999 | Gotou et al. ........... 318/254 |
| B1 6,172,474 | * | 1/2001 | Gotou .................... 318/254 |

FOREIGN PATENT DOCUMENTS

466673-A1 * 1/1992 (EP).

* cited by examiner

*Primary Examiner*—Robert E. Nappi
*Assistant Examiner*—Rina I. Duda
(74) *Attorney, Agent, or Firm*—Pearne & Gordon LLP

(57) ABSTRACT

In the present invention, a Q-phase motor, which electronically switches current paths to plural-phase windings, comprises waveform shaping signal producing device for producing Q-phase waveform shaping signals having a conduction width larger than an electric angle of 360/Q degrees and superimposed signal producing device for superimposing signals to the waveform shaping signals. The superimposed signal producing device comprises superimposed timing producing device for producing superimposed timing signals which are output in a period shorter than a conduction period of the waveform shaping signals in a conduction period of the waveform shaping signals, synchronous rectifying control device for controlling the timing for synchronous rectification, and superimposed signal composing device for composing the signals output from the synchronous rectifying control device with the superimposed timing signals.

16 Claims, 23 Drawing Sheets

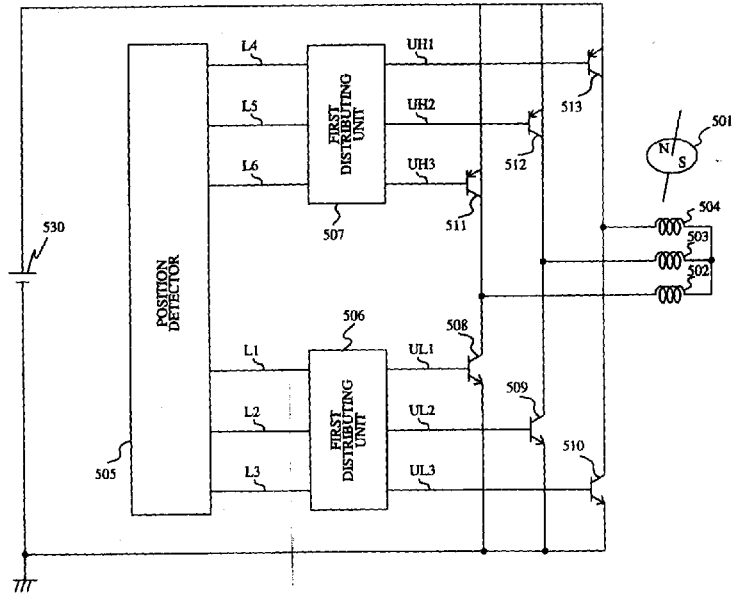

UNITED STATES PATENT AND TRADEMARK OFFICE
CERTIFICATE OF CORRECTION

PATENT NO.     : 6,255,789 B1
DATED          : July 3, 2001
INVENTOR(S)    : Masaaki Ochi et al.

It is certified that error appears in the above-identified patent and that said Letters Patent is hereby corrected as shown below:

<u>Drawings,</u>
Please replace Sheet 23 of 23 with attached Sheet 23, corrected according to the Examiner's Amendment dated February 27, 2001.

Signed and Sealed this

Twenty-seventh Day of January, 2004

JON W. DUDAS
*Acting Director of the United States Patent and Trademark Office*

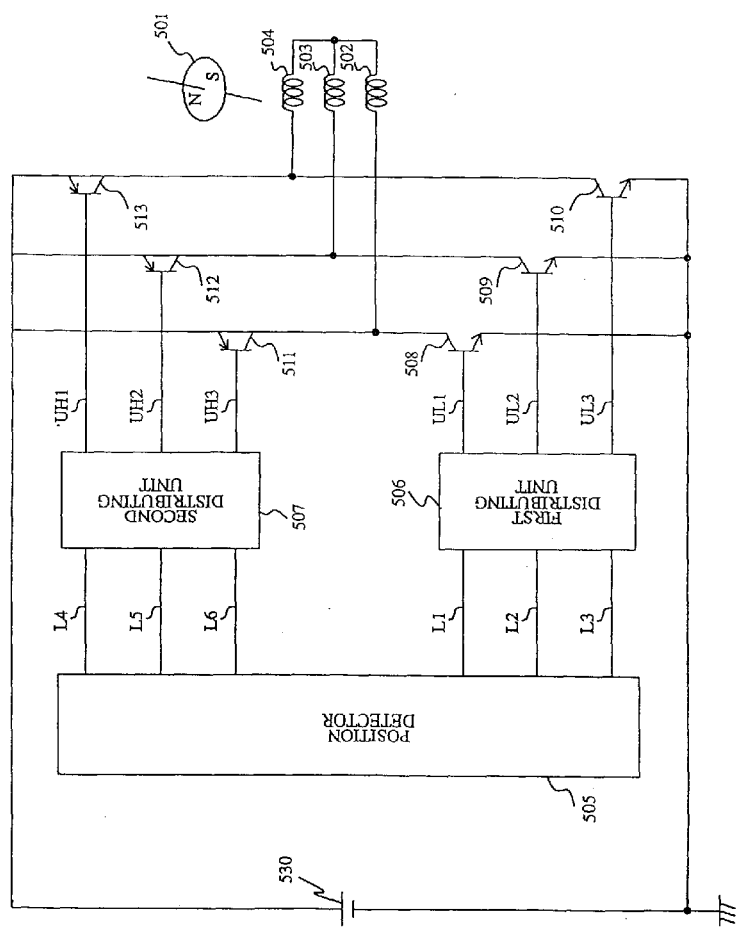
(PRIOR ART)